(12) United States Patent
Kitada et al.

(10) Patent No.: US 7,469,298 B2
(45) Date of Patent: Dec. 23, 2008

(54) METHOD AND SYSTEM FOR ENABLING LAYER 2 TRANSMISSION OF IP DATA FRAME BETWEEN USER TERMINAL AND SERVICE PROVIDER

(75) Inventors: Atsushi Kitada, Kawasaki (JP); Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 653 days.

(21) Appl. No.: 10/094,541

(22) Filed: Mar. 8, 2002

(65) Prior Publication Data

US 2003/0037163 A1 Feb. 20, 2003

(30) Foreign Application Priority Data

Aug. 15, 2001 (JP) ............................. 2001-246400

(51) Int. Cl.
*G06F 15/16* (2006.01)
(52) U.S. Cl. ................... 709/236; 709/223; 709/225; 709/227; 709/238
(58) Field of Classification Search ............ 370/400, 370/229–230, 360, 389, 398, 506, 395.53, 370/395.54; 709/236–237, 245, 227–229, 709/213; 713/155, 161, 168, 170, 200–202
See application file for complete search history.

(56) References Cited

U.S. PATENT DOCUMENTS

| | | | | | |
|---|---|---|---|---|---|
| 5,627,892 | A | * | 5/1997 | Kauffman | 380/212 |
| 5,724,510 | A | * | 3/1998 | Arndt et al. | 709/220 |
| 5,812,552 | A | * | 9/1998 | Arora et al. | 370/395.53 |
| 5,825,772 | A | * | 10/1998 | Dobbins et al. | 370/396 |
| 5,909,441 | A | * | 6/1999 | Alexander et al. | 370/395.54 |
| 5,959,990 | A | * | 9/1999 | Frantz et al. | 370/392 |
| 6,014,753 | A | * | 1/2000 | Miyamoto et al. | 714/4 |
| 6,035,105 | A | * | 3/2000 | McCloghrie et al. | 709/236 |
| 6,112,245 | A | * | 8/2000 | Araujo et al. | 709/228 |

(Continued)

FOREIGN PATENT DOCUMENTS

JP    2001-16255    1/2001

OTHER PUBLICATIONS

Carrik Solutions Limited, PPOE, (2003) http://www.carricksolutions.com/pppoe.php.*

(Continued)

*Primary Examiner*—Jeffrey Pwu
*Assistant Examiner*—Dohm Chankong
(74) *Attorney, Agent, or Firm*—Katten Muchin Rosenman LLP

(57) ABSTRACT

In a communication method: processing for designation of a service provider, user authentication, and IP address assignment is performed by exchanging management frames between a user terminal and a service provider through an access network; and main-signal frames each having an IPoE form and containing a source Layer 2 address of the user terminal are exchanged between the user terminal and the service provider through the access network. The management frames have a form which can be discriminated from the main-signal frames in Layer 2, and the access network holds information on correspondences between source Layer 2 addresses and virtual private networks. The access network recognizes one of the virtual private networks connected to the service provider, based on the source Layer 2 address contained in each main-signal frame, and transfers the main-signal frames in Layer 2 by MAC bridging.

20 Claims, 66 Drawing Sheets

U.S. PATENT DOCUMENTS

| | | | | |
|---|---|---|---|---|
| 6,181,699 | B1* | 1/2001 | Crinion et al. | 370/392 |
| 6,198,741 | B1* | 3/2001 | Yoshizawa et al. | 370/392 |
| 6,216,166 | B1* | 4/2001 | Zheng et al. | 709/236 |
| 6,243,754 | B1* | 6/2001 | Guerin et al. | 709/227 |
| 6,256,314 | B1* | 7/2001 | Rodrig et al. | 709/238 |
| 6,370,147 | B1* | 4/2002 | Beser | 370/401 |
| 6,393,484 | B1* | 5/2002 | Massarani | 709/227 |
| 6,449,279 | B1* | 9/2002 | Belser et al. | 370/397 |
| 6,452,925 | B1* | 9/2002 | Sistanizadeh et al. | 370/352 |
| 6,493,349 | B1* | 12/2002 | Casey | 370/409 |
| 6,522,627 | B1* | 2/2003 | Mauger | 370/230 |
| 6,556,541 | B1* | 4/2003 | Bare | 370/235 |
| 6,587,880 | B1* | 7/2003 | Saigo et al. | 709/225 |
| 6,650,646 | B1* | 11/2003 | Galway et al. | 370/397 |
| 6,667,967 | B1* | 12/2003 | Anderson et al. | 370/351 |
| 6,711,171 | B1* | 3/2004 | Dobbins et al. | 370/400 |
| 6,728,246 | B1* | 4/2004 | Egbert et al. | 370/392 |
| 6,771,673 | B1* | 8/2004 | Baum et al. | 370/535 |
| 6,816,890 | B2* | 11/2004 | Noda et al. | 709/213 |
| 6,842,860 | B1* | 1/2005 | Branstad et al. | 713/170 |
| 6,850,495 | B1* | 2/2005 | Baum et al. | 370/256 |
| 6,873,602 | B1* | 3/2005 | Ambe | 370/254 |
| 6,993,026 | B1* | 1/2006 | Baum et al. | 370/392 |
| 7,039,687 | B1* | 5/2006 | Jamieson et al. | 709/220 |
| 7,174,390 | B2* | 2/2007 | Schulter et al. | 709/245 |
| 7,260,648 | B2* | 8/2007 | Tingley et al. | 709/245 |
| 2001/0028660 | A1* | 10/2001 | Carolan et al. | 370/466 |
| 2001/0044893 | A1* | 11/2001 | Skemer | 713/153 |
| 2001/0054143 | A1* | 12/2001 | Miyazawa et al. | 713/155 |
| 2002/0013844 | A1* | 1/2002 | Garrett et al. | 709/225 |
| 2002/0013858 | A1* | 1/2002 | Anderson | 709/245 |
| 2002/0019875 | A1* | 2/2002 | Garrett et al. | 709/230 |
| 2002/0026528 | A1* | 2/2002 | Lo | 709/245 |
| 2002/0029275 | A1* | 3/2002 | Selgas et al. | 709/227 |
| 2002/0038419 | A1* | 3/2002 | Garrett et al. | 713/154 |
| 2003/0035398 | A1* | 2/2003 | Sato | 370/338 |
| 2003/0154297 | A1* | 8/2003 | Suzuki et al. | 709/229 |
| 2004/0205188 | A1* | 10/2004 | Ahlard et al. | 709/224 |
| 2005/0038865 | A1* | 2/2005 | Noda et al. | 709/213 |

OTHER PUBLICATIONS

SearchSMB.com Definitions, Address Resolution Protocol (Aug. 14, 2000) Whatis.com (p. 1).*

David C. Plummer, An Ethernet Address Resolution Protocol (1982) http://www.rfc-editor.org/rfc/rfc826.txt.*

Cisco Systems Inc, Bridging and Switching Basics, Sep. 13, 2001, URL: http://www.cisco.com/univercd/cc/td/doc/cisintwk/ito_doc/bridging.htm.* http://www.networkdictionary.com/networking/EtherType.php?PHPSESSID=c2a79111d168faf.*

Japanese Office Action dated Jul. 8, 2008, with partial translation, from the corresponding Japanese Application.

Koichiro Okamura. "Establishment of Information Infrastructure with an Advantage in Security" Interop Magazine, Softbank Publishing Corp, vol. 11, No. 5, May 1, 2001, pp. 38-49.

* cited by examiner

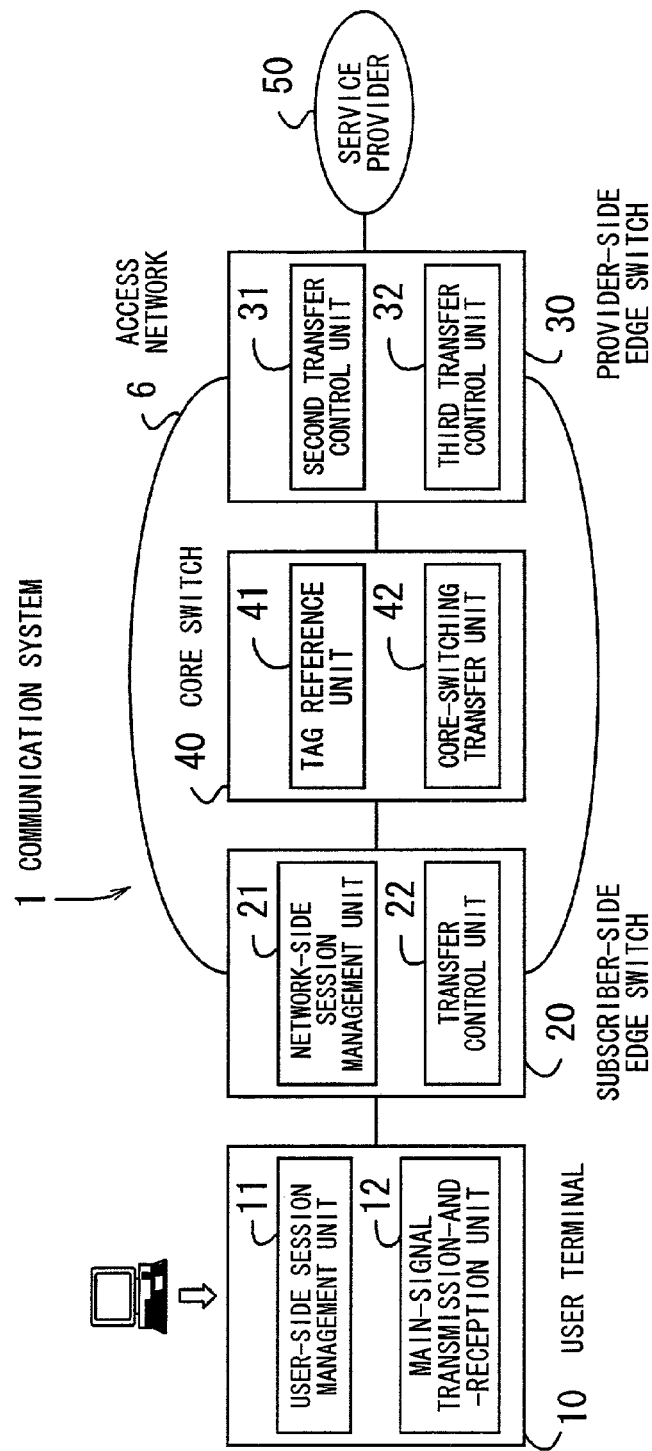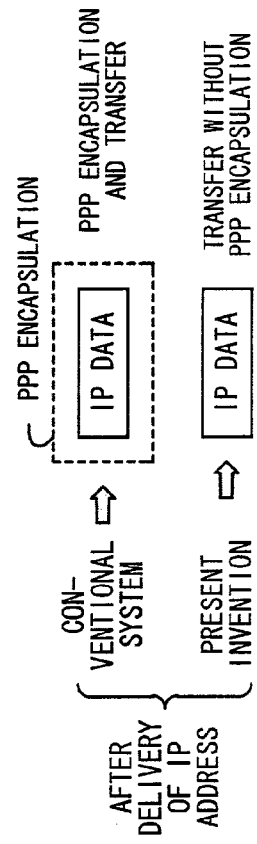

| 0 | | | | 31 |
|---|---|---|---|---|
| DESTINATION ADDR ||||
| DESTINATION ADDR || SOURCE ADDR |||
| SOURCE ADDR ||||
| ETHER TYPE(=0x0800) | VER | IHL || TOS |
| TOTAL LENGTH || FLAGS | FRAGMENT OFFSET ||
| TTL | PROTOCOL || HEADER CHECKSUM ||
| SOURCE IP ADDR ||||
| DESTINATION IP ADDR ||||
| OPTIONS |||| PADDING |

IHL: Internet Header Length

TOS: Type Of Service

TTL: Time To Live

FIG. 4

| | |
|---|---|
| DESTINATION ADDR | |
| DESTINATION ADDR | SOURCE ADDR |
| SOURCE ADDR | |
| TPID (=0x8100) | PRI / CFI / VID (=1~4094) |
| ETHER TYPE (=0x0800) | IP PACKET··· |

0 ... 31

TPID : Tag Protocol Identifier

PRI : Priority

CFI : Canonical Format Indicator

VID : VLAN Identifier

T2a SESSION MANAGEMENT TABLE T2a

| MAC ADDRESS | SESSION ID | STATE | NEGOTIATION PARAMETER |
|---|---|---|---|
| A | 0x1234 | IP COMMUNICATION PHASE | VLAN-ID=10, ASSIGNED IP ADDRESS=a, xSP-IP ADDRESS=x |
| B | 0x5678 | IP COMMUNICATION PHASE | VLAN-ID=11, ASSIGNED IP ADDRESS=b, xSP-IP ADDRESS=y |
| C | 0x7777 | AUTHENTICATION PHASE | VLAN-ID=12 (IP ADDRESS IS UNDER NEGOTIATION, NOT ASSIGNED) |
| D | 0x3859 | IP COMMUNICATION PHASE | VLAN-ID=11, ASSIGNED IP ADDRESS=d, xSP-IP ADDRESS=y |
| ---- | ---- | ---- | ---- |

MAC-VID TABLE T2b

| MAC ADDRESS | SESSION ID | VLAN-ID |
|---|---|---|
| A | 0x1234 | 10 |
| B | 0x5678 | 11 |
|  |  |  | ← C IS IN AUTHENTICATION PHASE, AND NOT REGISTERED
| D | 0x3859 | 11 |
| ---- | ---- | ---- |

FIG. 8

T2d PORT ATTRIBUTE TABLE T2d

| PORT NO. | RECEIVED FRAME | BROADCAST FILTERING | TAG/UNTAG |
|---|---|---|---|
| 1 | PPPoE, IP, ARP | ON | UnTag |
| 2 | PPPoE, IP, ARP | ON | UnTag |
| 3 | PPPoE, IP, ARP | ON | UnTag |
| 4 | PPPoE, IP, ARP | ON | UnTag |
| 5 | IEEE802.1Q, GVRP, STP | OFF | With Tag |
| 6 | IEEE802.1Q, GVRP, STP | OFF | With Tag |
| 7 | IEEE802.1Q, GVRP, STP | OFF | With Tag |
| ---- | ---- | ---- | ---- |

FIG. 10

FIG. 18A
(BEFORE ESTABLISHMENT OF CONNECTION)

| MAC ADDRESS | SESSION ID | STATE | NEGOTIATION PARAMETER |
|---|---|---|---|
| ? | 0x0000 | CONNECTION TRIAL | USER ID: "user-name@provider-name", PASSWORD |

(USER ID CAN BE STORED IN ADVANCE WHEN USER IS FIXEDLY CONNECTED TO SERVICE PROVIDER.)

FIG. 18B
(AFTER ESTABLISHMENT OF CONNECTION)

| MAC ADDRESS | SESSION ID | STATE | NEGOTIATION PARAMETER |
|---|---|---|---|
| M | 0x1234 | IP COMMUNICATION PHASE | ASSIGNED IP ADDRESS = a, PROVIDER IP ADDRESS = x |

MAC ADDRESS OF SUBSCRIBER-SIDE EDGE L2 SWITCH

LCP Echo-Request/Reply

| 0 | | | | 31 |
|---|---|---|---|---|
| DESTINATION ADDR=SUBSCRIBER-SIDE EDGE L2 SWITCH | | | | |
| DESTINATION ADDR(cont) | | SOURCE ADDR | | |
| SOURCE ADDR=USER TERMINAL(cont) | | | | |
| ETHER TYPE(=0x8864) | VER=1 | TYPE=1 | CODE=0X00 | |
| SESSION-ID=0x1234(EXAMPLE) | LENGTH=0x000a | | | |
| PPP-PROTOCOL=0xC021(LCP) | CODE=0X08 | | ID=0X01 | |
| LENGTH=0x0006 | Magic-Number=0x12345678(EXAMPLE) | | | |
| Magic-Number=0x12345678(EXAMPLE) | | | | |

( CODE=0x08 in LCP Echo-Request  CODE=0x09 in LCP Echo-Reply )
  Magic-Number: A NUMBER DETERMINED BY
  SOURCE OF EACH OF LCP Echo-Request AND LCP Echo-Reply

FIG. 20

| | | | | |
|---|---|---|---|---|
| DESTINATION ADDR=SUBSCRIBER-SIDE EDGE L2 SWITCH ||||| 
| DESTINATION ADDR(cont) | SOURCE ADDR ||||
| SOURCE ADDR=USER TERMINAL(cont) |||||
| ETHER TYPE(=0x8864) | VER=1 | TYPE=1 | CODE=0X00 ||
| SESSION-ID=0x1234(EXAMPLE) | LENGTH=0x000a ||||
| PPP-PROTOCOL=0xC021(LCP) | CODE=0X05 | ID=0X01 |||
| LENGTH=0x???? | Data... ||||

LCP Terminate-Request/Ack (CODE=0x05 in LCP Terminate-Request CODE=0x06 in LCP Terminate-Ack Data: INFORMATION INDICATING REASON FOR TERMINATION OR THE LIKE)

| DESTINATION ADDR |
| Ether Type=0x806 |
| Hw Addr Type=0x0001 |
| Prot Addr Type=0x800 |
| Hw Addr Len=6 |
| Prot Addr Len=4 |
| Code |
| Src Hw Addr |
| Src Prot Addr |
| Tgt Hw Addr |
| Tgt Prot Addr |
| FCS |

ARP Packet

FIG. 24B

| ff:ff:ff:ff:ff:ff |
| A |
| 0x0806 |
| |
| |
| |
| 0x01 (Req) |
| A |
| a |
| |
| b |
| |

ARP Request

FIG. 24C

| A |
| B |
| 0x0806 |
| |
| |
| |
| 0x02 (Reply) |
| B |
| b |
| A |
| a |
| |

ARP Reply

CACHED BY DESTINATION OF ARP REPLY (Src Hw Addr, Src Prot Addr in FIG. 24C)

IPv6 DATA FORMAT

FIG. 35A

| PORT | VLAN-ID |
|------|---------|
| 5 | 10 |
| 6 | 11 |
| 7 | 12 |

REGISTERED AS FIXED VALUES
(ALTHOUGH PROVIDERS
NEED NOT KNOW VLAN-IDS)

PORT VID TABLE (IN PROVIDER-SIDE EDGE L2SW)

FIG. 35B

| IP ADDRESS | MAC ADDRESS |
|------------|-------------|
| x | X |

For VLAN-ID=10

| IP ADDRESS | MAC ADDRESS |
|------------|-------------|
| y | Y |

For VLAN-ID=11

| IP ADDRESS | MAC ADDRESS |
|------------|-------------|
| z | Z |

For VLAN-ID=12

REGISTERED AS FIXED VALUES

ARP RELAY TABLES (IN PROVIDER-SIDE EDGE L2SW)

FIG. 35C

| MAC ADDRESS | OUTPUT PORT |
|-------------|-------------|
| A | 1 |
| X | 5 |

For VLAN-ID=10

| MAC ADDRESS | OUTPUT PORT |
|-------------|-------------|
| B | 2 |
| D | 4 |
| Y | 6 |

For VLAN-ID=11

| MAC ADDRESS | OUTPUT PORT |
|-------------|-------------|
| C | 3 |
| Z | 7 |

For VLAN-ID=12

FORWARDING TABLE (INDEPENDENTLY PROVIDED FOR EACH VLAN-ID)

FIG. 35D

| PORT | RECEIVED FRAME | BROADCAST FILTERING | TAG/UNTAG |
|------|----------------|---------------------|-----------|
| 1 | IEEEE802.1Q, GVRP, STP | OFF | With Tag |
| 2 | IEEEE802.1Q, GVRP, STP | OFF | With Tag |
| 3 | IEEEE802.1Q, GVRP, STP | OFF | With Tag |
| 4 | IEEEE802.1Q, GVRP, STP | OFF | With Tag |
| 5 | IP, ARP | ON | UnTag |
| 6 | IP, ARP | ON | UnTag |
| 7 | IP, ARP | ON | UnTag |

PORT ATTRIBUTE TABLE
(WHICH MAY BE INDEPENDENTLY PROVIDED FOR EACH VLAN-ID)

| PROVIDER NAME | VLAN-ID | INFORMATION ON PROVIDER RADIUS SERVER |
|---|---|---|
| ISP-X | 10 | IP ADDRESS=x1 |
| ISP-Y | 11 | IP ADDRESS=y1 |
| ISP-Z | 12 | IP ADDRESS=z1 |

FIG. 40

| MAC ADDRESS | SESSION ID | STATE | NEGOTIATION PARAMETER |
|---|---|---|---|
| A | 0x1234 | IP COMMUNICATION PHASE | VLAN-ID=10, ASSIGNED IP ADDRESS=a, xSP-IP ADDRESS=x |
| A | 0x5678 | IP COMMUNICATION PHASE | VLAN-ID=11, ASSIGNED IP ADDRESS=b, xSP-IP ADDRESS=y |
| B | 0x7777 | AUTHENTICATION PHASE | VLAN-ID=12 (IP ADDRESS UNDER NEGOTIATION, NOT ASSIGNED) |
| C | 0x3859 | IP COMMUNICATION PHASE | VLAN-ID=11, ASSIGNED IP ADDRESS=d, xSP-IP ADDRESS=y |
| ---- | ---- | ---- | ---- |

FIG. 42

SESSION MANAGEMENT TABLE FOR UNIQUELY IDENTIFYING EACH SESSION BASED ON SOURCE MAC ADDRESS AND SESSION ID WHEN A USER TERMINAL IS CONCURRENTLY CONNECTED TO A PLURALITY OF SERVICE PROVIDERS

FIG. 44A

| MAC ADDRESS | SESSION ID | VLAN-ID |
|---|---|---|
| A | 0x1234 | 10 |
| A | 0x5678 | 11 |
|  | 0x7777 | 11 |
| C | 0x3859 | 11 |

A PLURALITY OF VLAN ENTRIES WHICH MATCH THE MAC ADDRESS A

MAC-VID TABLE WHEN A USER TERMINAL IS CONCURRENTLY CONNECTED TO A PLURALITY OF SERVICE PROVIDERS

FIG. 44B

| DESTINATION MAC ADDRESS | VLAN-ID |
|---|---|
| X | 10 |
| Y | 11 |

IDENTIFY VLAN-ID=10 BASED ON DESTINATION MAC ADDRESS

DESTINATION MAC-VID TABLE (PRODUCED BASED ON ARP REPLY)

| IP SUBNET | VLAN-ID |
|---|---|
| xxx.xxx.xxx.0/24 | 10 |
| yyy.yyy.yyy.0/24 | 11 |

IP SUBNET TABLE

FIG. 47

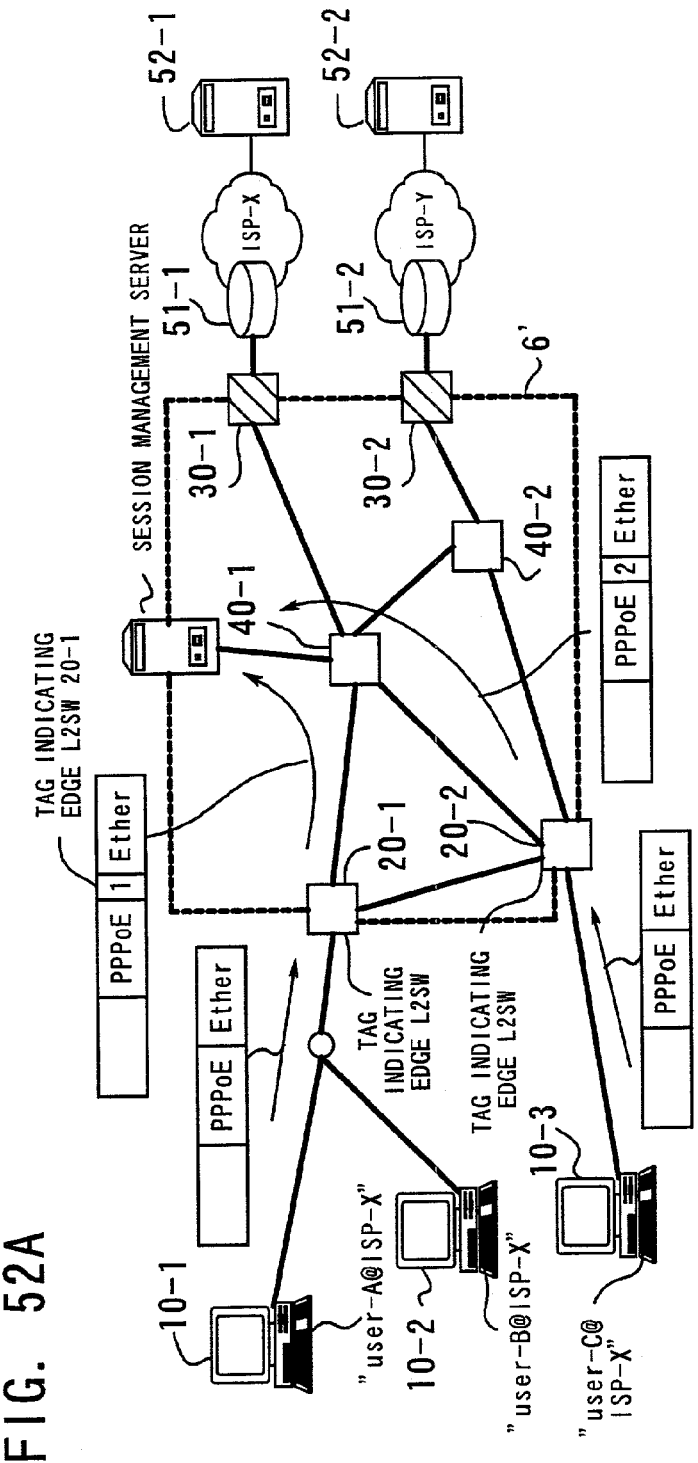

ADDITIONAL INFORMATION ITEM 

PORT ATTRIBUTE TABLE (SUBSCRIBER SIDE)

| PORT NO. | PORT ATTRIBUTE | VID | RECEIVED FRAME | BROADCAST FILTERING | TAG/UNTAG |
|---|---|---|---|---|---|
| 1 | user | — | PPPoE, IP, ARP | ON | UnTag |
| 2 | user | — | PPPoE, IP, ARP | ON | UnTag |
| 3 | user | — | PPPoE, IP, ARP | ON | UnTag |
| 4 | user | — | PPPoE, IP, ARP | ON | UnTag |
| 5 | core | — | IEEE802.1Q, GVRP, STP | OFF | With Tag |
| 6 | core | — | IEEE802.1Q, GVRP, STP | OFF | With Tag |
| 7 | core | — | IEEE802.1Q, GVRP, STP | OFF | With Tag |
| ---- | ---- | ---- | ---- | ---- | ---- |

DEFAULT VALUES AUTOMATICALLY SET BASED ON PORT ATTRIBUTE VALUES.

FIG. 61

PORT ATTRIBUTE TABLE (xSP SIDE)

| PORT NO. | PORT ATTRIBUTE | VID | RECEIVED FRAME | BROADCAST FILTERING | TAG/UNTAG |
|---|---|---|---|---|---|
| 1 | core | — | IEEE802.1Q, GVRP, STP | OFF | With Tag |
| 2 | core | — | IEEE802.1Q, GVRP, STP | OFF | With Tag |
| 3 | core | — | IEEE802.1Q, GVRP, STP | OFF | With Tag |
| 4 | core | — | IEEE802.1Q, GVRP, STP | OFF | With Tag |
| 5 | xsp | 10 | IP, ARP | ON | UnTag |
| 6 | xsp | 11 | IP, ARP | ON | UnTag |
| 7 | xsp | 12 | IP, ARP | ON | UnTag |
| --- | --- | --- | --- | --- | --- |

ADDITIONAL INFORMATION ITEMS

DEFAULT VALUES AUTOMATICALLY SET BASED ON PORT ATTRIBUTE VALUES.

REGISTERED BASED ON THE ABOVE VALUES SET BY USER

PORT VID TABLE

| PORT NO. | VID |
|---|---|
| 5 | 10 |
| 6 | 11 |
| 7 | 12 |
| --- | --- |

FIG. 62

METHOD AND SYSTEM FOR ENABLING LAYER 2 TRANSMISSION OF IP DATA FRAME BETWEEN USER TERMINAL AND SERVICE PROVIDER

BACKGROUND OF THE INVENTION

1) Field of the Invention

The present invention relates to a communication system for enabling a user to receive service from a service provider through a network. The present invention also relates to a communication method for enabling a user to receive service from a service provider through a network. The present invention further relates to a user terminal which can receive service from a service provider through a network.

2) Description of the Related Art

The development of economical, high-speed broadband network systems is rapidly proceeding so as to support widely spreading use of broadband multimedia services such as the Internet or digital contents delivery services. Actually, construction of network systems such as ADSL (Asymmetric Digital Subscriber Line) systems and FTTH (Fiber To The Home) systems are proceeding. In the ADSL systems, existing copper cables are utilized for realizing high-speed digital transmission. In the FTTH systems, optical fiber cables are laid to houses of users for providing high-capacity high-speed communication services to the users.

In addition, it is expected that as a result of the development of the network technologies, a number of service providers (xSPs) will become available and spur the expansion of the market of the network business, where the xSPs include internet service providers, contents service providers, and the like, and will provide high-quality image delivery services, music download services, and the like.

Further, recently, network services generally called virtual private networks (VPNs) have become available. The VPNs are private networks which are built over private local networks and public networks, and utilize services provided by public network providers as if the private networks are leased lines. For example, a private network can be virtually built by connecting local area networks (LANs) in a company through the Internet. When a private network is built in this manner, the private network becomes free from the physical network structure, and has high flexibility and expandability.

In the current circumstance, in which the broadband services are spreading as above, users' demands for flexible switching of a connection with each user between a plurality of service providers are increasing.

On the other hand, Ethernet (which is a registered trademark of the Xerox Corporation) is deemed to be a promising LAN technology for use in access channels and WAN lines. For example, efforts are moving ahead to standardize the 10 Gb/s Ethernet. A typical protocol for performing authentication and IP address assignment on the Ethernet is PPPoE (Point-to-Point Protocol over Ethernet). The authentication and the IP address assignment are necessary when a service provider to which each user is connected is switched.

FIG. 65 is a diagram illustrating a configuration for connecting a user terminal to service providers, where the service provider to which the user terminal is connected can be switched by using PPPoE.

A user terminal 100 can be connected to a service provider through an Ethernet, an ADSL or FTTH line, and an access network 600. The ADSL or FTTH line is terminated with a subscriber-side terminating device 110, which is an ADSL modem when the service is provided through ADSL, and an ONU (Optical Network Unit) when the service is provided through FTTH.

In order to establish a connection between the user terminal 100 and one of the service providers, the user terminal 100 initiates a call to the service provider and sends a user ID and a password to the service provider. When the user is authenticated, an IP address is issued to the user, and the service is started. When the user requests to switch the connection to the service provider, the user inputs the name of another service provider to which the connection is to be switched, following the user ID, and sends the user ID and the name of the service provider to which the connection is to be switched. Then, the access network recognizes the user's request, and switches the connection.

Since the above operations after the initiation of the call are performed in accordance with PPP (Point-to-Point Protocol), the IP address is delivered to the user by using IPCP (Internet Protocol Control Protocol).

PPP includes two layers: LCP (Link Control Protocol) and NCP (Network Control Protocol). LCP is used for establishment of a datalink which is independent of an upper protocol, and NCP is used for processing which is dependent on the upper protocol. In the case where the upper protocol is TCP/IP, IPCP is used as an NCP, and the IP address is determined in accordance with IPCP.

FIG. 66 is a diagram illustrating a conventional network system which uses PPPoE. The conventional network system of FIG. 66 corresponds to the configuration of FIG. 65. In FIG. 66, the terminating device 110 is not shown. The access network 600 includes switches 601 and a broadband remote access server (BRAS) 610. The B-RAS 610 is connected to servers respectively belonging to service providers.

In order to establish a connection between the user and a service provider, the user inputs "user-name@provider-name" into the user terminal 100, where the information "user-name" indicates the name of the user, and the information "provider-name" indicates the name of the service provider. Then, a packet including the information "user-name@provider-name" is sent to the B-RAS 610 through the switches 601. The B-RAS 610 transfers the packet to the service provider based on the information "user-name@provider-name". Thus, the user can arbitrarily choose a service provider to which the user terminal is connected.

However, in the above conventional network system using PPPoE, processing concentrates in the B-RAS 610. Therefore, the processing load imposed on the B-RAS 610 becomes very heavy, and impedes high-speed communication The reasons for the concentration of processing in the B-RAS 610 are as follows.

(i) Since IP processing is required, it is necessary to assign an IP address to each interface connected to an xSP. In addition, an IP address is also assigned to each PPP virtual interface for point-to-point connection to the user terminal. Therefore, administration cost is increased. In this case, if sessions between the same user and the different xSPs are controlled by different B-RASs, the administration cost is further increased by necessity for statistical and accounting management.

(ii) Whichever xSP is connected to the user terminal 100, every frame from the user terminal 100 passes through the B-RAS 610, as illustrated in FIG. 66. According to PPPoE, user data such as IP packets, as well as management information for authentication and the like, are encapsulated for transfer in accordance with PPP. Therefore, the main signals to be transferred to the xSPs, as well as the management information, concentrate in the B-RAS 610.

(iii) In order to perform negotiation in accordance with PPPoE, it is necessary to exchange requests for conditions and acknowledgments (e.g., Configure-Request and Configure-Ack). Since the negotiated conditions differ with different users, the processing is executed by software.

(iv) In order to transfer information to the xSPs, the B-RAS 610 is required to perform layer-3 processing. That is, the B-RAS 610 has to perform the so-called virtual router function. In addition, the B-RAS 610 is required to handle a routing table for all interfaces, i.e., all of the provider-side interfaces corresponding to the xSPs and the PPP virtual interfaces corresponding to subscribers.

As described above, in the conventional network system using PPPoE, all of the various operations are performed by the B-RAS 610. Therefore, the B-RAS 610 becomes a bottleneck, which limits speedup of the conventional network system.

SUMMARY OF THE INVENTION

A communication system and method far communication between a user terminal and a service provider through an access network is described. The system and method include an authentication phase, which performs designation of the service provider, user authentication, and IP address assignment, by using a signaling protocol to exchange management frames that can he discriminated from main-signal frames on the basis of Ether Type field values as pan of Layer 2 header information.

The system and method also include establishing a virtual private network in the access network between the user terminal and the service provider; mapping MAC addresses of the user terminal and service provider on the virtual private network; and in a communication phase, exchanging main-signal frames over the virtual private network, each main-signal frame containing the MAC address of the user terminal or the service provider as a source MAC address.

BRIEF DESCRIPTION OF THE DRAWINGS

In the drawings:

FIG. 1 is a diagram illustrating the principle of the packet transmission system according to the present invention;

FIG. 4 is a diagram illustrating a format of a main-signal frame which is transmitted from each of the user terminals 10-1, 10-2, and 10-3 after the authentication phase;

FIG. 5 is a diagram illustrating a format of a main-signal frame to which a tag is attached;

FIG. 7 is a diagram illustrating a session management table T2a which indicates correspondences (mappings) between source MAC addresses and session IDs of users;

FIG. 8 is a diagram illustrating a VID table T2b which indicates correspondences (mappings) between the source MAC addresses of the users and tags (VLAN-IDs) corresponding to service providers to which the user terminals are connected;

FIG. 10 is a diagram illustrating a port attribute table T2d which indicates attributes of each port of the subscriber-side edge L2 switch;

FIG. 18A is a diagram illustrating an example of the user-side session management table before a connection between a user terminal and a service provider is established;

FIG. 18B is a diagram illustrating an example of the user-side session management table after a connection between a user terminal and a service provider is established;

FIG. 20 is a diagram illustrating a common format of the "LCP Echo-Request" and "LCP Echo-Reply" frames;

FIG. 21 is a diagram illustrating a common format of the "LCP Terminate-Request" and "LCP Terminate-Ack" frames;

FIG. 24A is a diagram illustrating the format of an ARP frame (packet);

FIG. 24B is a diagram illustrating an ARP request packet using the frame format of FIG. 24A;

FIG. 24C is a diagram illustrating an ARP reply packet using the frame format of FIG. 24A;

FIG. 35A is a diagram illustrating an example of a port VID table held in each provider-side edge L2 switch;

FIG. 35B is a diagram illustrating examples of ARP relay tables corresponding to a plurality of VLAN-IDs;

FIG. 35C is a diagram illustrating an example of forwarding tables held in each provider-side edge L2 switch;

FIG. 35D is a diagram illustrating an example of a port attribute table held in each provider-side edge L2 switch;

FIG. 40 is a diagram illustrating an example of a provider management table held in the proxy Radius server 61;

FIG. 42 is a diagram illustrating examples of contents of a session management table in the case where a user terminal is concurrently connected to a plurality of service providers;

FIG. 44A is a diagram illustrating examples of contents of the MAC-VID table when a user terminal is concurrently connected to a plurality of service providers;

FIG. 44B is a diagram illustrating an examples of a destination-MAC-address table;

FIG. 47 is a diagram illustrating an example of an IP subnet table;

FIG. 52A is an explanatory diagram illustrating transfer of management frames between each user terminal and the session management server through a subscriber-side edge L2 switch;

FIG. 52B is a diagram illustrating protocol stacks relating to the transfer of the management frames, in each user terminal, each subscriber-side edge L2 switch, the session management server, and the provider Radius server;

FIG. 61 is a diagram illustrating an example of a port attribute table which is held in each integrated L2 switch 70 when the integrated L2 switch is located at a subscriber-side edge of the access network 6'';

FIG. 62 is a diagram illustrating an example of a port attribute table which is held in each integrated L2 switch 70 when the integrated L2 switch is located at a provider-side edge of the access network 6", and a port VID table produced based on the VID values set by the user;

DESCRIPTION OF THE PREFERRED EMBODIMENTS

Figure 2A:
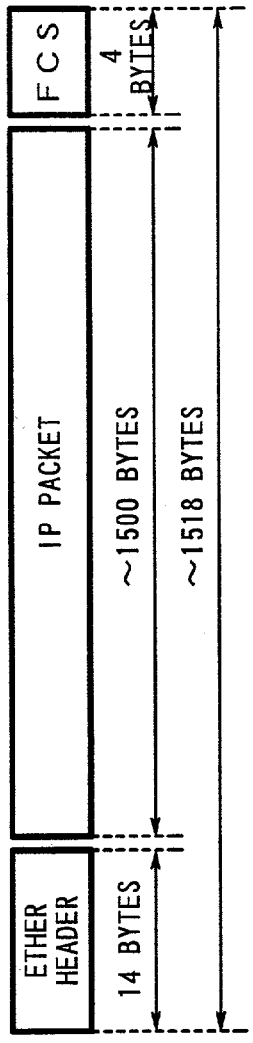
FIG. 2A is a diagram illustrating a format of an IP data frame in accordance with IEEE 802.3 before the extensions to support VLAN tagging are made.

Embodiments of the present invention are explained in detail below with reference to drawings.

(1) Basic Construction

FIG. 1A is a diagram illustrating the basic construction of the communication system according to the present invention. The communication system 1 of FIG. 1A comprises at least one user terminal 10, an access network 6, and at least one service provider (xSP) 50. The access network 6 comprises at least one subscriber-side edge switch 20, at least one core switch 40, and at least one provider-side edge switch 30. In the communication system 1 in FIG. 1A, communication between each user terminal 10 and each service provider 50 through the access network 6 is controlled.

Each user terminal 10 comprises a user-side session management unit 11 and a main-signal transmission-and-reception unit 12. Each subscriber-side edge switch 20 comprises a network-side session management unit 21 and a first transfer control unit 22. Each core switch 40 comprises a tag reference unit 41 and a core-switching transfer unit 42. Each provider-side edge switch 30 comprises a second transfer control unit 31 and a third transfer control unit 32.

In an authentication phase, the user-side session management unit 11 in each user terminal 10 performs operations relating to session management, where the operations include processing for designation of a service provider (xSP) to which the user terminal 10 is to be connected, user authentication, and an IP address assignment. In an IP communication phase, the main-signal transmission-and-reception unit 12 in each user terminal 10 directly transmits and receives main signals in Layer 2 without encapsulation in accordance with PPP and use of an authentication-phase protocol.

In the conventional systems, when one of the at least one user terminal communicates with one of the at least one service provider by utilizing a virtual private network service, the entire communication sequence from authentication to transmission and reception of IP packets is controlled by using a tunneling protocol, according to which new overhead is added to the IP packets, and the IP packets are encapsulated in accordance with PPP and transferred to the internet service provider in the PPP encapsulated form, as illustrated in the upper portion of FIG. 1B.

On the other hand, in the communication system 1 of FIG. 1A according to the present invention, each user terminal 10 divides a communication sequence into the authentication phase and the IP communication phase, uses a PPP which runs over a Layer 2 infrastructure, such as PPPoE, in the authentication phase, and transmits or receives IP packets in the IP communication phase by using an IP protocol which runs over the Layer 2 infrastructure, such as the IPoE (IP over Ethernet). That is, the IP packets transmitted or received by each user terminal 10 are not encapsulated in accordance with PPP, as illustrated in the lower portion of FIG. 1B.

In each subscriber-side edge switch 20, the network-side session management unit 21 performs a signaling control operation when the subscriber-side edge switch 20 receives a management frame. When the subscriber-side edge switch 20 receives a main-signal frame transferred from one of the at least one user terminal 10, the first transfer control unit 22 attaches to the main-signal frame a tag uniquely indicating a virtual private network, and transfers the main-signal frame to one of the at least one service provider 50. In addition, when the subscriber-side edge switch 20 receives a main-signal frame transferred from one of the at least one service provider 50, the first transfer control unit 22 removes a tag attached to the main-signal frame, and transfers the main-signal frame to one of the at least one user terminal 10.

Each provider-side edge switch 30 has at least one xSP-side output port each corresponding to a tag. The second transfer control unit 31 outputs a main-signal frame through one of the at least one xSP-side output port corresponding to a tag attached to the main-signal frame. The provider-side edge switch 30 also has at least one xSP-side input port. The third transfer control unit 32 receives a main-signal frame from one of the at least one service provider 50 through one of the at least one xSP-side input port, recognizes the service provider based on the one of the at least one xSP-side input port, adds a tag corresponding to the service provider to the main-signal frame, and transfers the main-signal frame toward one of the at least one user terminal 10. In practice, one or more xSP-side port can be used as one or more access-network-side ports, and vice versa.

When each core switch 40 receives a main-signal frame, the tag reference unit 41 refers to a tag attached to the main-signal frame, and the core-switching transfer unit 42 transfers the main-signal frame in Layer 2 based on the tag.

(2) Operation of Present Invention

Details of the operations of the communication system 1 of FIG. 1 are explained below in comparison with the conventional VPN system using PPPoE.

As described before, in the conventional VPN system, user authentication, IP address assignment, and IP data (packet) transmission are performed in accordance with PPP. The mechanisms of the user authentication and the IP address assignment are essential for switching of a connection to an xSP. Although the necessity of the user authentication is obvious, the IP address assignment is also necessary because the IP subnet changes when the xSP is switched. The assignment of a subnet ID is essential even in the IPv6 system. However, the encapsulation of IP data (packets) in accordance with PPP is not essential when the access network can confirm that the user of the IP data is correctly authenticated, and the IP data can be appropriately transferred through the access network to a desired xSP.

Therefore, according to the present invention, PPPoE is used for only signaling, and IP data (main signals) are transmitted or received by using IPoE without encapsulation in accordance with PPP. That is, when each of the at least one user terminal 10 communicates with a service provider, the user terminal 10 divides a communication sequence into an authentication phase and an IP communication phase, and processing in the authentication phase and the IP communication phase are performed by transmitting and receiving management frames and main-signal frames, respectively, in Layer 2.

In practice, first, in the authentication phase, each user terminal 10 initiates a call by using a management frame in accordance with PPPoE, and user authentication and negotiation for IP address assignment are performed. Thereafter, in the IP communication phase, the user terminal 10 transmits IP data in a main-signal frame having an IPoE form and containing an assigned IP address.

The session (connection) between each user terminal 10 and one of the at least one subscriber-side edge switch 20 in the access network 6 to which the user terminal 10 is connected is maintained by using the PPPoE mechanism. For example, processing for confirmation and termination of connection is performed in accordance with PPPoE, where the "Echo-Request" and "Echo-Reply" frames in LCP are exchanged for confirmation of connection, and the "Terminate-Request" and "Terminate-Ack" frames in LCP are exchanged for termination of connection.

In the access network 6, the subscriber-side edge switch 20 to which one of the at least one user terminal 10 is connected manages the session with the user terminal based on a source MAC (Media Access Control) address since a management frame in accordance with PPPoE and a main-signal frame in accordance with IPoE (i.e., an IPoE frame) have the same source MAC address as a Layer 2 address when the management frame and the main-signal frame are transmitted from the same Ethernet interface.

In addition, when the authentication phase is completed, the subscriber-side edge switch 20 memorizes as address mapping information a correspondence (mapping) between the source MAC address (the MAC address of the user terminal 10) and the service provider to which the user terminal 10 is connected, where the service provider is recognized based on the name of the service provider extracted from the information "user-name@provider-name". Thus, the subscriber-side edge switch 20 can recognize the service provider to which the user terminal 10 is connected, based on the source MAC address, and transfer the main-signal frame based on the recognition of the service provider. Since each session is identified based on a MAC address, the subscriber-side edge switch 20 can appropriately manage each session even when a plurality of user terminals are connected to each port of the subscriber-side edge switch 20.

In the above operations, the VLAN (virtual LAN) technology is utilized. According to the VLAN technology, an extent to which each input frame can be transferred is determined as a logical network regardless of its physical configuration. When the VLAN function is used, groups to which sources of input frames belong can be identified, and each input frame can be transferred to only terminals which belong to the same group as the source of the input frame.

Although VLANs can be classified into a plurality of types depending on their manners of identification control, the technology of the so-called MAC address-based VLAN is used in an embodiment of the present invention. In the MAC address-based VLAN, the source of each input frame is identified based on the source MAC address. While the users' MAC addresses are statically registered in the conventional MAC address-based VLANs, address mapping information indicating correspondences (mappings) between MAC addresses and VLANs are dynamically switched by registration in a table based on the name of the service provider to which each user terminal is connected, according to the present invention. The name of the service provider is extracted in the authentication phase, as explained later.

Further, the subscriber-side edge switch 20 attaches a tag corresponding to a service provider to each main-signal frame (IPoE frame) received from a user terminal, and transfers the main-signal frame through the access network 6. The tag reference unit 41 in each core switch 40 in the access network 6 refers to the tag, and recognizes the service provider to which the user terminal is connected. Then, the core switching unit 42 transfers the main-signal frame in the manner of MAC bridging transfer in Layer 2 without reference to Layer 3 information.

For example, the VLAN-Tag technique according to IEEE 802.1Q may be used for the above tagging for identifying a service provider. According to the VLAN-Tag technique, four-byte tags called VLAN-Tags are added to respective frames so that groups to which destinations of the respective frames belong can be identified based on the VLAN-Tags. Alternatively, the above tags may be originally defined so that a service provider to which each input frame having a tag is to be transferred can be recognized based on the tag.

As described above, according to the present invention, signaling processing is performed between the user terminal 10 and the subscriber-side edge switch 20 connected to the user terminal 10, and thereafter main-signal frames (IP data), which are not encapsulated in accordance with PPPoE, are transferred through the access network 6 in Layer 2 by switching based on the tag. Therefore, the processing can be dispersed in the communication system 1, and thus the B-RAS 610, in which the processing concentrates in the conventional system, becomes unnecessary. Consequently, it becomes possible to construct a more flexible and expandable network than the conventional system, and improve the quality of communication service.

In addition, the above functions of each subscriber-side edge switch can be realized by extending the functions of the conventional L2 switches (Ether switches), which are less expensive than the routers or the like which perform Layer 3 processing. Therefore, the communication system according to the present invention can be constructed at low cost.

Further, since the main-signal frames are transferred by MAC bridging, the address learning operation can be automatically performed, and an IP address is not required to be assigned to each interface. Therefore, the administration cost can be reduced.

Furthermore, the operation of managing each session with a user terminal can be performed by the subscriber-side edge switch (or a communication control server, which is explained later) even when the user terminal is connected to a plurality of different service providers.

When only one user terminal is connected to each subscriber-side port of the L2 switch realizing the subscriber-side edge switch, it is not necessary to use the technology of the (dynamic) MAC address-based VLAN. Instead, the technology of the (dynamic) port-based VLAN can be used. In this case, a correspondence (mapping) between each input port and a VPN connected to the input port is memorized as address mapping information after completion of the authentication phase.

In addition to the above advantages, the IP fragment processing is unnecessary in the communication system 1 according to the present invention, as explained below.

The maximum transfer unit (MTU) of each IP packet in accordance with IPoE is 1,500 bytes. Since IP packet are encapsulated in accordance with PPP in the conventional system in accordance with PPPoE, overhead of eight bytes is necessary. Therefore, the maximum transfer unit (MTU) of the IP packet encapsulated in a PPPoE packet is required to be shortened by eight bytes.

In the conventional system, the maximum transfer unit (MTU) in the upstream transmission from each user terminal is determined to be 1,492 bytes by negotiation in accordance with LCP so as to avoid the fragment processing.

However, sometimes frames transmitted downstream from a service provider may have a length of 1,500 bytes. In this case, the B-RAS 610 or a router located on the service provider side is required to perform fragment processing on IP packets in order to encapsulate the IP packets in accordance with PPPoE.

The fragment processing imposes heavy load on the system. Therefore, if the B-RAS 610 performs fragment processing as well as the aforementioned processing which concentrates in the B-RAS 610, the efficiency of the system is further lowered. If a Don't Fragment flag is set, each IP packet which cannot be encapsulated is discarded, and therefore the reliability of FIG. 2A is a diagram illustrating a format of an IP data frame in accordance with IEEE 802.3 before the extensions to support VLAN tagging are made. The frame format of FIG. 2A includes an Ether header of 14 bytes, an IP packet of at most 1,500 bytes, and a frame check sequence (FCS) of 4 bytes. That is, the maximum transfer unit (MTU) of the IP packet is 1,500 bytes, and the maximum transfer unit (MTU) of the frame format of FIG. 2A is 1,518 bytes.

Figure 2B:
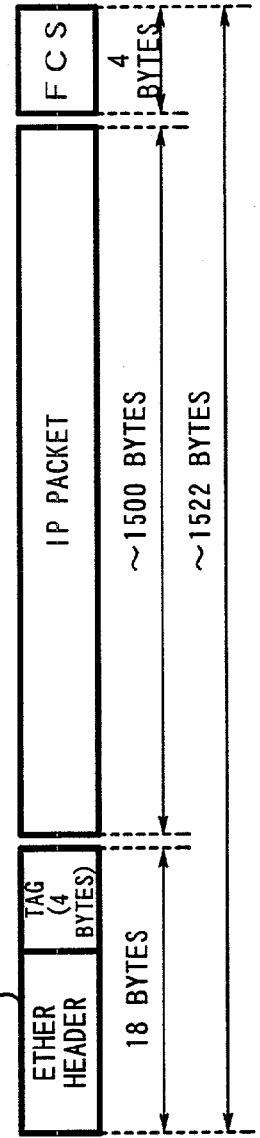
FIG. 2B is a diagram illustrating a format of an IP data frame in accordance with IEEE 802.3ac (1998) in which the extensions to support VLAN tagging are defined.

FIG. 2B is a diagram illustrating a format of an IP data frame in accordance with IEEE 802.3ac (1998) in which the extensions to support VLAN tagging are defined. The frame format of FIG. 2B includes an additional field of 4 bytes, which is inserted following the Ether header of 14 bytes. In the additional field of 4 bytes, the VLAN-Tag defined in IEEE 802.1Q is inserted. Thus, the maximum transfer unit (MTU) of the frame format of FIG. 2B becomes 1,522 bytes. For example, the main-signal frame to which the aforementioned tag is attached has the format of FIG. 2B. That is, the tag of 4 bytes can be attached to the main-signal frame so that the maximum transfer unit (MTU) of the IP packet remains to be 1,500 bytes. Therefore, according to the present invention, the fragment processing is unnecessary, and efficient transmission control is enabled.

Figure 2C:
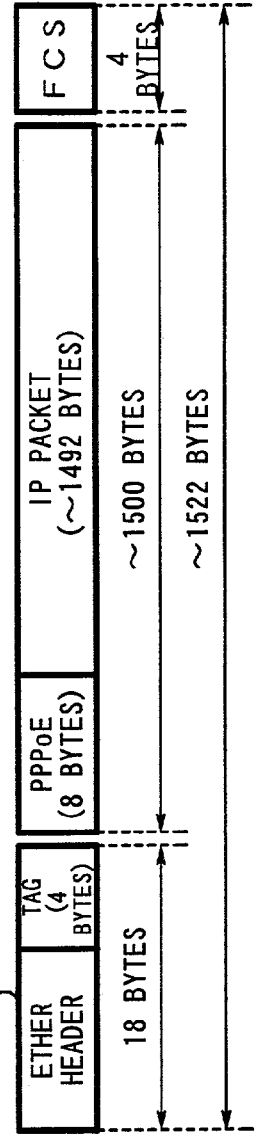
FIG. 2C is a diagram illustrating a format of an IP data frame in accordance with IEEE 802.3ac in which the IP data is encapsulated in accordance with PPPoE.

FIG. 2C is a diagram illustrating a format of an IP data frame in accordance with IEEE 802.3ac in which the IP data is encapsulated in accordance with PPPoE. As illustrated in FIG. 2C, when the IP data is encapsulated in accordance with PPPoE, the overhead of 8 bytes is included in the payload portion of 1,500 bytes even in the extended frame format according to IEEE 802.3ac. Therefore, the maximum transfer unit (MTU) of the IP packet is reduced to 1,492 bytes. That is, when the IP packet is transmitted in accordance with PPPoE, there is a possibility that the fragment processing is required.

(3) Concrete Construction and Operation

Figure 3:
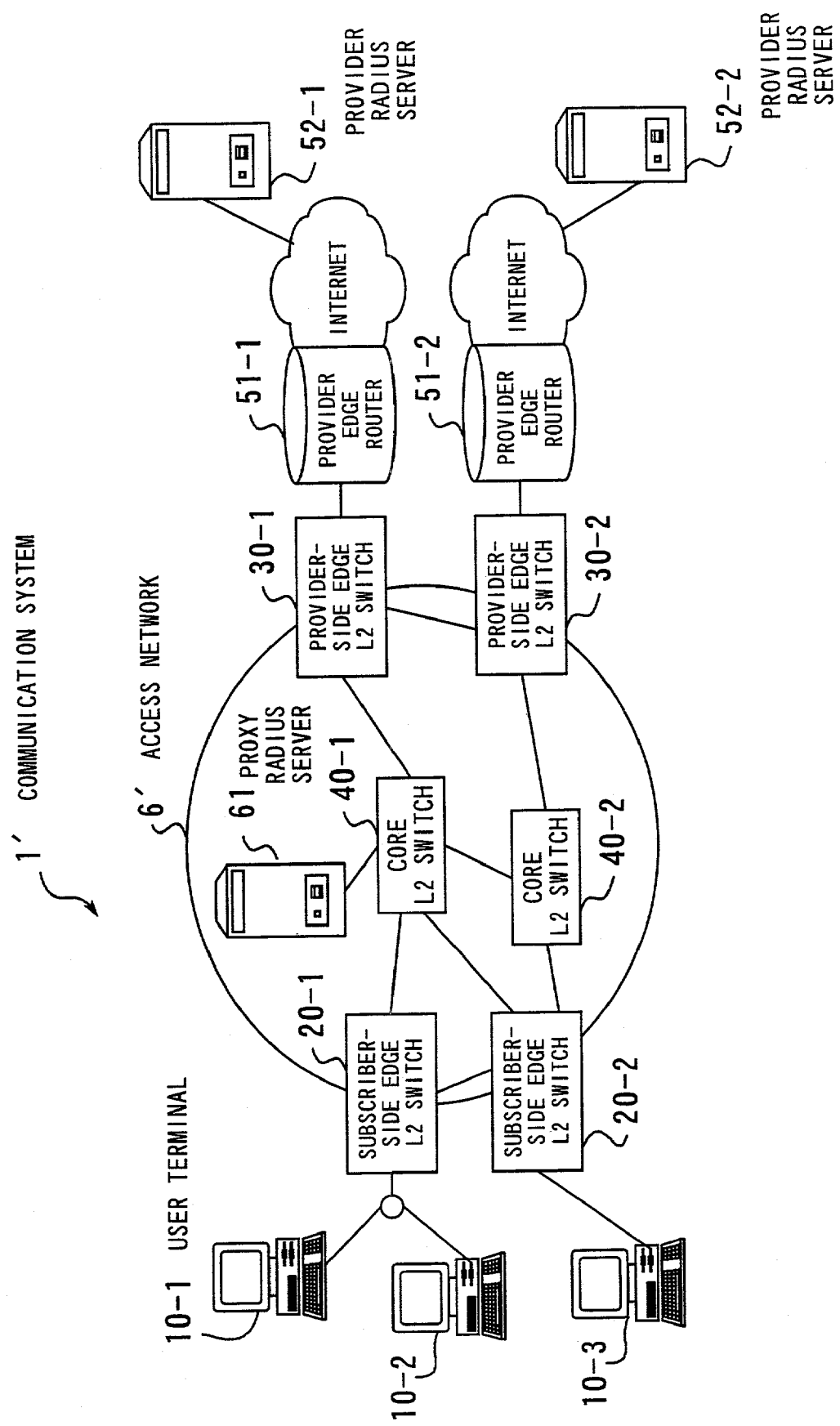
FIG. 3 is a diagram illustrating an example of a concrete construction of the communication system 1 according to the present invention.

An example of a concrete construction of the communication system 1 is explained below with reference to FIG. 3, which is a diagram illustrating an example of a concrete construction of the communication system 1 according to the present invention. In FIG. 3, reference numeral 1' denotes a communication system, 6' denotes an access network, 10-1, 10-2, and 10-3 each denote a user terminal, 20-1 and 20-2 each denote a subscriber-side edge L2 (Layer 2) switch, 30-1 and 30-2 each denote a provider-side edge L2 switch, 40-1 and 40-2 each denote a core L2 switch, 51-1 and 51-2 each denote a provider edge router, 52-1 and 52-2 each denote a provider server, and 61 denotes a proxy Radius server. In FIG. 3, only representative elements are indicated. That is, the communication system 1' of FIG. 3 may include additional user terminals, subscriber-side edge L2 switches, core switches, provider-side edge L2 switches, provider edge routers, and provider server which are not illustrated in FIG. 3.

The subscriber-side edge L2 switches 20-1 and 20-2 are arranged at the user-terminal-side edge of the access network 6', the provider-side edge L2 switches 30-1 and 30-2 are arranged at the service-provider-side edge of the access network 6', the core L2 switches 40-1 and 40-2 are arranged between the subscriber-side edge L2 switches 20-1 and 20-2 and the provider-side edge L2 switches 30-1 and 30-2.

In the example of FIG. 3, the proxy Radius server 61 corresponds to the aforementioned communication control server, and is connected to the core L2 switch 40-1, the user terminals 10-1 and 10-2 are connected to the subscriber-side edge L2 switch 20-1, and the user terminal 10-3 is connected to the subscriber-side edge L2 switch 20-2. In addition, the provider-side edge L2 switches 30-1 and 30-2 are respectively connected to the provider edge routers 51-1 and 51-2, and the provider edge routers 51-1 and 51-2 are respectively connected to the provider Radius servers 51-1 and 51-2.

The Radius protocol is a typical protocol which is used for implementing an authentication mechanism in a network, and described in RFC 2865. Servers having the functions in accordance with the Radius protocol are called Radius servers, and clients having the functions in accordance with the Radius protocol are called Radius clients.

FIG. 4 is a diagram illustrating a format of a main-signal frame which is transmitted from each of the user terminals 10-1, 10-2, and 10-3 after the authentication phase. The "DESTINATION ADDR" field of 6 bytes, the "SOURCE ADDR" field of 6 bytes, and the "ETHER TYPE" field of 2 bytes in the frame format of FIG. 4 correspond to the Ether header of 14 bytes in the frame format of FIG. 2B, and the other fields in the frame format of FIG. 4 are contained in the IP packet in the frame format of FIG. 2B.

The "ETHER TYPE" field indicates a frame type. When the "ETHER TYPE" field indicates "0x0800", the frame having the format of FIG. 4 is a main-signal frame. When the "ETHER TYPE" field indicates "0x8863", the frame having the format of FIG. 4 is a management frame for a PPPoE discovery stage. When the "ETHER TYPE" field indicates "0x8864", the frame having the format of FIG. 4 is a management frame for a PPP session stage.

When one of the subscriber-side edge L2 switches 20-1 and 20-2 receives a main-signal frame as above after the authentication phase, the subscriber-side edge L2 switch recognizes a service provider to which the user terminal is connected, based on a source MAC address indicated in the above "SOURCE ADDR" field, attaches a tag to the main-signal frame, and transfers the main-signal frame toward the service provider through the access network 6'. When the subscriber-side edge L2 switch does not have address mapping information indicating a correspondence (mapping) between the source MAC address and a service provider, the subscriber-side edge L2 switch discards the main-signal frame. Thus, it is possible to avoid unauthorized access by a user who is not authenticated.

FIG. 5 is a diagram illustrating a format of a main-signal frame to which a tag is attached. The "TPID" field of 2 bytes, the "PRI" field of 3 bits, the "CFI" field of 1 bit, and the "VID" field of 12 bits in the frame format of FIG. 5 correspond to the VLAN-Tag in accordance with IEEE 802.1Q in the frame format of FIG. 2B, and the other fields in the frame format of FIG. 5 are identical to the frame format of FIG. 4.

When the "ETHER TYPE" field indicates "0x0800", and the "TPID" field indicates "0x8100", the frame having the format of FIG. 5 is a main-signal frame to which a tag is attached, and a virtual private network can be identified based on the tag.

When a main-signal frame to which a tag is attached is transferred to one of the provider-side edge L2 switches 30-1 and 30-2 through switching by the core L2 switches 40-1 and 40-2, the provider-side edge L2 switch removes the tag from the main-signal frame, and transfers the main-signal frame to one of the provider edge routers 51-1 and 51-2 connected to a designated service provider indicated by the tag.

On the other hand, when a main-signal frame is transferred downstream from a service provider to one of the provider-side edge L2 switches 30-1 and 30-2, the provider-side edge L2 switch attaches to the main-signal frame a tag including the "VID" field and corresponding to a port through which the provider-side edge L2 switch receives the main-signal frame, in accordance with the port-based VLAN technology, as explained later. Then, the provider-side edge L2 switch transfers the main-signal frame toward a user terminal through the access network 6'.

As described above, according to the present invention, it is possible to securely transfer in Layer 2 an IP packet to a desired service provider. In addition, when the "ETHER TYPE" field in a frame indicates that the frame is a main-signal frame, the main-signal frame is transferred without reference to the Layer 3 information. Therefore, it is unnecessary to modify apparatuses in the access network 6' even when the internet protocol is changed to IPv6. In the IPv6 system, the "ETHER TYPE" field of each main-signal frame indicates "0x86DD".

The communication system having the construction as illustrated in FIG. 3 can be constructed by making a small change to the existing communication system. When the communication system 1' of FIG. 3 is arranged so that a Radius client is installed in the subscriber-side edge L2 switches 20-1 and 20-2, and the proxy Radius server 61 arranged in the access network 6' temporarily collects information on authentication, and transfers the information on authentication to the provider Radius servers 52-1 and 52-2, the provider edge routers 51-1 and 51-2 and the provider Radius servers 52-1 and 52-2 can be utilized with a small change in their setting, databases, and administration.

Each of the core L2 switches 40-1 and 40-2 is required to have the function of only the MAC bridging transfer based on the tags. Therefore, when the VLAN-Tag in accordance with IEEE 802.1Q is used, the commercially available switches compatible with IEEE 802.1Q can be used as the core L2 switches 40-1 and 40-2. Thus, the construction of the communication system of FIG. 3 is easy.

Although PPPoE is used as a signaling mechanism in the embodiment described above, other signaling mechanisms can be used within the scope of the present invention. For example, when user-based (MAC address-based) authentication is realized by using the port-based authentication in accordance with IEEE 802.1X as described below, and operations of IP address assignment and release are appropriately performed in close liaison with a DHCP (Dynamic Host Configuration Protocol) server, a signaling mechanism as an alternative to the PPPoE signaling can be realized.

Since IEEE 802.1X ("Port Based Network Access Control") specifies a protocol for port-based access control on the Ethernet, the protocol in accordance with IEEE 802.1X cannot be used in configurations in which a plurality of terminals are connected to a port. However, each terminal can be identified based on its source MAC address during negotiation. Therefore, user-based (MAC address-based) access control can be realized by using the port-based authentication in accordance with the IEEE 802.1X even in the configurations in which a plurality of terminals are connected to a port.

In addition, since IEEE 802.1X does not provide a mechanism for IP address assignment, IP addresses are assigned by using another protocol such as DHCP. DHCP has a tendency to continuously use a leased IP address. Therefore, when DHCP is used in the communication system according to the present invention, it is necessary to recognize an IP address assigned to each user, and appropriately release the IP address when connection to a service provider is switched.

(4) Operation in Authentication Phase

Figure 6:
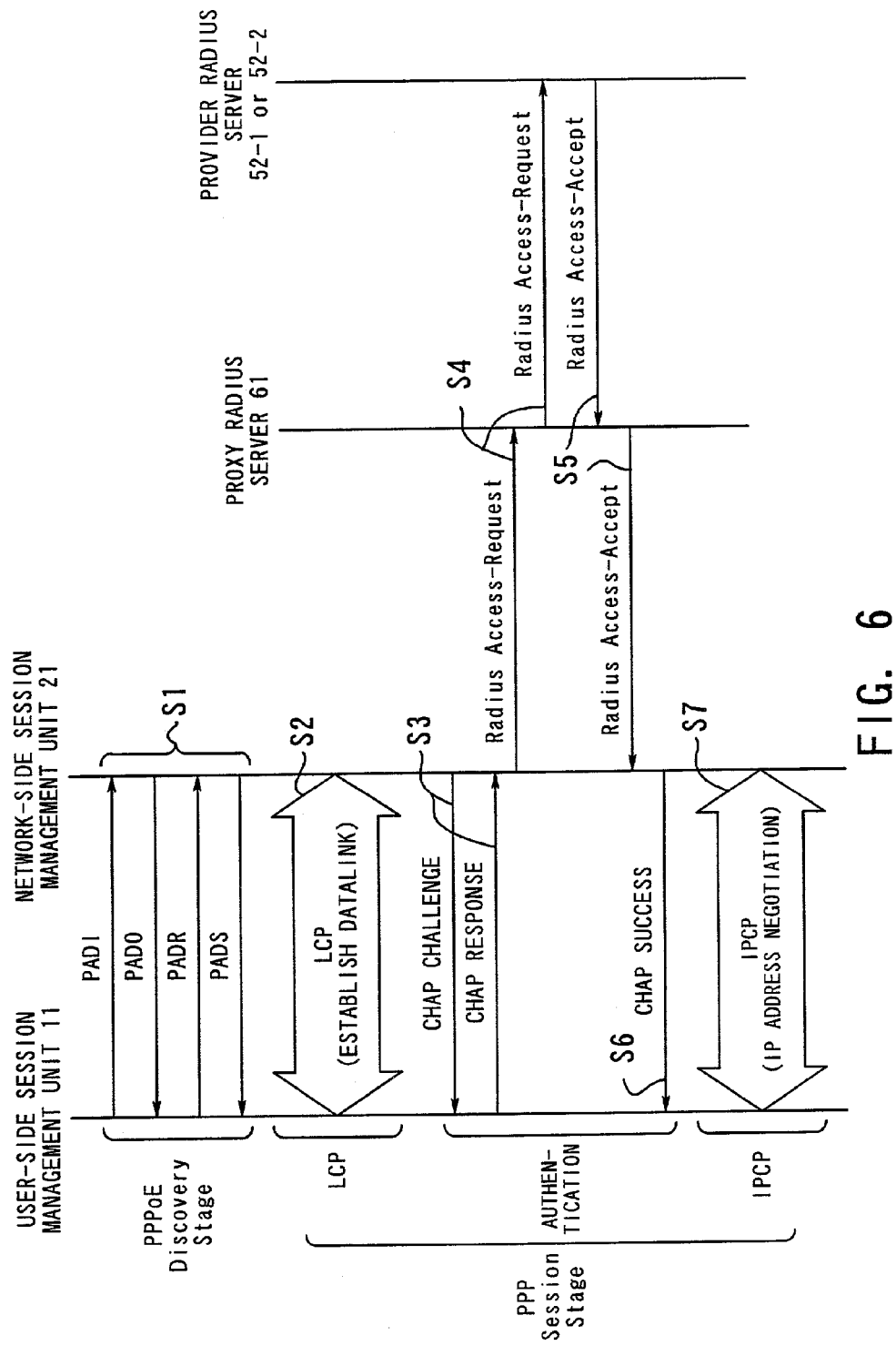
FIG. 6 is a diagram illustrating a sequence of operations performed in the authentication phase in the case where PPPoE is used, and the proxy Radius server 61 relays information on authentication.

A sequence of operations performed in the authentication phase is explained below with reference to FIG. 6, which is a diagram illustrating a sequence of operations performed in the authentication phase in the case where PPPoE is used, and the proxy Radius server 61 relays information on authentication. (Details of the proxy Radius server 61 are explained later, and the sequence of the IP communication phase is also explained later with reference to FIGS. 33 and 34.)

The PPPoE sequence in the authentication phase can be roughly divided into the PPPoE discovery stage and the PPP session stage, and the operations in the authentication phase are controlled by the user-side session management unit 11 in each user terminal 10 and the network-side session management unit 21 in each subscriber-side edge switch 20.

In step S1, frames, "PADI (PPPoE Active Discovery Initiation)", "PADO (PPPoE Active Discovery Offer)", and "PADR (PPPoE Active Discovery Request)" are exchanged between the user-side session management unit 11 in one of the user terminals 10-1, 10-2, and 10-3 and the network-side session management unit 21 in one of the subscriber-side edge L2 switches 20-1 and 20-2. Then, the user-side session management unit 11 receives a "PADS (PPPoE Active Discovery Session-confirmation)" frame. Thus, a session ID is determined.

In step S2, a datalink is established in accordance with LCP.

In step S3, the network-side session management unit 21 sends a "CHAP (Challenge Handshake Authentication Protocol) CHALLENGE" frame to the user-side session management unit 11, and the user-side session management unit 11 returns a "CHAP RESPONSE" frame to the network-side session management unit 21, where the "CHAP RESPONSE" frame contains information "user-name@provider-name" and a password. The CHAP protocol is an authentication protocol in which a password is encrypted, and the encrypted password is transmitted to a network.

In step S4, the network-side session management unit 21 sends a "Radius Access-Request" frame to the proxy Radius server 61, where the "Radius Access-Request" frame contains the information "user-name@provider-name", the password, the "CHAP CHALLENGE" frame, and the like. Then, the proxy Radius server 61 transfers the "Radius Access-Request" frame to one of the provider Radius servers 52-1 and 52-2.

In step 5, when authentication by the provider Radius server succeeds, the proxy Radius server sends a "Radius Access-Accept" frame to the proxy Radius server 61, where the "Radius Access-Accept" frame contains an IP address to be assigned to the user, an IP address of the service provider to which the user is connected, and the like. The proxy Radius server 61 transfers the "Radius Access-Accept" frame to the network-side session management unit 21.

In step S6, when the subscriber-side edge L2 switch receives the "Radius Access-Accept" frame, the network-side session management unit 21 sends a "CHAP SUCCESS" frame to the user-side session management unit 11.

In step S7, IP address negotiation is performed between the user-side session management unit 11 and the network-side session management unit 21 in accordance with IPCP based on the values received with the "Radius Access-Accept" frame. When the IP address negotiation is completed, the operation goes to the IP communication phase.

(5) Subscriber-side Edge L2 Switch

The subscriber-side edge L2 switch 20-1 or 20-2 is explained below with reference to FIGS. 7 to 10. FIGS. 7 to 10 illustrate tables which each subscriber-side edge L2 switch has.

FIG. 7 is a diagram illustrating a session management table T2a which indicates correspondences (mappings) between source MAC addresses and session IDs of users. Specifically, the session management table T2a contains information items (columns) "SOURCE MAC ADDRESS" (user's MAC address), "SESSION ID", "STATUS", and "NEGOTIATION PARAMETER". The session management table T2a is referred to in the authentication phase.

The information item "SESSION ID" has a size of 2 bytes, and contains the session ID which is determined in the PPPoE discovery stage in the authentication phase as explained with reference to FIG. 6. The information item "STATUS" indicates the current status, i.e., whether the operation is in the authentication phase or in the IP communication phase. The information item "NEGOTIATION PARAMETER" indicates a VLAN-ID, an IP address assigned to each user, an IP address of a service provider, and the like. The contents of the information item "NEGOTIATION PARAMETER" are not registered in advance in each subscriber-side edge L2 switch for each user. For example, the IP address assigned to each user is designated by each service provider, and the VLAN-ID is designated by the communication control server, which controls information on VLAN-IDs in a centralized manner. Each of the VLAN-IDs uniquely indicates a virtual private network, and contained in the aforementioned tag attached to each main-signal frame. The VLAN-IDs are also referred to as VIDs.

FIG. 8 is a diagram illustrating a VID table T2b which indicates correspondences (mappings) between the source MAC addresses of the users and tags (VLAN-IDs) corresponding to service providers to which the user terminals are connected. Specifically, the VID table T2b contains information items (columns) "SOURCE MAC ADDRESS", "SESSION ID", and "VLAN-ID". The VID table T2b is referred to in the IP communication phase.

Hereinafter, each VID table T2b used by a subscriber-side edge L2 switch is referred to as a MAC-VID table, while each VID table used by a provider-side edge L2 switch is referred to as a port-VID table. Although the session management table T2a and the VID table T2b are separately indicated in FIGS. 7 and 8, the session management table T2a and the MAC-VID table T2b may be realized by a table.

Figure 9:
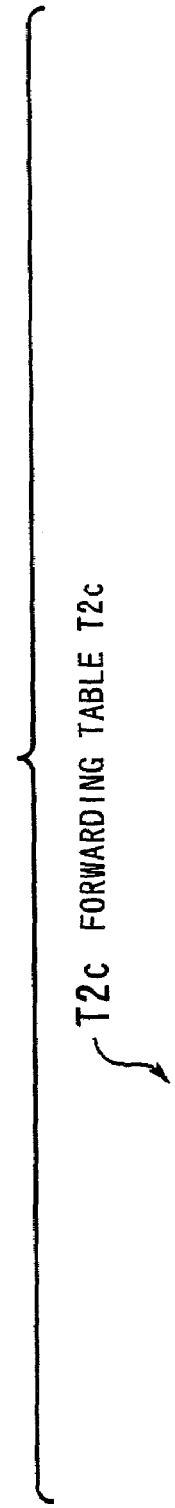
FIG. 9 is a diagram illustrating forwarding tables T2c each of which indicates forwarding (transfer) information corresponding to a service provider (i.e., corresponding to a value of the VLAN-ID)

FIG. 9 is a diagram illustrating forwarding tables T2c each of which indicates forwarding (transfer) information corresponding to a service provider (i.e., corresponding to a value of the VLAN-ID). Specifically, each forwarding table T2c contains information items (columns) "DESTINATION MAC ADDRESS" and "OUTPUT PORT". The information item "OUTPUT PORT" indicates an output port of each subscriber-side edge L2 switch corresponding to each destination MAC address. The contents of each entry of the forwarding tables T2c are added and removed by address learning and aging.

Since the forwarding tables T2c are separately provided for the respective service providers (i.e., VLAN-IDs), it is possible to prevent transfer from an identical destination MAC address to different service providers, and suppress unnecessary table search operations.

FIG. 10 is a diagram illustrating a port attribute table T2d which indicates attributes of each port of the subscriber-side edge L2 switch. Specifically, each forwarding table T2d contains information items (columns) "PORT NUMBER", "RECEPTION FRAME", "BROADCAST FILTERING", and "TAGGED/UNTAGGED", where the information item "RECEPTION FRAME" indicates one or more acceptable types of input frame, the information item "BROADCAST FILTERING" indicates whether a broadcast frame or a flooded frame is to be output (filtering is to be "OFF") or not to be output (filtering is to be "ON") through the port, the information item "TAGGED/UNTAGGED" indicates whether a frame output through the port is to be tagged or untagged.

When a subscriber-side edge L2 switch receives a frame through a port, the subscriber-side edge L2 switch refers to the information item "RECEPTION FRAME" in order to determine whether or not the received frame is acceptable. When the subscriber-side edge L2 switch outputs a frame through a port, the subscriber-side edge L2 switch refers to the information items (columns) "BROADCAST FILTERING" and "TAG/UNTAG" in order to determine in what kind of form the frame is to be output.

In the example of FIG. 10, the ports Nos. 1 to 4 are connected to user terminals, and the ports Nos. 5 to 7 are connected to the access network 6'. For example, the information item "RECEPTION FRAME" for the port No. 1 indicates that a frame input through the port No. 1 is acceptable when the input frame is in accordance with one of the protocols PPPoE, IP, and ARP (Address Resolution Protocol). The ARP protocol is explained later. On the other hand, the information item "RECEPTION FRAME" for the port No. 5 indicates that a frame input through the port No. 5 is acceptable when the input frame is in accordance with one of the protocols IEEE 802.1Q, GVRP, and STP. The frame in accordance with IEEE 802.1Q is a tagged frame as explained before.

GVRP is the GARP VLAN Registration Protocol, in which information on a dynamic VLAN configuration on Ethernet is propagated. STP is the Spanning Tree Protocol, which is an Ethernet management protocol operating in Layer 2 so as to prevent formation of undesirable loops with paths of packets. In GVRP or STP, a specific multicast address ("01-80-C2-00-00-21" in GVRP or "01-80-C2-00-00-00" in STP) is used. Therefore, when GVRP or STP is used in the access network 6', it is possible to indicate the information "GVRP" or "STP" in the information item "RECEPTION FRAME" for applicable ports in the port attribute table T2d as illustrated in FIG. 10 so that the applicable ports can accept a frame having a multicast address.

In addition, when the subscriber-side edge L2 switch outputs a frame through the port No. 1, the frame is output to a user terminal. Therefore, the information item "BROADCAST FILTERING" for the port No. 1 is set to "ON", which indicates that the output frame is not to be broadcast, and the information item "TAG/UNTAG" for the port No. 1 is set to "Untag", which indicates that the output frame is to be untagged. On the other hand, when the subscriber-side edge L2 switch outputs a frame through the port No. 5, the frame is output to the access network 6'. Therefore, the information item "BROADCAST FILTERING" for the port No. 5 is set to "OFF", which indicates that the output frame is to be broadcast, and the information item "TAG/UNTAG" for the port No. 5 is set to "With Tag", which indicates that the output frame is to be tagged.

When a service provider has a policy of broadcasting to users, the information item "BROADCAST FILTERING" for the ports connected to the user terminals can be set to "OFF".

Figure 11:
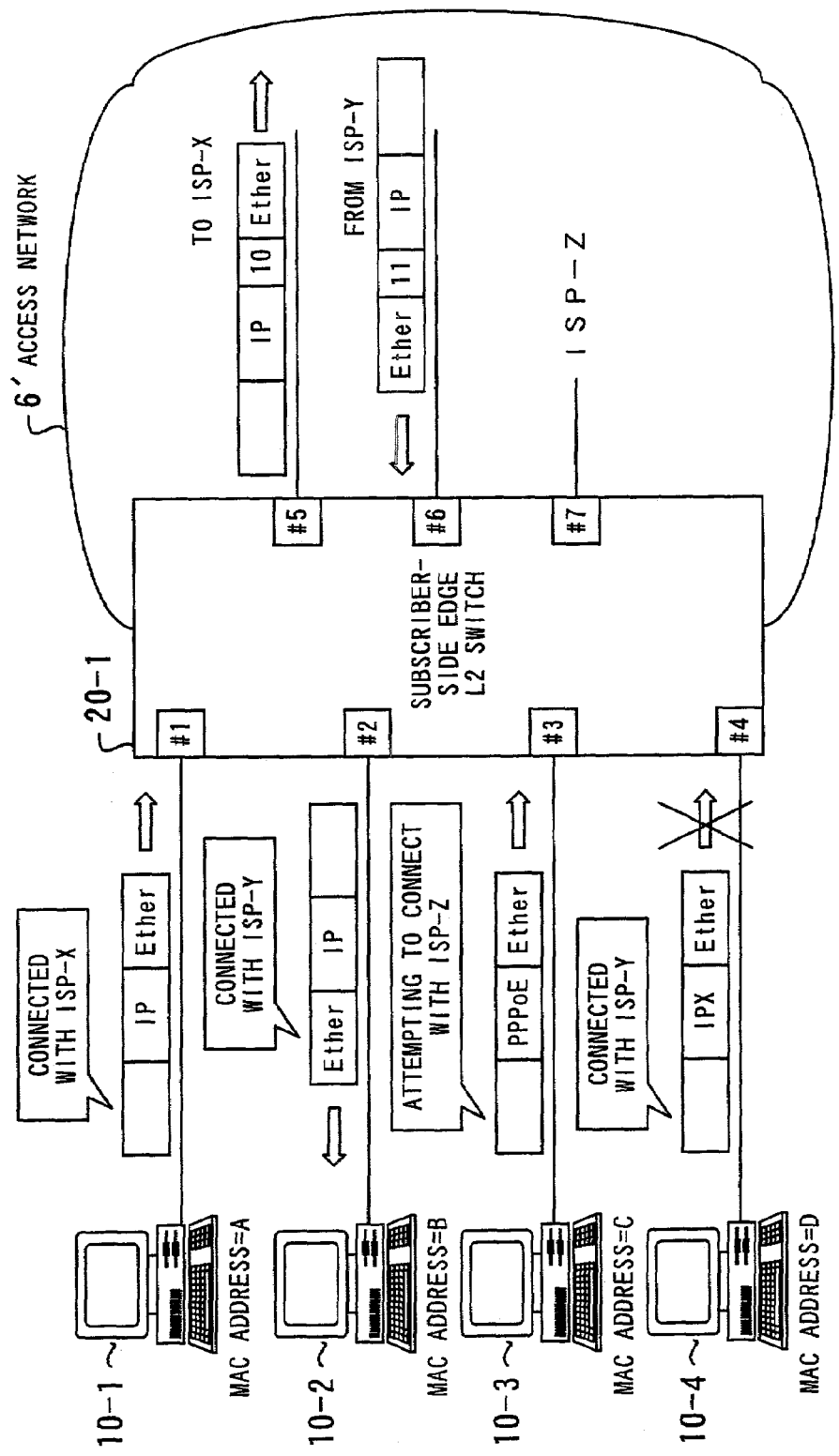
FIG. 11 is an explanatory diagram illustrating examples of operations of the subscriber-side edge L2 switch 20-1 in the access network 6'.

FIG. 11 is an explanatory diagram illustrating examples of operations of the subscriber-side edge L2 switch 20-1 in the access network 6'. In the example of FIG. 11, the ports Nos. 1 to 4 of the subscriber-side edge L2 switch 20-1 are respectively connected to four user terminals 10-1, 10-2, 10-3, and 10-4, and the other ports Nos 5 to 7 are respectively connected to the access network 6'. It is assumed that the MAC addresses of the user terminals 10-1, 10-2, 10-3, and 10-4 are respectively "A", "B", "C", and "D". That is, the configuration of FIG. 11 corresponds to the examples of the contents of the session management table T2a, the VID table T2b, the forwarding tables T2c, and the port attribute table T2d, respectively illustrated in FIGS. 7 to 10.

In the state illustrated in FIG. 11, the user terminal 10-1 is in the IP communication phase, and connected to a service provider ISP-X having a MAC address of "X". When the MAC-VID table T2b of FIG. 8 is referred to, the VLAN-ID corresponding to the MAC address of "A" is "10". In addition, when one of the forwarding tables T2c corresponding to the VLAN-ID "11" is referred to, the output port directed to the service provider ISP-X having the destination MAC address "X" is the port No. 5. Thus, the subscriber-side edge L2 switch attaches a tag indicating VLAN-ID=10 to each main-signal frame transferred from the user terminal 10-1, and outputs the tagged main-signal frame through the port No. 5.

In addition, in the state illustrated in FIG. 11, the user terminal 10-2 is in the IP communication phase, and connected to a service provider ISP-Y having a MAC address of "Y". When the MAC-VID table T2b of FIG. 8 is referred to, the VLAN-ID corresponding to the MAC address of "B" is "11". In addition, when one of the forwarding tables T2c corresponding to the VLAN-ID "11" is referred to, the output port directed to the service provider ISP-Y having the destination MAC address "Y" is the port No. 2. Thus, the subscriber-side edge L2 switch attaches a tag indicating VLAN-ID=11 to each main-signal frame transferred from the user terminal 10-2, and outputs the tagged main-signal frame through the port No. 2.

Further, in the state illustrated in FIG. 11, the user terminal 10-3 is in the authentication phase, and making an attempt to be connected to a service provider ISP-Z having a MAC address of "Z". In the authentication phase, operations for connection are performed in accordance with PPPoE by using the session management table T2a.

Furthermore, in the state illustrated in FIG. 11, the user terminal 10-4 is connected to the service provider ISP-Y having a MAC address of "Y", and is making an attempt to send a frame in accordance with IPX (Internet Packet Exchange). However, the information item "RECEPTION FRAME" for the port No. 4 in the port attribute table T2d does not indicate IPX. Therefore, the subscriber-side edge L2 switch does not accept the frame in accordance with IPX.

Figure 12:
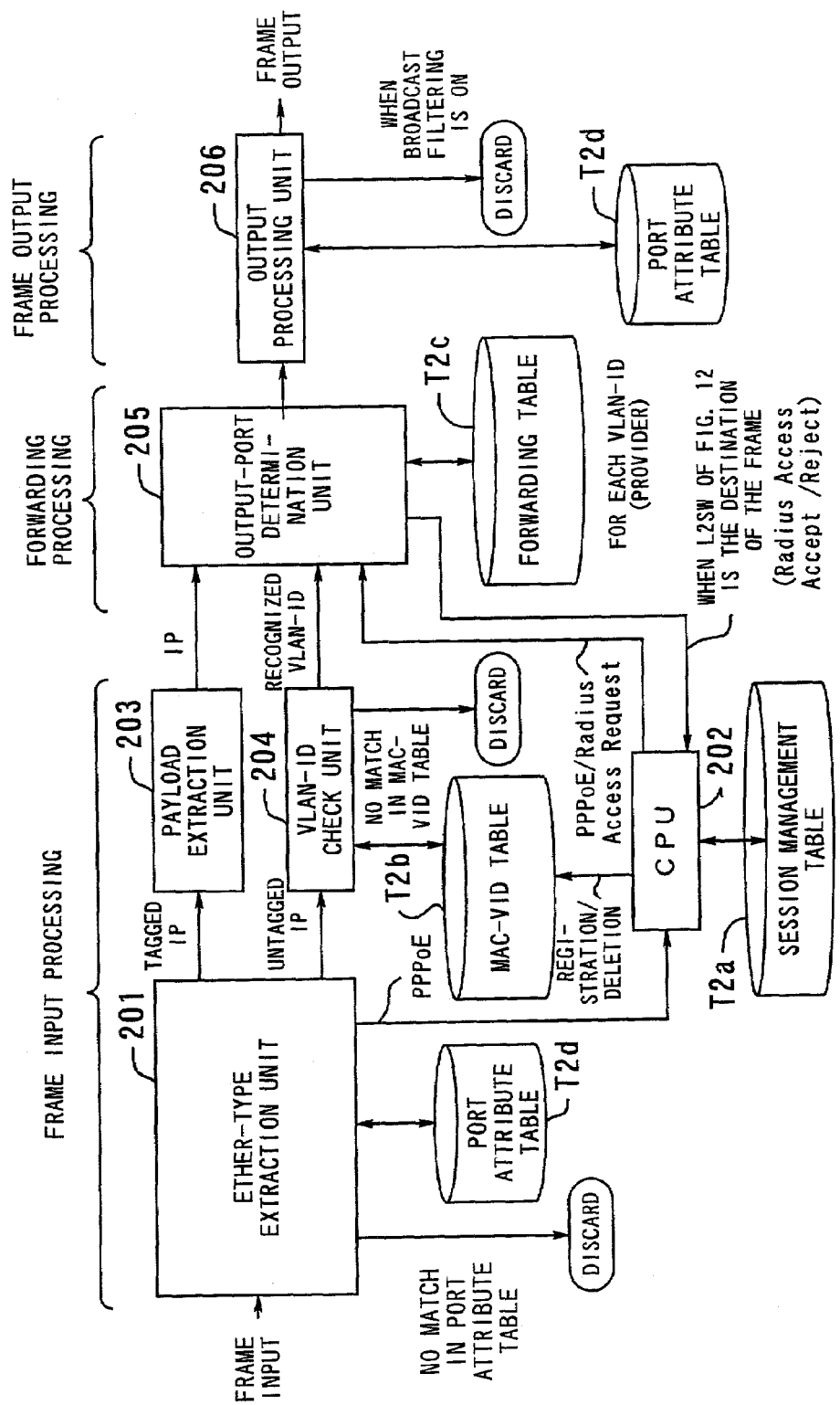
FIG. 12 is a block diagram illustrating functions of each of the subscriber-side edge L2 switches 20-1 and 20-2.

FIG. 12 is a block diagram illustrating functions of each of the subscriber-side edge L2 switches 20-1 and 20-2. The processing performed by each subscriber-side edge L2 switch can be roughly divided into frame input processing, forwarding processing, and frame output processing as illustrated in FIG. 12.

In the frame input processing, when a frame is input into the subscriber-side edge L2 switch, the ether-type extraction unit 201 identifies a frame type, determines whether or not the frame is tagged, based on the contents of the "TPID" field, and refers to the port attribute table T2d in order to determine whether or not the input frame is acceptable. When the subscriber-side edge L2 switch determines that the input frame is not acceptable (e.g., when the input frame is an IPX frame), the subscriber-side edge L2 switch discards the input frame.

When the input frame is a PPPoE frame, the subscriber-side edge L2 switch passes the input frame to the CPU 202 in order to perform PPP negotiation with reference to the session management table T2a, where the negotiation is performed in accordance with the state transition diagram indicated in RFC 1661.

When the authentication phase is completed, and the IP communication phase begins, the CPU 202 registers a MAC address of a user terminal in an entry of the MAC-VID table T2b corresponding to a service provider to which the user terminal is connected. When the IP communication phase is completed, the CPU 202 removes the MAC address of the user terminal from the MAC-VID table T2b.

When a tag in accordance with IEEE 802.1Q is not attached to the input frame, the VLAN-ID check unit 204 extracts a VLAN-ID corresponding to the service provider to which the user terminal is connected, from the MAC-VID table T2b. When the MAC-VID table T2b does not have an entry corresponding to the service provider to which the user terminal is connected, the VLAN-ID check unit 204 determines that the user is not authenticated, and the operation of the user is not in the IP communication phase, and thus the VLAN-ID check unit 204 discards the input frame.

On the other hand, when a tag in accordance with IEEE 802.1Q is attached to the input frame, the VLAN-ID check unit 204 detects a VLAN-ID in the VID field of the input frame, and the payroad extraction unit 203 extracts the contents in the "ETHER TYPE" field of the input frame. When the contents in the "ETHER TYPE" field is "0x0800" or "0x86DD", i.e., when the input frame is a main-signal frame, the input frame is passed to the forwarding processing. When the contents in the "ETHER TYPE" field is "0x0806" or "0x86DD", i.e., when the input frame is an ARP frame, the input frame is passed to the CPU 202.

In the forwarding processing, the output-port determination unit 205 determines an output port with reference to one of the forwarding tables T2c corresponding to the VLAN-ID based on a destination MAC address. At this time, address learning is performed for the source MAC address and the input port. In addition, after the elapse of a predetermined time, address aging is performed.

When the destination MAC address of the input frame is the MAC address of the subscriber-side edge L2 switch (e.g., when the proxy Radius server 61 sends a "Radius Access-Accept" frame to the subscriber-side edge L2 switch), the input frame is passed to the CPU 202.

In the frame output processing, the output processing unit 206 determines whether or not the input frame is to be tagged or untagged, and whether or not a broadcast frame can be output, with reference to the port attribute table T2d. Then, based on the determination with reference to the port attribute table T2d, the output processing unit 206 outputs or discards the input frame, and performs filtering of unicast flooding.

As described above, the subscriber-side edge L2 switch refers to the "ETHER TYPE" field of a received frame in order to determine whether or not the received frame is a management frame or a main-signal frame. When the received frame is a management frame, the received frame is passed to the CPU 202. When the received frame is a main-signal frame, the received frame is processed by hardware. Thus, high-speed IP data transmission is realized.

Figure 13:
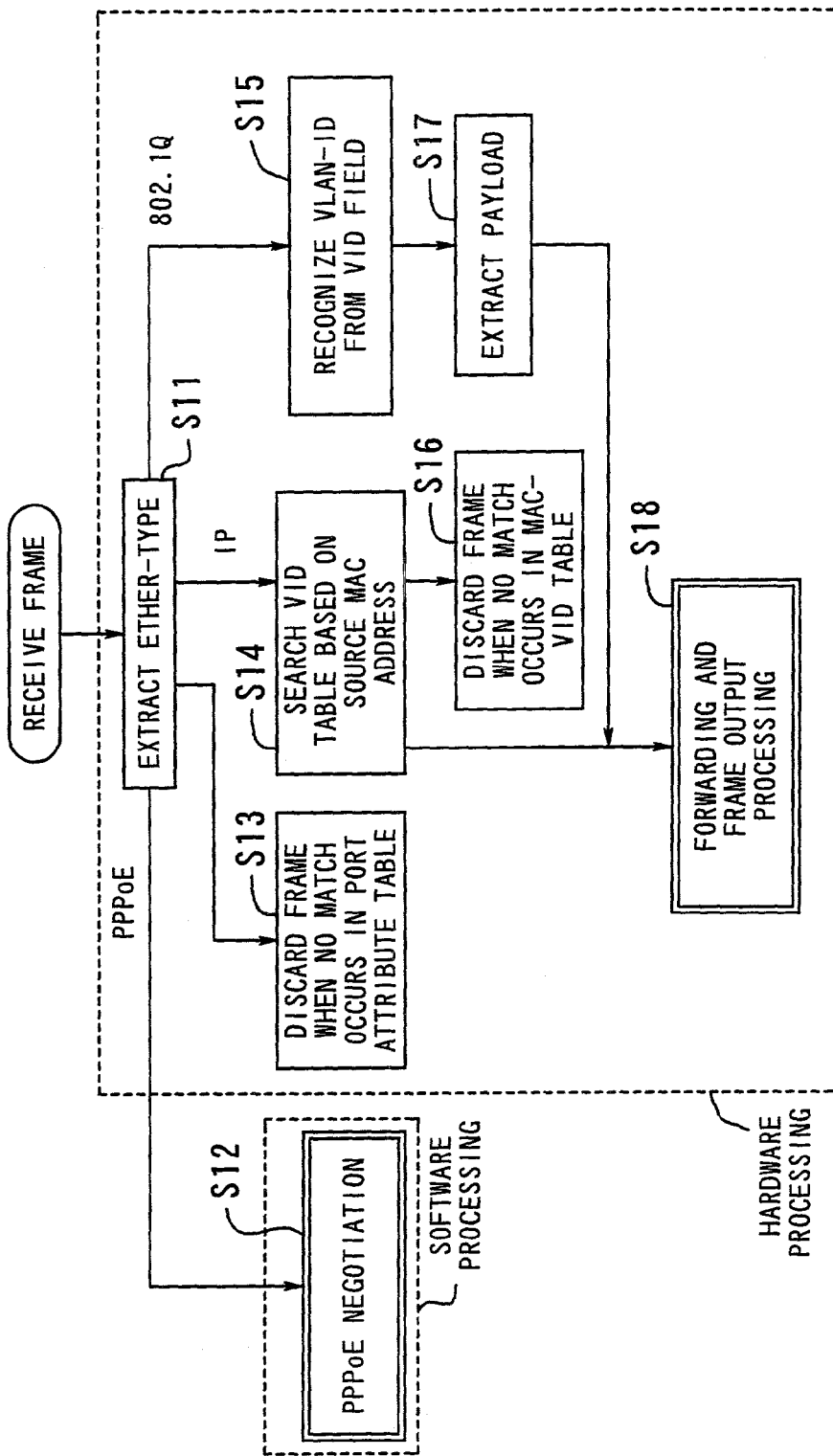
FIG. 13 is a flow diagram indicating the overall operation of each subscriber-side edge L2 switch.

FIG. 13 is a flow diagram indicating the overall operation of each subscriber-side edge L2 switch. In FIG. 13, the operation in step S12 is performed by software, and the operations in steps S11, and S13 to S18 are performed by hardware.

In step S11, the "ETHER TYPE" field of a received frame is extracted. Depending on the value of the "ETHER TYPE" field, the operation goes to one of steps S12 to S15.

In step S12, when the received frame is a PPPoE frame, PPPoE negotiation is performed.

In step S13, when the frame received through a port does not have an attribute indicated for the port in the port attribute table T2d, the received frame is discarded.

In step S14, when the received frame is an IPoE frame, the MAC-VID table T2b is referred to based on a source MAC address included in the received frame. When the MAC-VID table T2b contains an entry corresponding to the source MAC address, the operation goes to step S18. When the MAC-VID table T2b does not contain an entry corresponding to the source MAC address, the operation goes to step S16.

In step S15, when the received frame is tagged, a VLAN-ID in the "VID field is detected.

In step S16, the received frame is discarded.

In step S17, a payroad is extracted.

In step S18, forwarding processing and output processing are performed.

Figure 14:
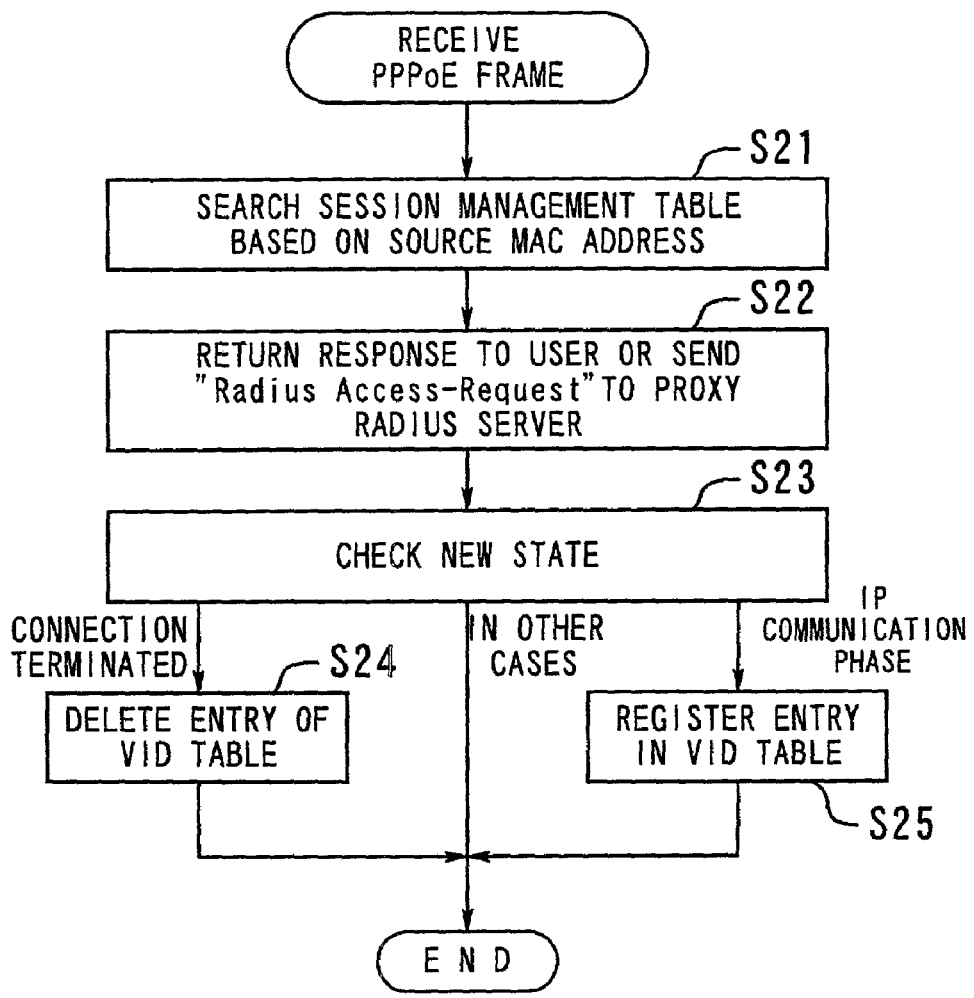
FIG. 14 is a flow diagram indicating operations of the PPPoE negotiation performed by each subscriber-side edge L2 switch.

FIG. 14 is a flow diagram indicating operations of the PPPoE negotiation performed by each subscriber-side edge L2 switch.

In step S21, when the subscriber-side edge L2 switch receives a frame, the session management table T2a is referred to based on a source MAC address included in the received frame.

In step S22, the subscriber-side edge L2 switch returns a response to a user, or sends a "Radius Access-Request" frame to the proxy Radius server 61, in accordance with the state transition diagram indicated in RFC 1661.

In step S23, a new state is checked. When the connection is terminated, the operation goes to step S24. When the state is in the IP communication phase, the operation goes to step S25. In the other cases, the operation is completed.

In step S24, an entry corresponding to the terminated connection is deleted from the MAC-VID table T2b.

In step S25, an entry corresponding to the source MAC address included in the received frame is registered in the MAC-VID table T2b.

Figure 15:
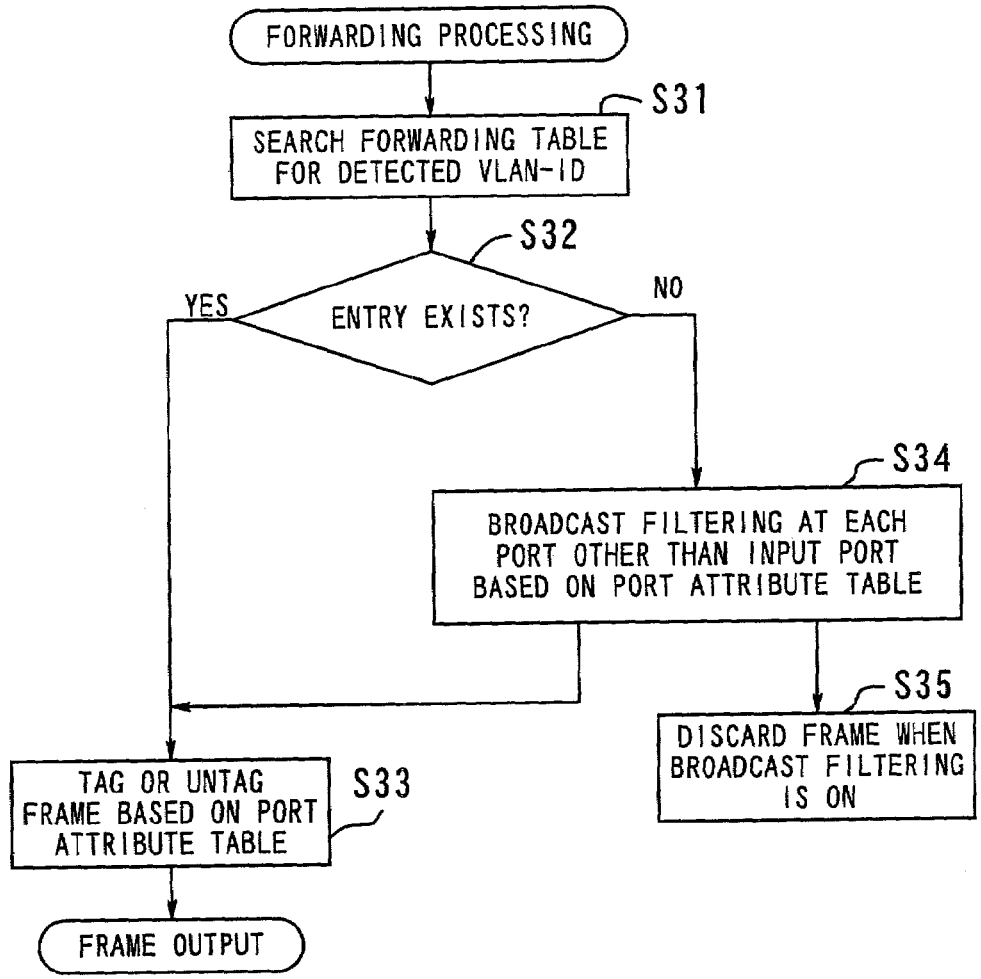
FIG. 15 is a flow diagram indicating operations of forwarding processing and output processing performed by each subscriber-side edge L2 switch.

FIG. 15 is a flow diagram indicating operations of the forwarding processing and the output processing performed by each subscriber-side edge L2 switch.

In step S31, in the forwarding processing, the forwarding tables T2c are searched for based on the VLAN-ID detected in step S15 in FIG. 13.

In step S32, it is determined whether or not the forwarding tables T2c includes an entry corresponding to the VLAN-ID. When the forwarding tables T2c includes an entry corresponding to the VLAN-ID, the operation goes to step S33. When the forwarding tables T2c does not include an entry corresponding to the VLAN-ID, the operation goes to step S34.

In step S33, the received frame is tagged or untagged based on the forwarding tables T2c, and then the frame is output.

In step S34, broadcast filtering is performed based on the port attribute table T2d at respective ports other than the input port of the received frame.

Figure 16:
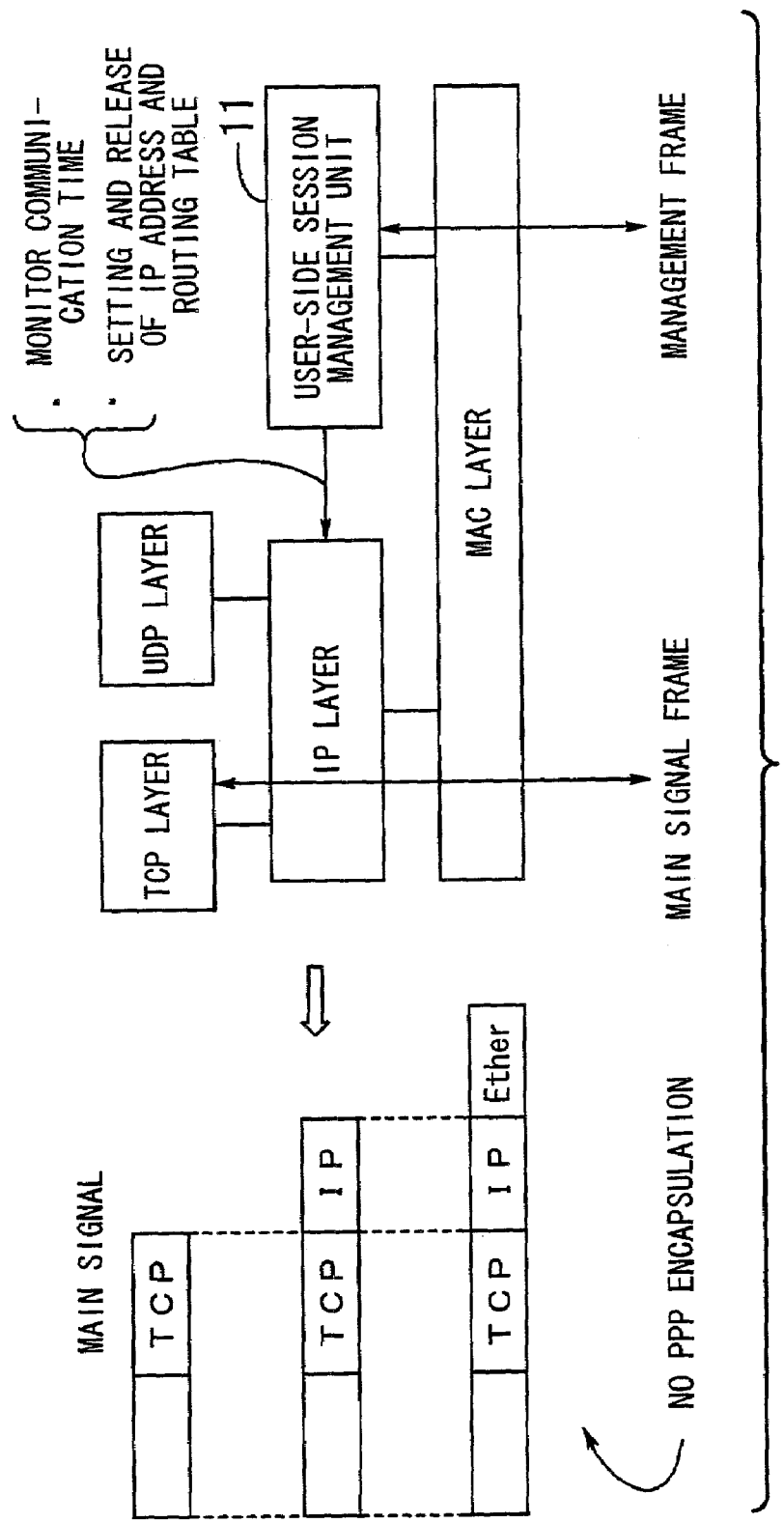
FIG. 16 is a diagram illustrating a protocol stack of each of the user terminals and a structure of a main-signal frame corresponding to the protocol stack.
Figure 17:
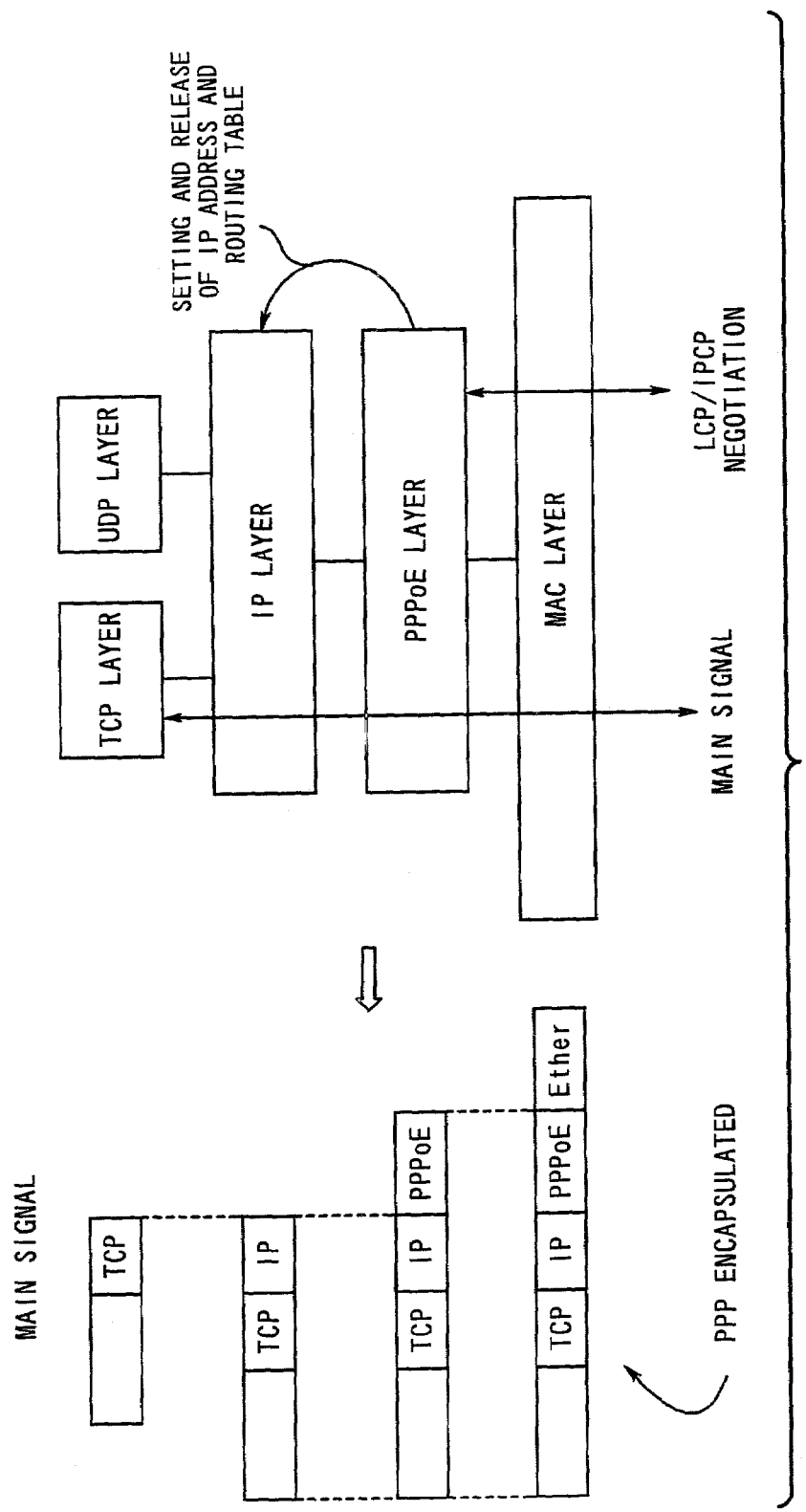
FIG. 17 is a diagram illustrating a protocol stack of a conventional user terminal and a structure of a main-signal frame corresponding to the protocol stack.

In step S35, the received frame is discarded when the information item "BROADCAST FILTERING" indicates (6) User Terminal FIG. 16 is a diagram illustrating a protocol stack of each of the user terminals and a structure of a main-signal frame corresponding to the protocol stack, and FIG. 17 is a diagram illustrating a protocol stack of a conventional user terminal and a structure of a main-signal frame corresponding to the protocol stack. In FIG. 16, the MAC layer, the IP layer, and upper layers are the same as those in the conventional user terminal. The processing by the main-signal transmission-and-reception unit 12 is performed through the TCP layer, the IP layer, and the MAC layer.

In order to initiate operations for connection to a service provider, the user-side session management unit 11 transmits a "PADI (PPPoE Active Discovery Initiation)" packet, which is mentioned before with reference to FIG. 6. Until the completion of the authentication phase, the operations of the user-side session management unit 11 are substantially the same as the conventional PPPoE operations.

That is, the user-side session management unit 11 performs negotiation with reference to a user-side session management table, which is provided in the user-side session management unit 11. An example of the user-side session management table before a connection between a user terminal and a service provider is established is illustrated in FIG. 18A, and an example of the user-side session management table before a connection between a user terminal and a service provider is established is illustrated in FIG. 18B.

In the user authentication, an authentication frame is transmitted, where a service provider to which the user terminal is to be connected is designated by inserting a user ID "username@provider-name" in the authentication frame. When the authentication succeeds, IPCP negotiation is performed, and then the authentication phase is completed.

Figure 19:
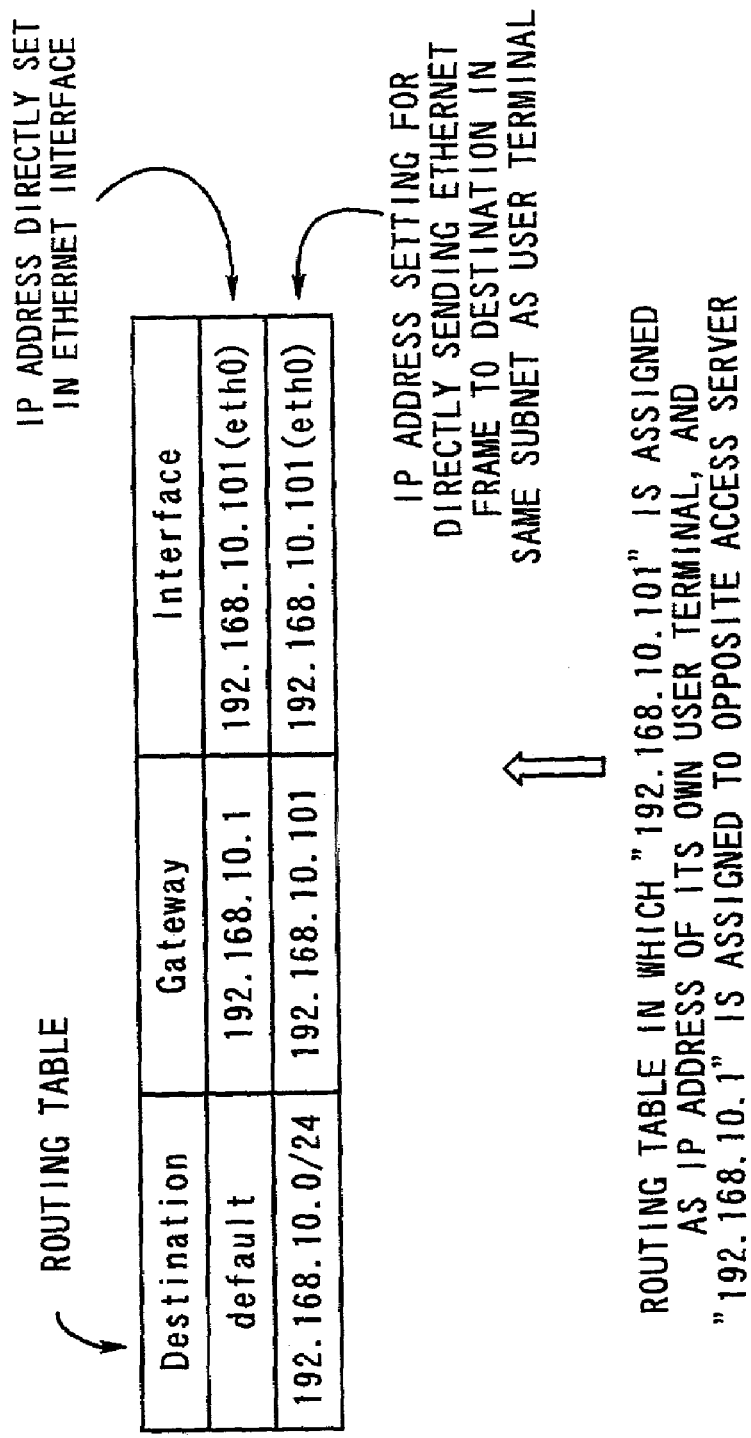
FIG. 19 is a diagram illustrating an example of a routing table arranged in a user terminal.

In the IP communication phase, an IP address assigned to the user terminal is set in an Ethernet interface, and an opposite address (i.e., an IP address of a provider edge router connected to the service provider) is set in a routing table as a default route. An example of the routing table is illustrated in FIG. 19. Thus, IP data communication is performed in accordance with IPoE.

In addition, the subnet mask is determined in accordance with a subnet mask value of the service provider connected to the user terminal. When the user terminal belongs to the same subnet as the service provider, the IPoE frame bypasses the provider edge router, and is directly sent to the service provider.

Further, in the IP communication phase, the user terminal transmits a frame for confirming connectivity at regular time intervals. That is, in order to maintain a session (connection), a frame for confirming connectivity, "LCP Echo-Request", is transmitted to one of the subscriber-side edge L2 switches with which PPPoE negotiation has been performed in the authentication phase.

In response to the "LCP Echo-Request" frame, the subscriber-side edge L2 switch returns an "LCP Echo-Reply" frame. The common format of the "LCP Echo-Request" and "LCP Echo-Reply" frames is illustrated in FIG. 20. The value in the field "CODE" in the "LCP Echo-Reply" frame is "0x08". When the subscriber-side edge L2 switch returns an "LCP Echo-Request" frame, the "LCP Echo-Reply" is generated by changing the value in the field "CODE" to "0x09", and setting in the field "Magic-Number" a value determined by the subscriber-side edge L2 switch. Thus, it is possible to confirm that the connection to the user terminal is maintained. When the subscriber-side edge L2 switch does not receive the "LCP Echo-Request" frame for a predetermined time, or when the user terminal does not receive the "LCP Echo-Reply" frame for a predetermined time, it is deemed that the session is terminated. Consequently, even in the case of an accident such as a line failure, sessions can be safely terminated.

In addition to the transmission of the above "LCP Echo-Request" frame to the subscriber-side edge L2 switch, the user terminal transmits a "Ping(ICMP Echo-Request)" frame to the provider edge router having the above opposite address assigned by IPCP, in order to avoid aging of an entry corresponding to the connection in the corresponding forwarding table in the subscriber-side edge L2 switch.

In order to terminate the session (connection), the user terminal transmits a frame indicating termination of the connection. That is, according to PPP, the user terminal transmits a frame indicating termination of the connection, "LCP Terminate-Request".

In response to the "LCP Terminate-Request" frame, the subscriber-side edge L2 switch removes entries corresponding to the MAC address of the user terminal from the session management table and the MAC-VID table, and returns an "LCP Terminate-Ack" frame. The common format of the "LCP Terminate-Request" and "LCP Terminate-Ack" frames is illustrated in FIG. 21. The value in the field "CODE" in the "LCP Terminate-Request" frame is "0x06". When the subscriber-side edge L2 switch returns an "LCP Terminate-Ack", the "LCP Terminate-Ack" is generated by changing the value in the field "CODE" to "0x06". Then, the user terminal transmits as a termination frame a "PADT (PPPoE Active Discovery Terminate)" packet, which is used for notification of termination of the PPPoE connection. At this time, the user terminal removes the IP address set in the Ethernet interface and the corresponding entry set in the routing table. Thus, the session is completed.

In addition, the user-side session management unit 11 in the user terminal 10 has a communication monitor function, which can automatically terminate the connection when IP data transmission is not made for a predetermined time. In this case, the user-side session management unit 1 may be configured by the user to activate or inactivate the communication monitor function. In addition, the above predetermined time can be arbitrarily set by the user.

In the case where a service provider to which the user terminal is to be connected is fixedly determined, it is possible to store in advance a user ID "user-name@provider-name" and a password in the user terminal. In this case, the user-side session management unit 11 may be configured to automatically initiate the session management when the user terminal is activated, so that a substantially continuous connection can be realized.

Figure 22:
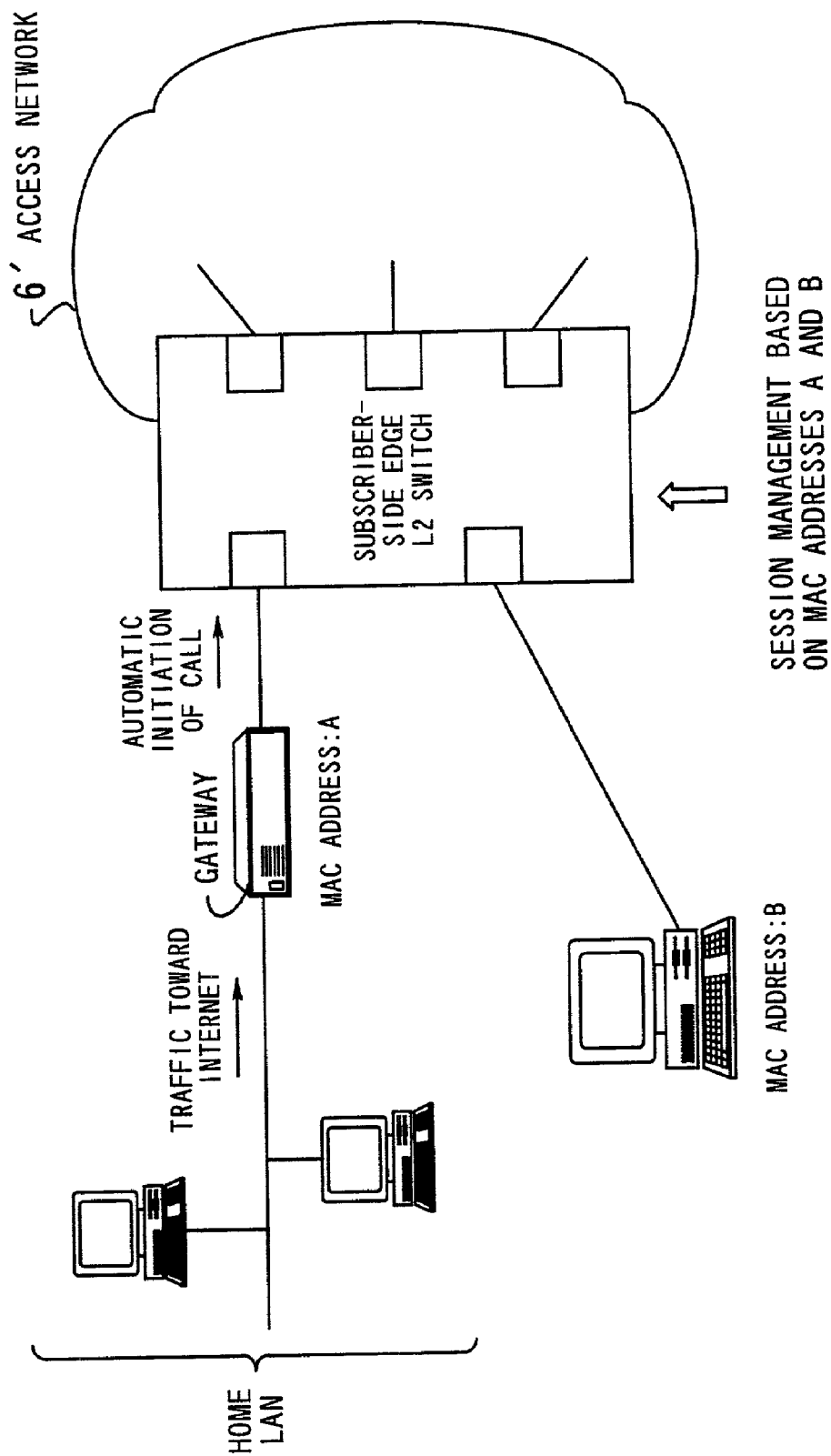
FIG. 22 is a diagram illustrating an example of a home LAN constructed by using a gateway router which has an Ethernet interface in which a unique global MAC address is set.

Further, for example, in the case where a home LAN is constructed by using a gateway router or the like which has an Ethernet interface in which a unique global MAC address is set, as illustrated in FIG. 22, the user-side session management unit 11 may be installed in the gateway router or the like. In this case, it is possible to set in advance a user ID "user-name@provider-name" and a password in the gateway router or the like, and configure the gateway router or the like so as to automatically initiate a call when the gateway router or the like receives from the home LAN an IP packet requesting connection to the Internet.

Figure 23:
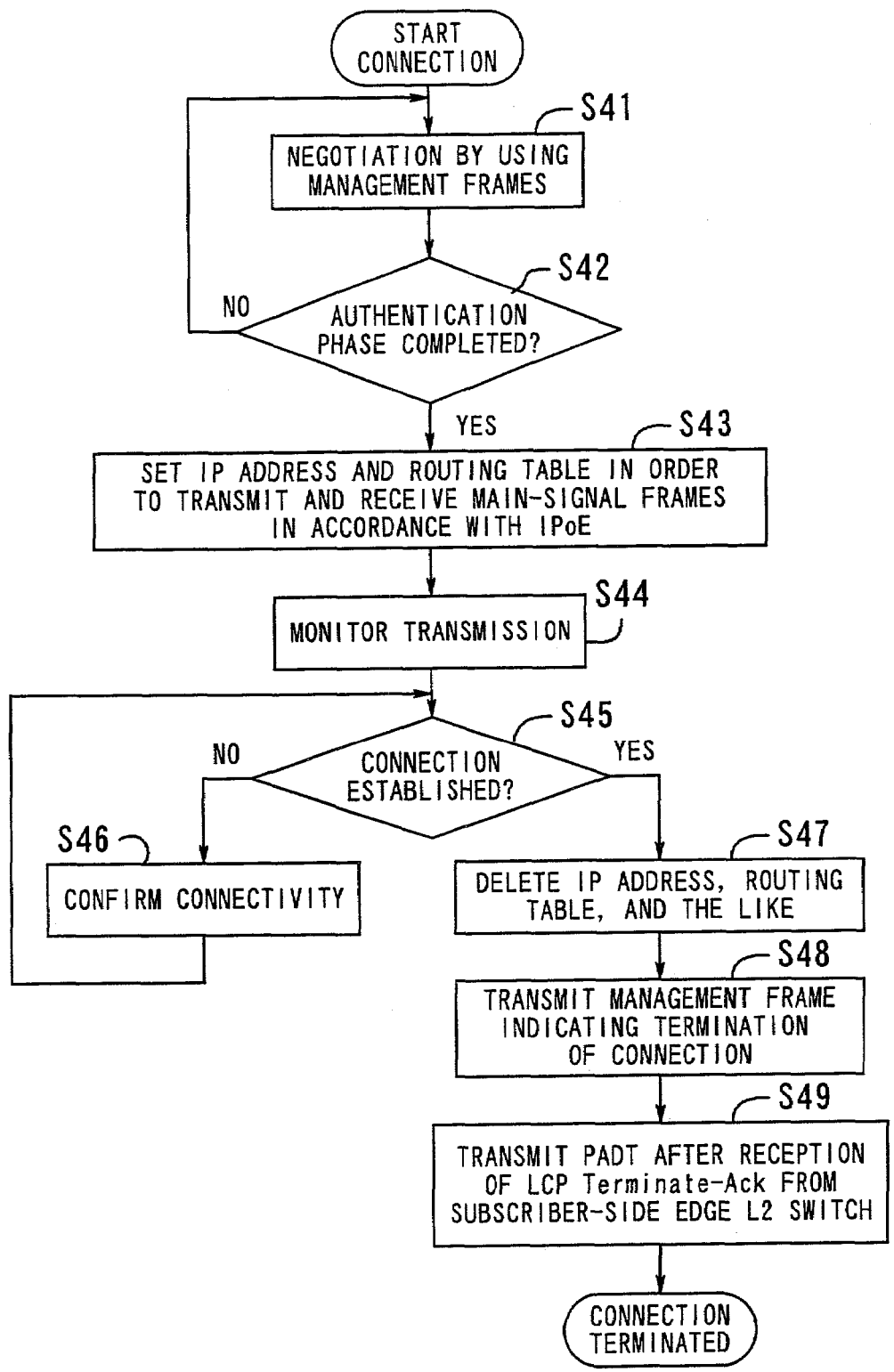
FIG. 23 is a flow diagram indicating the overall operation of the user-side session management unit 11 in each user terminal.

FIG. 23 is a flow diagram indicating the overall operation of the user-side session management unit 11 in each user terminal.

In step S41, the user-side session management unit 11 performs negotiation for authentication, IP address assignment, and the like by using management frames.

In step S42, the user-side session management unit 11 determines whether or not the authentication phase is completed. When yes is determined in step S42, the operation goes to step S43. When no is determined in step S42, the operation goes back to step S41.

In step S43, the user-side session management unit 11 sets IP addresses, the routing table, and the like so that the user terminal can transmit and receive main-signal frames in accordance with IPoE.

In step S44, the user-side session management unit 11 monitors IP communication.

In step S45, the user-side session management unit 11 determines whether or not the connection is to be terminated. When yes is determined in step S45, the operation goes to step S47. When no is determined in step S45, the operation goes to step S46. Usually, the termination of the connection is instructed by the user. However, the processing for termination of the connection may be initiated when the user terminal does not receive a reply to a frame for confirmation of connectivity, or when the communication monitor function detects absence of IP data communication. Further, the subscriber-side edge L2 switch may initiate processing for termination of the connection when the user inputs an invalid password.

In step S46, in order to confirm connectivity, the user-side session management unit 11 transmits a management frame "LCP Echo Request" to the subscriber-side edge L2 switch, and another management frame "Ping(ICMP Echo-Request)" to a provider-side edge L2 switch.

In step S47, the user-side session management unit 11 removes the IP addresses and the routing table set in the user terminal.

In step S48, the user-side session management unit 11 transmits a management frame (LCP Terminate-Request) which indicates termination of the connection.

In step S49, the user-side session management unit 11 receives from the subscriber-side edge L2 switch a reply "LCP Terminate-Ack" to the management frame "LCP Terminate-Request", and then transmits a "PADT (PPPoE Active Discovery Terminate)" packet. Thus, the connection is terminated.

(7) Address Resolution Protocol

ARP (Address Resolution Protocol) operations are explained.

First, the conventional ARP operation is explained below.

When a first terminal (e.g., a user terminal) sends an IPoE frame to a second terminal, it is necessary for the first terminal to obtain a MAC address of the second terminal. In order to obtain the MAC address of the second terminal, first, the first terminal broadcasts an ARP request containing an IP address of the second terminal. In response to the ARP request, the second terminal returns an ARP reply (unicasts) to the first terminal. Then, the first terminal stores information on a correspondence (mapping) between the IP address and the MAC address of the second terminal in an entry of an ARP table (or ARP cache), and the contents of the entry is held for a predetermined time. Thereafter, the first terminal can transmit a frame to the second terminal in accordance with IPoE.

FIG. 24A is a diagram illustrating the format of an ARP frame (packet), FIG. 24B is a diagram illustrating an ARP request packet using the frame format of FIG. 24A, and FIG. 24C is a diagram illustrating an ARP reply packet using the frame format of FIG. 24A.

As illustrated in FIG. 24B, in the ARP request packet, the MAC address "A" of the first terminal is included in the fields of the source (MAC) address and the source hardware address ("Src Hw Addr"), the IP address "a" of the first terminal is included in the field of the source protocol address ("Src Prot Addr"), and the IP address "b" of the second terminal is included in the field of the target protocol address ("Tgt Prot Addr"). The ARP request packet requests the target hardware address ("Tgt Hw Addr") of the second terminal.

On the other hand, as illustrated in FIG. 24C, in the ARP reply packet, the MAC address "B" of the second terminal is included in the fields of the source (MAC) address and the source hardware address ("Src Hw Addr"), the IP address "b" of the second terminal is included in the field of the source protocol address ("Src Prot Addr"), the MAC address "A" of the first terminal is included in the field of the target hardware address ("Tgt Hw Addr"), and the IP address "a" of the first terminal is included in the field of the target protocol address ("Tgt Prot Addr").

When the second terminal receives the ARP request packet, the second terminal extracts the MAC address "A" and the IP address "a" of the first terminal from the fields "Src Hw Addr" and "Src Prot Addr" of the ARP request packet, and caches the mapping between the MAC address "A" and the IP address "a" of the first terminal in an ARP table held in the second terminal. When the first terminal receives the ARP reply packet, the first terminal extracts the MAC address "B" and the IP address "b" of the second terminal from the fields "Src Hw Addr" and "Src Prot Addr" of the ARP reply packet, and caches the mapping between the MAC address "B" and the IP address "b" of the second terminal in an ARP table held in the first terminal.

Figure 25:
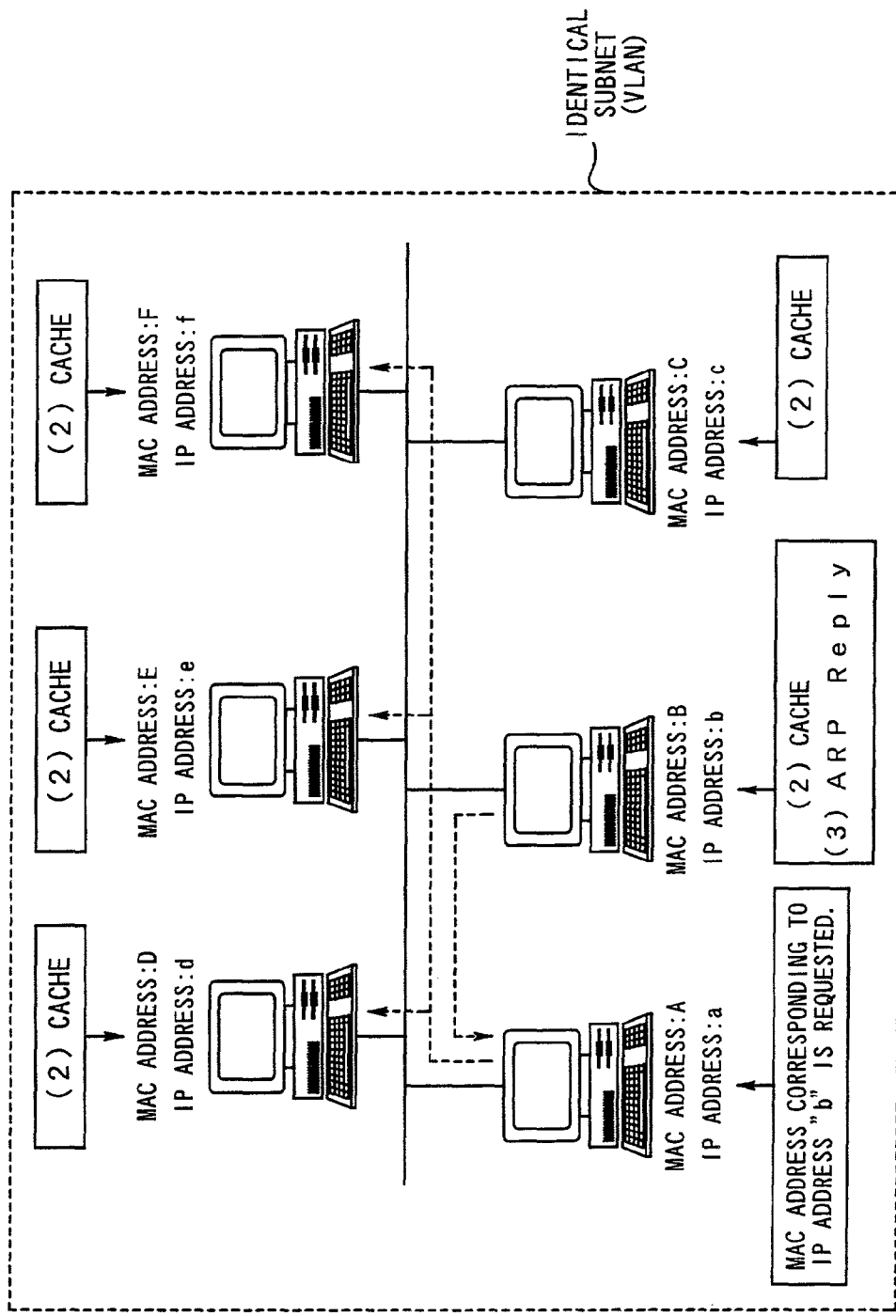
FIG. 25 is a diagram illustrating an example of a configuration of a subnet (VLAN), to which a plurality of terminals including the above-mentioned first and second terminals are connected.

FIG. 25 is a diagram illustrating an example of a configuration of a subnet (VLAN), to which a plurality of terminals are connected. Since the ARP request packet is a broadcast packet, the ARP request is sent to all terminals in a broadcast domain, i.e., all user terminals connected to an identical service provider through the access network 6' (or all user terminals belonging to an identical subnet), and all the terminals which receive the ARP request packet cache the mapping between the MAC address "A" and the IP address "a" of the first terminal in an ARP table held in the respective terminals.

The above general ARP operation does not cause a problem in communication between users within a LAN segment such as a company's network or the like. However, the transmission of the ARP request from each user who wishes to be connected to a service provider to all the terminals in the broadcast domain is unnecessary and may cause a security problem.

Nevertheless, in the case where the ARP request is filtered, it is impossible for a first user in the broadcast domain to communicate (e.g., chat) with a second user in the broadcast domain through a point-to-point connection unless the first user can obtain a MAC address of the second user.

It is technically possible to transfer an ARP request from the first user through a provider edge router to the second user. However, in this case, the input port and the output port in the provider edge router are identical. Therefore, an ICMP error (ICMP Redirect) packet is output every time an ARP request packet is transferred. That is, an additional load is imposed on the provider edge router. Thus, it is necessary to modify the system so that broadcast packets such as the ARP request packet are sent to only a desired terminal.

Next, the ARP management in the communication system according to the present invention is explained below.

Figure 26:
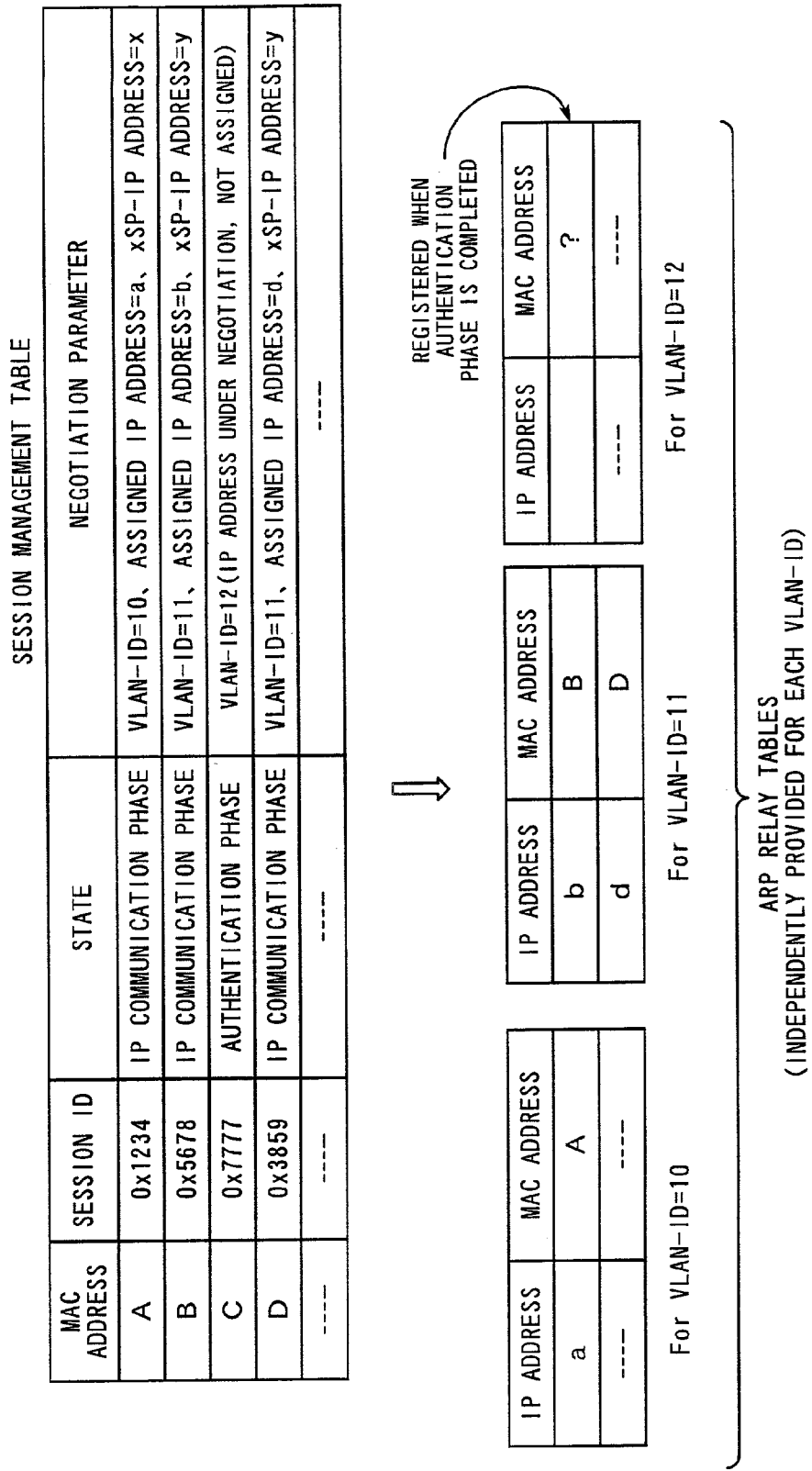
FIG. 26 is a diagram illustrating an example of an ARP relay table.

In the communication system according to the present invention, each subscriber-side edge L2 switch manages each session based on a source MAC address, and delivers an IP address to a user terminal 10 in the authentication phase. Therefore, the subscriber-side edge L2 switch can produce a table which corresponds to the ARP table and indicates correspondences (mappings) between MAC addresses of user terminals and IP addresses assigned to the respective user terminals. Hereinafter, such a table produced by each subscriber-side edge L2 switch is called an ARP relay table. An example of a set of ARP relay tables produced by a subscriber-side edge L2 switch is indicated in FIG. 26, in which an ARP relay table is produced for each value of the VLAN-ID based on the contents of the session management table.

According to the present invention, when an ARP request packet in which the "ETHER TYPE" field indicates "0x0806" is sent from a user terminal to a subscriber-side edge L2 switch, the subscriber-side edge L2 switch refers to the MAC-VID table T2b in order to confirm authentication, extracts a VLAN-ID, and searches an ARP relay table corresponding to the extracted VLAN-ID based on the IP address "b" of the second terminal included in the field of the target protocol address ("Tgt Prot Addr") of the ARP request packet. When the ARP relay table includes an entry corresponding to the IP address "b" of the second terminal, i.e., when a hit occurs in the ARP relay table, the MAC address "B" of the second terminal is obtained from the entry of the ARP relay table corresponding to the IP address "b" of the second terminal. Therefore, the subscriber-side edge L2 switch returns an ARP reply packet to the user terminal on behalf of the second terminal.

In this case, in the ARP reply packet, the MAC address of the subscriber-side edge L2 switch is included in the field of the source (MAC) address, the MAC address "B" of the second terminal is included in the field of the target hardware address ("Src Hw Addr"), and the IP address "b" of the second terminal is included in the field of the target protocol address ("Src Prot Addr"). The MAC address "B" and the IP address "b" of the second terminal correspond to the entry of the ARP relay table corresponding to the IP address "b" of the second terminal.

When the ARP relay table does not include an entry corresponding to the IP address "b" of the second terminal, the subscriber-side edge L2 switch attaches a tag to the ARP request packet received from the user terminal, and outputs through only the output ports which are connected to the access network 6'. However, the ARP request is not output from the other output ports of the subscriber-side edge L2 switch which are connected to other user terminals. The output of the ARP request can be controlled as above by setting "ON" in the "BROADCAST FILTERING" field for the ports connected to the users, and "OFF" in the "BROADCAST FILTERING" field for the ports connected to the access network 6', in the port attribute table T2d.

When each of the other edge L2 switches (i.e., the other subscriber-side edge L2 switch and the provider-side edge L2 switches) receives through the access network 6' the ARP request which is tagged as above, the edge L2 switch searches an ARP relay table corresponding to the VLAN-ID based on the IP address "b" of the second terminal included in the field of the target protocol address ("Tgt Prot Addr") of the ARP request packet. When the ARP relay table includes an entry corresponding to the IP address "b" of the second terminal, the edge L2 switch returns an ARP reply packet to the user terminal on behalf of the second terminal.

Figure 27:
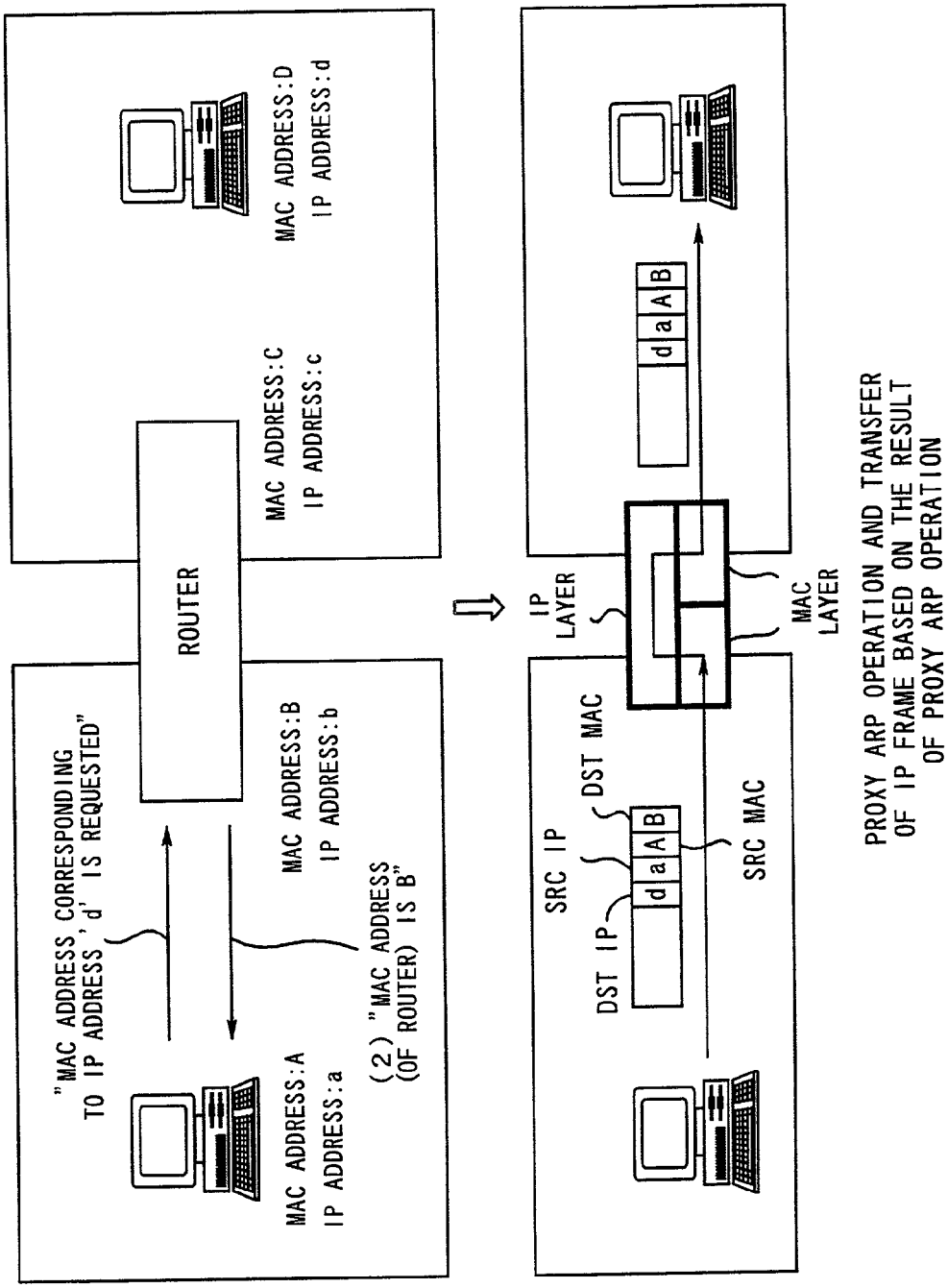
FIG. 27 is a diagram illustrating an example of the Proxy ARP operation and transfer of an IP frame based on the result of the Proxy ARP operation.

The above operation according to the present invention is different from the so-called Proxy ARP operation. The Proxy ARP operation is performed by a router, for example, as illustrated in FIG. 27. When a router receives an ARP request from a user, the router returns the MAC address of the router to the user, and an IP frame from the user is transferred to its destination by Layer 3 routing.

On the other hand, according to the present invention, the ARP reply packet returned to the aforementioned first terminal contains the MAC address "b" of the second (target) terminal to which the first terminal wishes to send an IP frame, where the MAC address "b" of the second terminal is obtained from the ARP relay table. Thus, the first terminal sends the IP frame to the second terminal in Layer 2 (by MAC bridging).

The entry of the ARP relay table corresponding to each user is changed every time the user is connected to a different service provider, since a different IP address is assigned to the user when the user is connected to a different service provider. Therefore, the contents of the entry of the ARP relay table corresponding to each user are registered when the authentication phase is completed, and deleted when the connection is terminated. However, since the IP address and MAC address of each provider edge router are not changed unless the equipment is changed, the entry corresponding to the provider edge router is fixedly held by each provider-side edge L2 switch.

Figure 28:
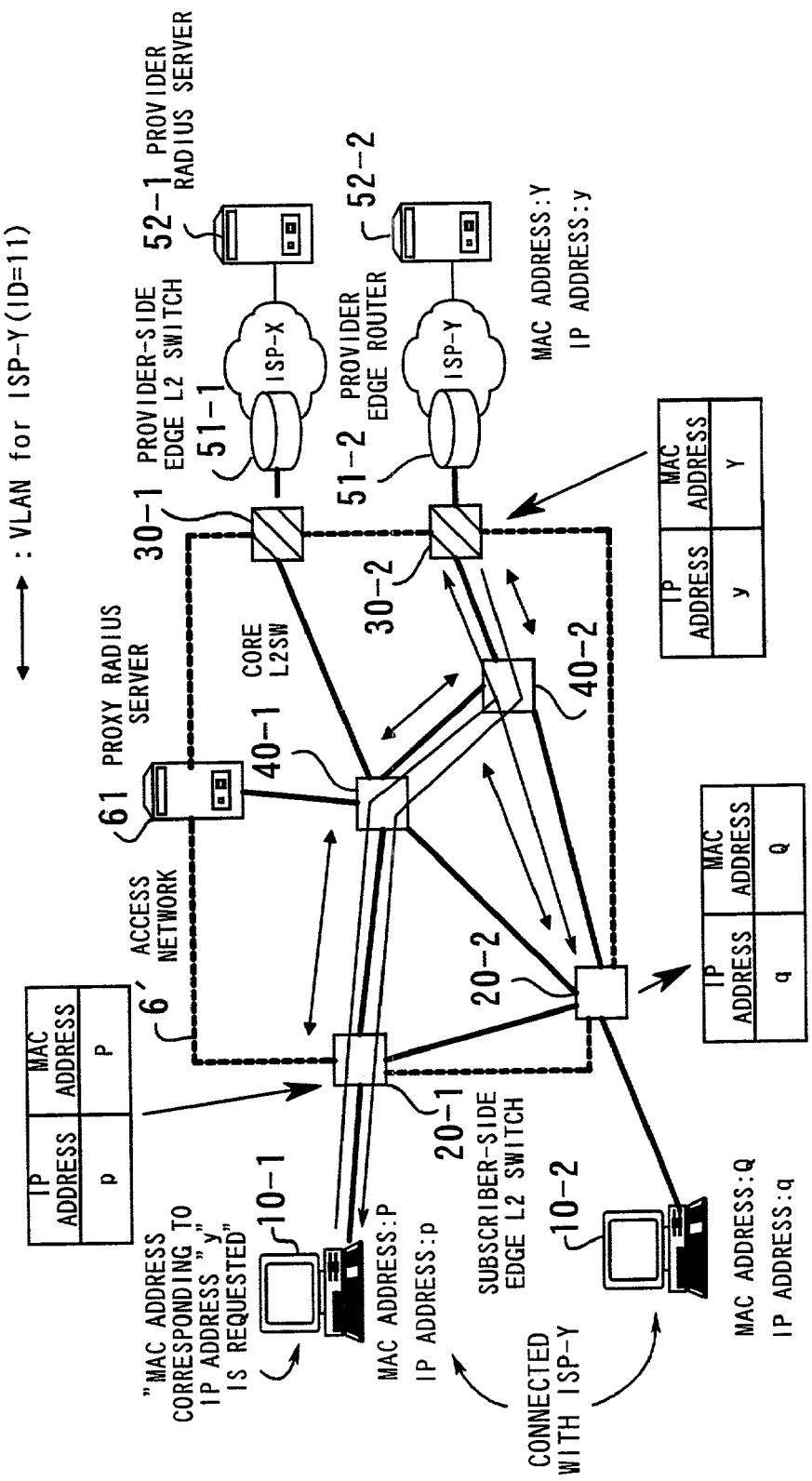
FIG. 28 is an explanatory diagram illustrating an example of the ARP operation in the communication system according to the present invention.

FIG. 28 is an explanatory diagram illustrating an example of the ARP operation in the communication system according to the present invention.

In this example of FIG. 28, an ARP entries are not cached in ARP relay tables in edge L2 switches when the edge L2 switches receive an ARP request or an ARP reply during a normal ARP operation. That is, an ARP entry corresponding to each user terminal or provider edge router (i.e., a mapping between the MAC address and the IP address of each user terminal or provider edge router) is cached in an ARP relay table in only an edge L2 switch which accommodates the user terminal or provider edge router. Therefore, for example, when the user having the MAC address P wishes to obtain an ARP entry corresponding to the ISP-X provider edge router 51-1 connected to the service provider ISP-X (i.e., a mapping between the MAC address and the IP address of the ISP-X provider edge router 51-1 connected to the service provider ISP-X), the provider-side edge L2 switch 30-1 connected to the ISP-X provider edge router 51-1 returns an ARP reply to the user. In addition, when the user having the MAC address P wishes to obtain an ARP entry corresponding to another user having a MAC address Q and being connected to the same service provider ISP-X, a subscriber-side edge L2 switch connected to the user having the MAC address Q returns an ARP reply to the user having the MAC address P.

When a user outputs an ARP request for an unexisting ARP entry, no edge L2 switch returns an ARP reply, and the ARP request is discarded without being output from the access network 6'. Therefore, the ARP entry corresponding to the source of the ARP request (i.e., the mapping between the MAC address and the IP address of the source of the ARP request) is not broadcast to the other users which are also connected to the service provider to which the source of the ARP request is connected.

In addition, although the ARP request packet can be broadcast in the access network 6' within only a VLAN, it is possible to prevent unnecessary output through an inappropriate port and formation of undesirable loops with paths of packets when GVRP or STP is concurrently used.

Further, when a service provider has a policy of prohibiting communication between users connected to the service provider, it is possible to arrange the communication system according to the present invention so that only a provider edge router connected to the service provider returns an ARP reply, i.e., the edge L2 switches do not return an ARP reply. In this case, communication between the users connected to the service provider can be prohibited, i.e., each of the users can be connected to only the service provider.

Alternatively, it is possible to completely inactivate the ARP relay function (i.e., the function of edge L2 switches in returning an ARP reply on behalf of the target terminal or provider edge router) so that ARP requests can reach all user terminals as in the conventional LAN segment.

Furthermore, according to the present invention, each subscriber-side edge L2 switch connected to a user from which an ARP request is originated confirms authentication and identifies a VLAN-ID. Therefore, even when the ARP relay function is activated or inactivated according to a policy of each service provider, connections within a virtual private network corresponding to the service provider are maintained.

Figure 29:
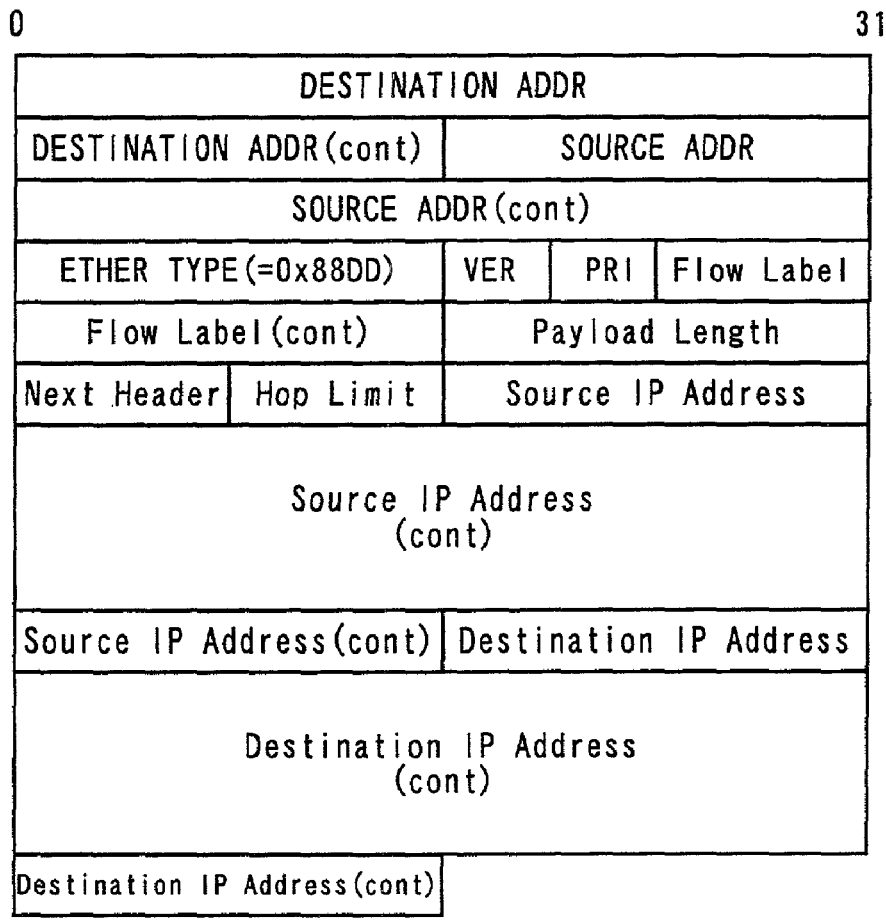
FIG. 29 is a diagram illustrating the format of an IPv6 frame.
Figure 30:
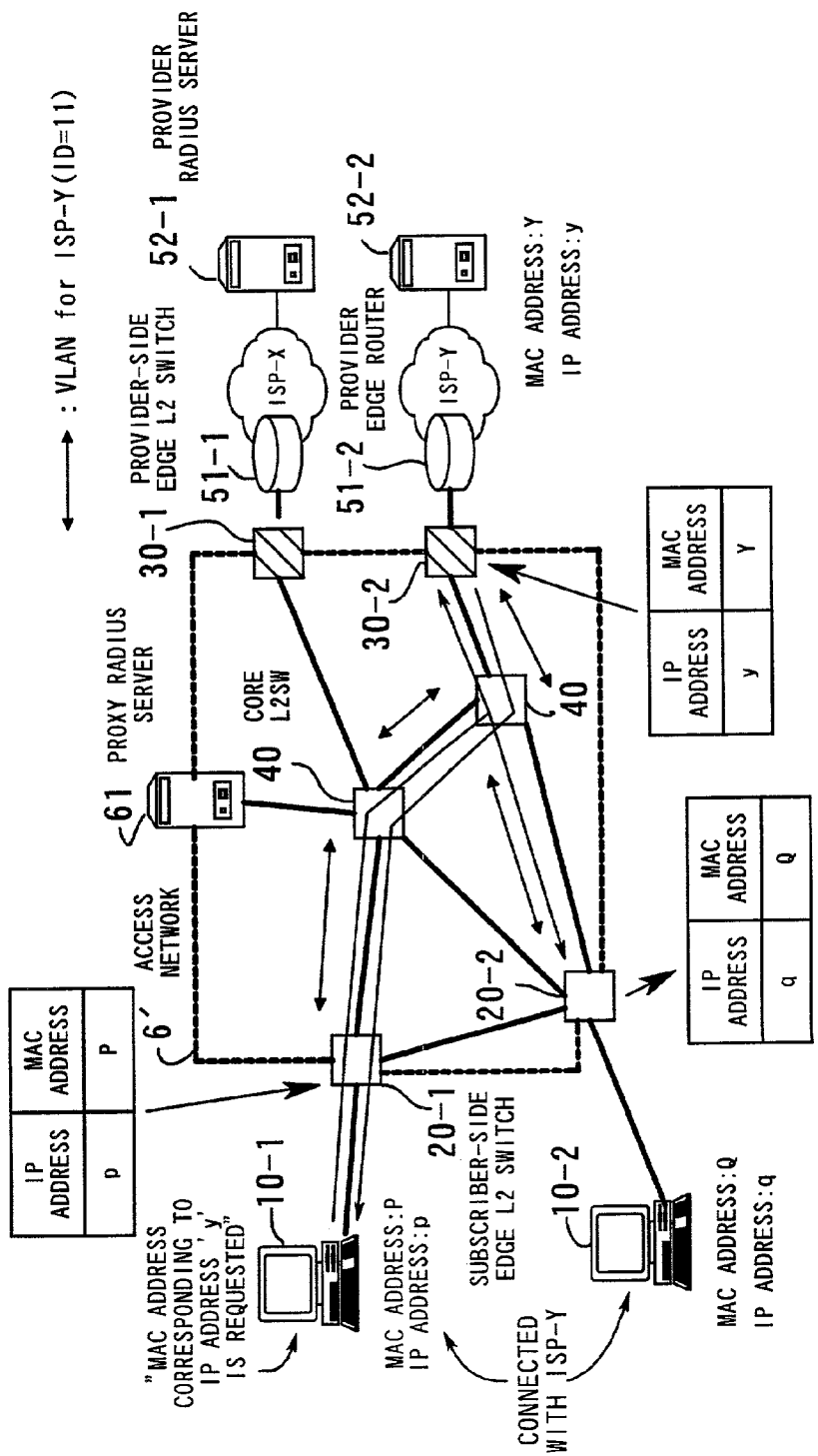
FIG. 30 is an explanatory diagram illustrating the conventional ARP operation which does not include the ARP relay function.

In the case of IPv6, the operations corresponding to the ARP are integrated into the "Neighbor Discovery" functions. Therefore, when the communication system uses the IPv6 protocol, each block in each subscriber-side edge L2 switch extracts the "Next Header" field of the IPv6 frame (illustrated in FIG. 29). In the case where the "Next Header" field indicates 58 (i.e., ICMPv6), the IPv6 frame is passed to the CPU so that the CPU processes the IPv6 frame. In the other cases, for example, where the "Next Header" field indicates 6 (i.e., TCP) or 17 (i.e., UDP), the IPv6 frame is processed by hardware.

Additional processing to the above ARP operation according to the present invention is explained below.

As described above, when a hit occurs in the ARP relay table in the subscriber-side edge L2 switch during the above ARP operation, the subscriber-side edge L2 switch returns an ARP reply to the source user terminal on behalf of the target user terminal. However, for example, in the case where the user terminal 10-1 having the MAC address communicates with the provider edge router 51-2 connected to the service provider ISP-Y as illustrated in FIG. 28, the user terminal 10-1 caches an entry in the ARP relay table when the user terminal 10-1 receives an ARP reply. Then, the user terminal 10-1 sends an IP data frame to the service provider ISP-Y in accordance with IPoE. Nevertheless, the ARP entry corresponding to the user terminal 10-1 (i.e., the mapping between the MAC address "P" and the IP address "p" of the user terminal 10-1) is not included in an ARP relay table in the provider edge router 51-2 connected to the service provider ISP-Y, since the ARP entry is not cached when an edge L2 switch or provider edge router receives an IP data frame. Therefore, the provider edge router 51-2 is required to transmit another ARP request for the MAC address of the user terminal 10-1 before the provider edge router 51-2 sends an IP data frame to the user terminal 10-1.

On the other hand, in the conventional ARP operation, which does not include the ARP relay function, a provider-side edge L2 switch being connected to a target service provider and having an entry of an ARP table corresponding to the target service provider makes unicast conversion, and transfers converted ARP request to a provider edge router connected to the service provider. Then, the provider edge router returns an ARP reply. At this time, the provider edge router caches in an entry of an ARP table in each terminal a correspondence between a MAC address and an IP address of a source terminal of an ARP request based on the contents of the fields of "Src Hw Addr" and "Src Prot Addr" of the received ARP request. Thus, the correspondence between the MAC address and the IP address of the opposite terminal or router is cached in both of the source and destination during only one ARP cycle.

In order to solve the above problem in the ARP relay function, when a hit occurs in an ARP relay table in a subscriber-side edge L2 switch in the above ARP operation, the subscriber-side edge L2 switch modifies the ARP request by replacing the broadcast address in the ARP request with a MAC address of a target terminal or provider edge router (as a unicast address), and transfers the modified ARP request to only the target terminal or provider edge router. When the target terminal or provider edge router receives the modified ARP request, the target terminal or provider edge router returns an ARP reply to the source terminal of the ARP request. Thus, even when the ARP relay function operates, the correspondence between the MAC address and the IP address of the source terminal of the ARP request can also be cached in the target terminal or provider edge router. That is, both of the source terminal and the target terminal or provider edge router can cache each other's MAC address during only one ARP cycle.

Figure 31:
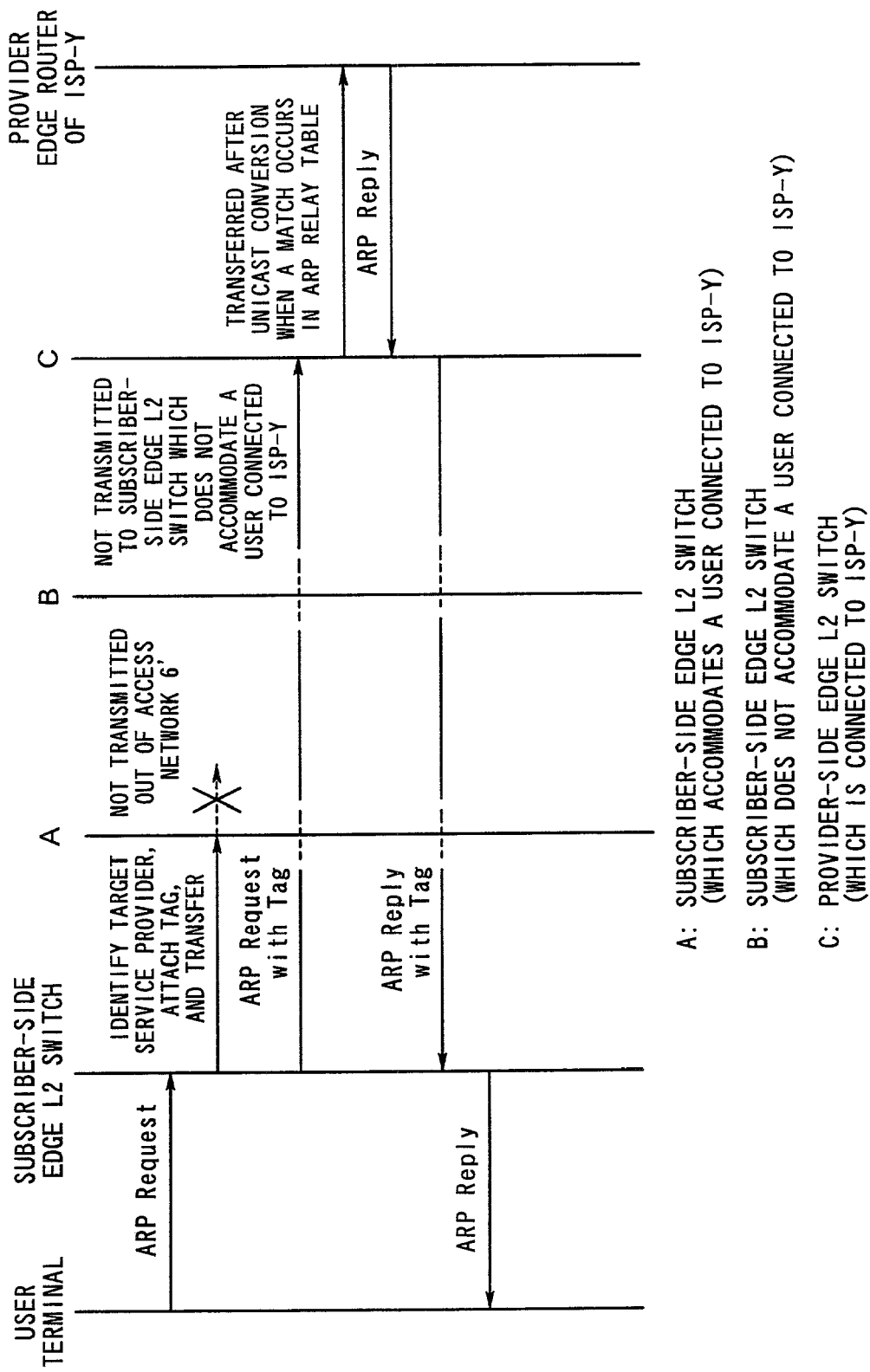
FIG. 31 is a diagram illustrating a sequence of operations for the ARP management according to the present invention, in which only a provider edge router returns an ARP reply to a source of an ARP request.
Figure 32:
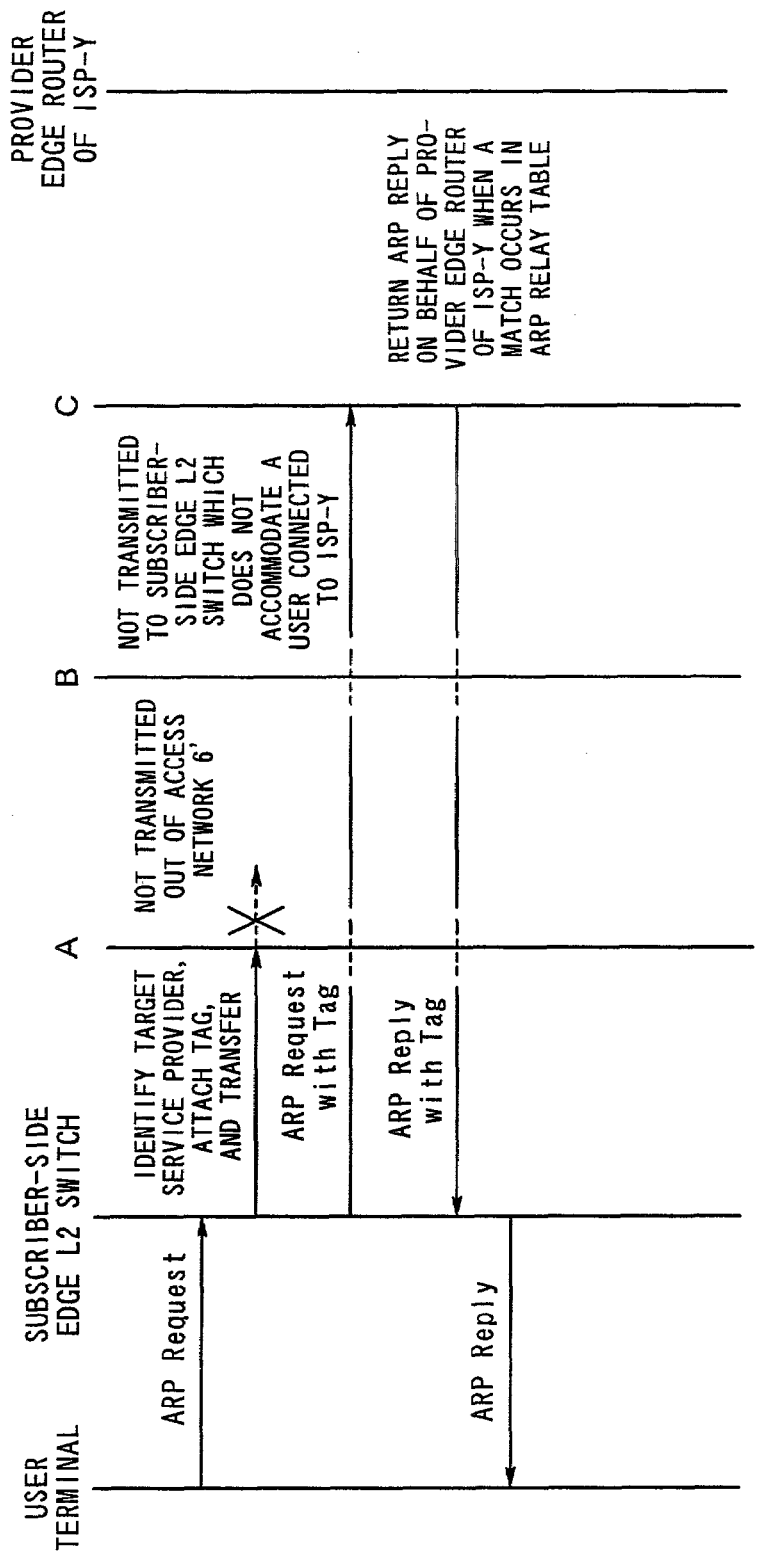
FIG. 32 is a diagram illustrating another sequence of operations for the ARP management according to the present invention, in which only an edge L2 switch accommodating a target provider edge router returns an ARP reply to a source of an ARP request.

FIG. 31 is a diagram illustrating a sequence of operations for the ARP management according to the present invention, in which only a provider edge router returns an ARP reply to a source of an ARP request, and FIG. 32 is a diagram illustrating another sequence of operations for the ARP management according to the present invention, in which only an edge L2 switch accommodating a target provider edge router returns an ARP reply to a source of an ARP request.

Figure 33:
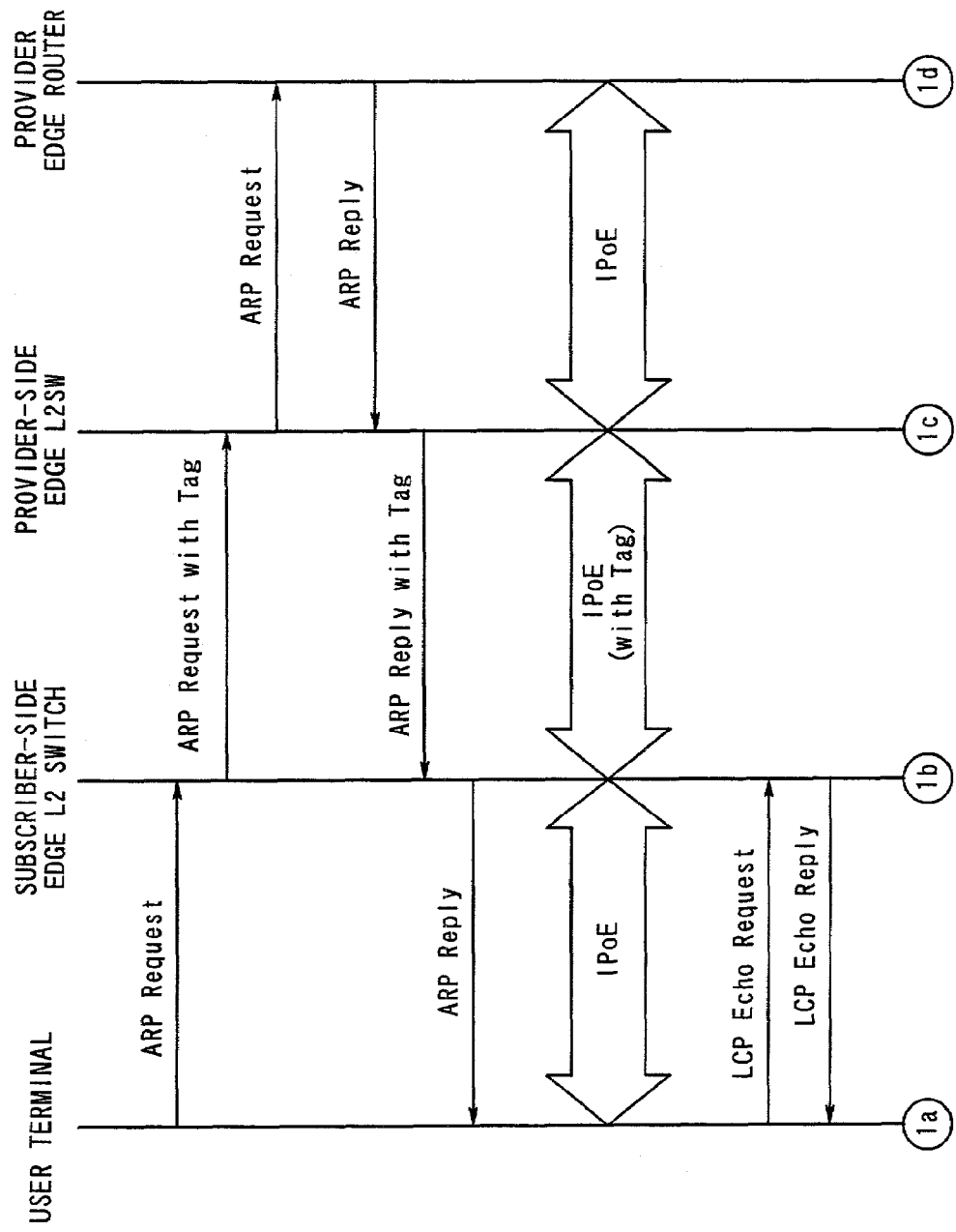
FIGS. 33 and 34 are diagrams illustrating a sequence of operations performed in the IP communication phase according to the present invention, in which the operations for ARP management and confirmation of connectivity are performed as well as transmission of IP data frames.
Figure 34:
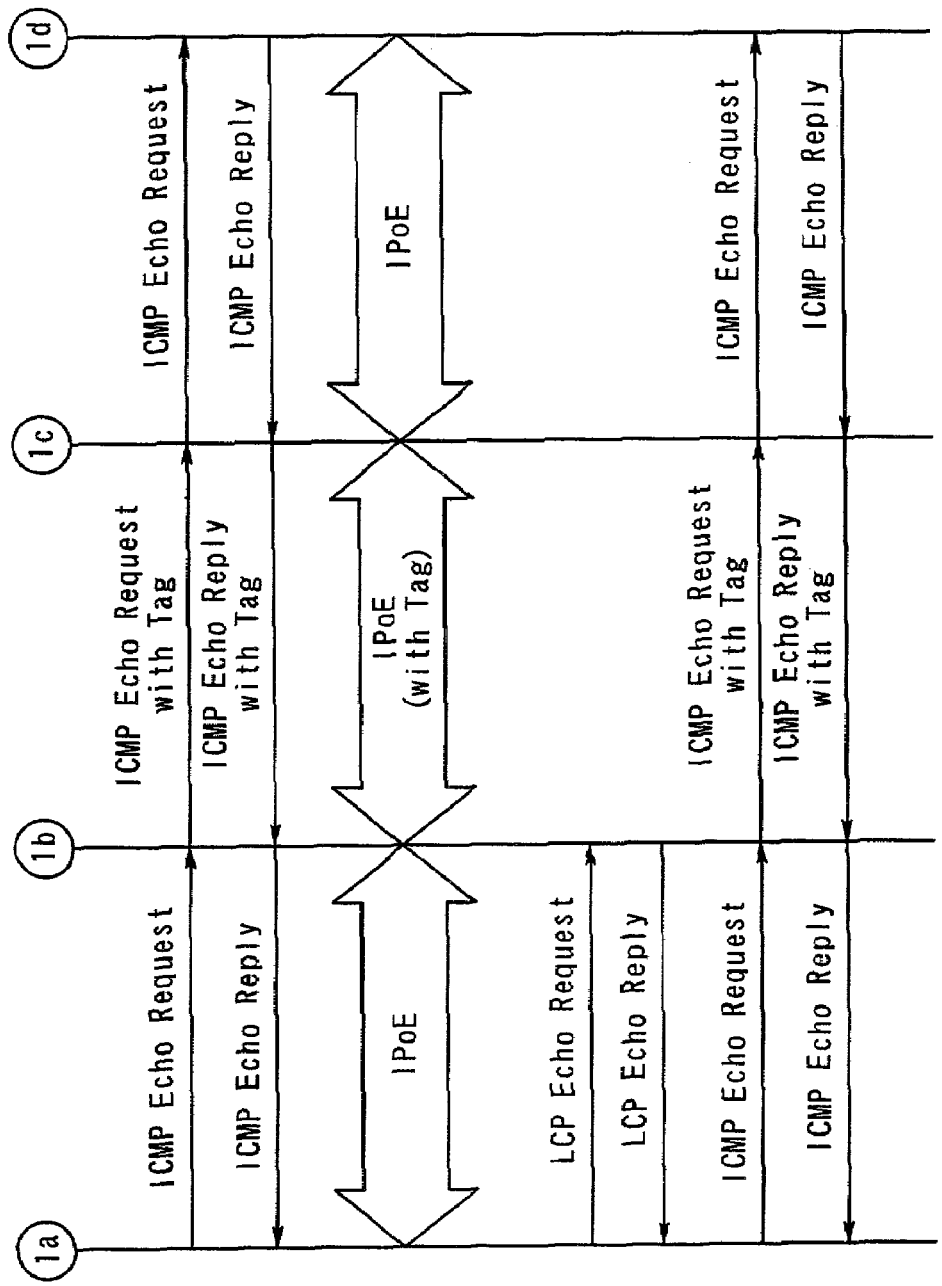

In addition, FIGS. 33 and 34 are diagrams illustrating a sequence of operations performed in the IP communication phase according to the present invention, in which the operations for the ARP management and the confirmation of connectivity are performed as well as transmission of IP data frames.

(8) Provider-Side Edge L2 Switch

The provider-side edge L2 switches 30-1 and 30-2 are explained below.

At least one provider-side port of each provider-side edge L2 switch is fixedly connected to a service provider.

In addition, for example, in the case where each provider edge router is duplexed, the provider edge router may be switched to a backup router when a trouble occurs. Therefore, it is preferable that each provider-side edge L2 switch identifies a service provider from which a frame input into the provider-side edge L2 switch is output, based on a port through which the frame is input into the provider-side edge L2 switch, not based on the MAC address indicated in the frame.

Thus, each provider-side edge L2 switch has a fixed port VID table which indicates correspondences between a plurality of ports connected to a plurality of service providers and a plurality of VLAN-IDs, for example, as illustrated in FIG. 35A. When each provider-side edge L2 switch receives a frame through one of the plurality of ports connected to the plurality of service providers, the provider-side edge L2 switch identifies one of the plurality of service providers which transmits the frame, based on the port through which the frame is input. Then, the provider-side edge L2 switch attaches to the frame a tag indicating a VLAN-ID corresponding to the port through which the frame is input, based on the port VID table and a port attribute table, and transfers the tagged frame to the access network 6' through one of plurality of ports indicated in one of a plurality of forwarding tables corresponding to the VLAN-ID. The plurality of forwarding tables in each provider-side edge L2 switch is provided corresponding to the plurality of VLAN-IDs, respectively, and have similar forms to those of the forwarding tables T2c held in each subscriber-side edge L2 switch. An example of a set of forwarding tables held in each provider-side edge L2 switch is illustrated in FIG. 35C. In addition, the port attribute table held in each provider-side edge L2 switch is similar to the port attribute table T2d held in each subscriber-side edge L2 switch, and an example of the port attribute table held in each provider-side edge L2 switch is illustrated in FIG. 35D. The above operations for transferring a frame from one of the service providers to the access network 6' correspond to the operations of the aforementioned third transfer control unit 32.

On the other hand, when each provider-side edge L2 switch receives a frame from the access network 6', the provider-side edge L2 switch removes the tag from the received frame, and transfers the untagged frame to one of the service providers corresponding to a VLAN-ID indicated in the tag. The above operations for transferring a frame from the access network 6' to one of the service providers correspond to the operations of the aforementioned second transfer control unit 31.

The provider-side edge L2 switches are different from the subscriber-side edge L2 switches in that each provider-side edge L2 switch does not handle (process) management frames, since the subscriber-side edge L2 switches perform the operations for the session management with the users, and stop unauthorized accesses from unauthenticated users so that the service providers are free from the unauthorized accesses.

The entries of ARP tables in the provider edge routers 51-1 and 51-2 are not changed unless the hardware of the provider edge routers 51-1 and 51-2 are replaced for reasons of malfunctions of the provider edge routers 51-1 and 51-2 or the like. That is, IP addresses of the provider edge routers 51-1 and 51-2 are fixed, and MAC addresses of the provider edge routers 51-1 and 51-2 are also fixed unless Ethernet interfaces are replaced. Therefore, each provider-side edge L2 switch connected to at least one of the provider edge routers 51-1 and 51-2 has an ARP relay table which includes static entries for the at least one of the provider edge routers 51-1 and 51-2. An example of a set of ARP relay tables corresponding to a plurality of VLAN-IDs is illustrated in FIG. 35B.

In the ARP relay processing according to the present invention, when each provider-side edge L2 switch receives an ARP request for a MAC address of one of the provider edge routers 51-1 and 51-2 connected to the provider-side edge L2 switch, the provider-side edge L2 switch returns an ARP reply on behalf of the one of the provider edge routers 51-1 and 51-2 connected to the provider-side edge L2 switch, as illustrated in FIG. 32. Alternatively, it is possible to arrange each provider-side edge L2 switch to modify the received ARP request by replacing the broadcast address in the ARP request with a MAC address of the one of the provider edge routers 51-1 and 51-2 connected to the provider-side edge L2 switch (as a unicast address), and transfers the modified ARP request to only the one of the provider edge routers 51-1 and 51-2, as illustrated in FIG. 31.

Figure 36:
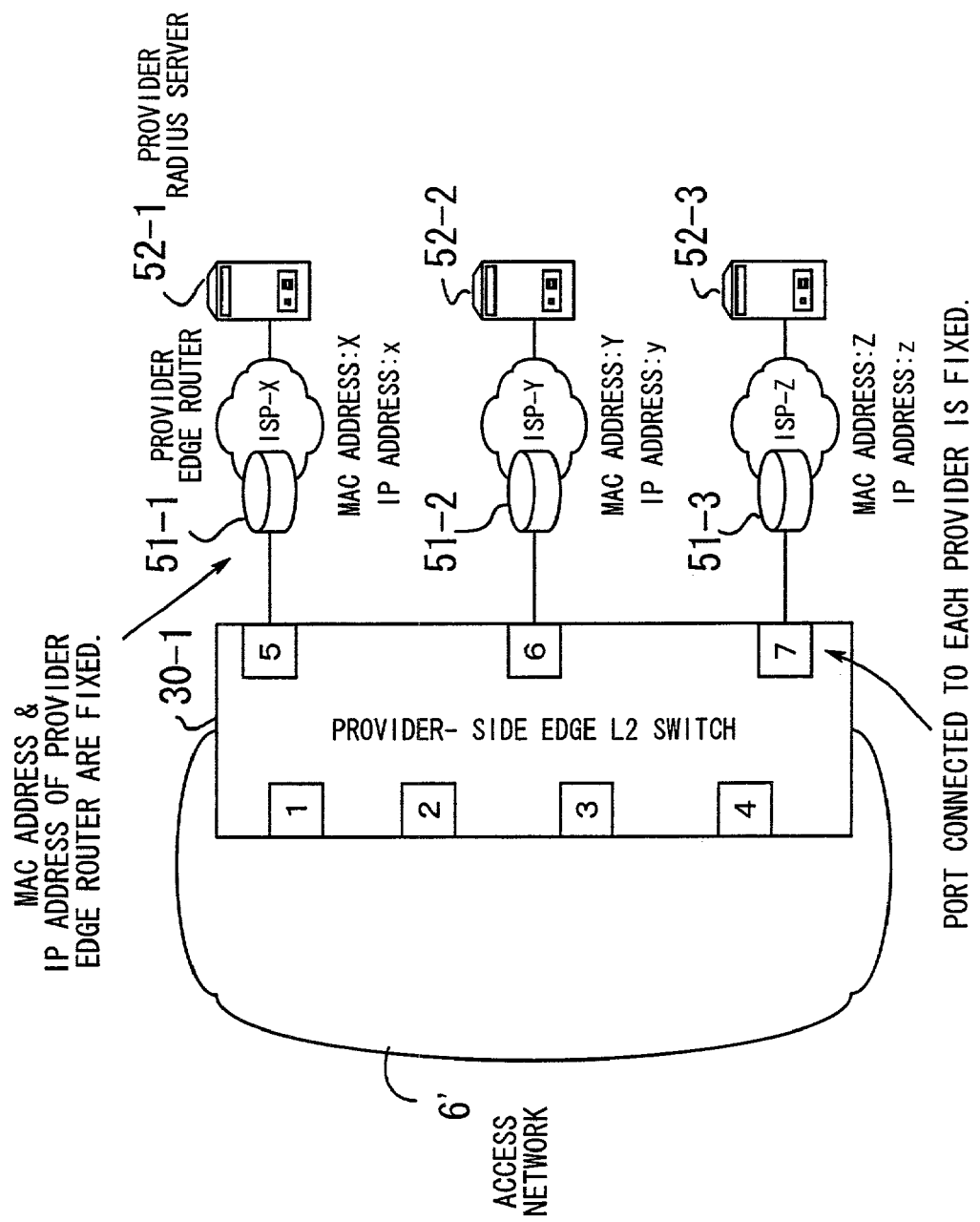
FIG. 36 is a diagram illustrating examples of connections between a plurality of ports of a provider-side edge L2 switch and a plurality of provider edge routers.
Figure 37:
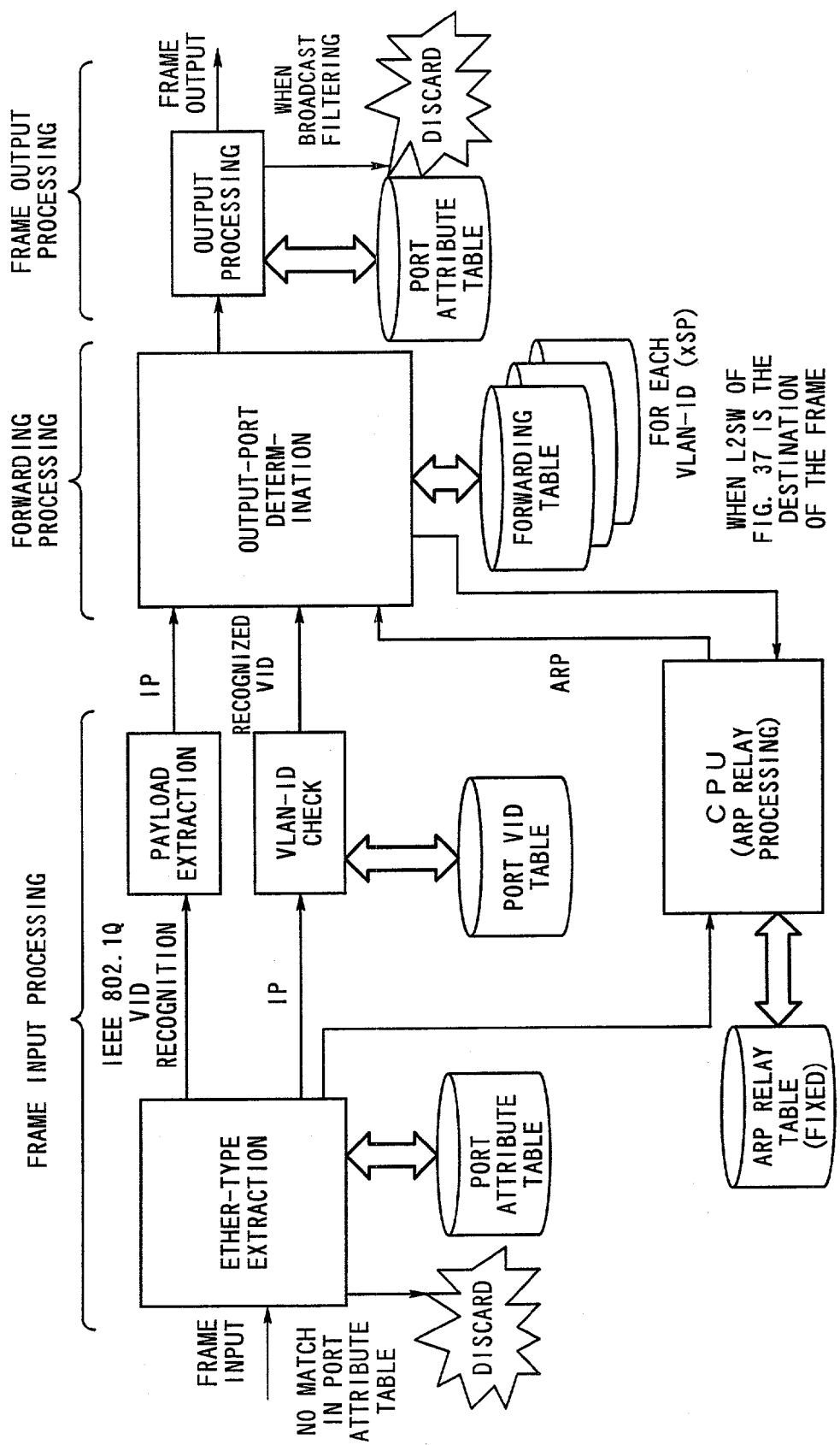
FIG. 37 is a block diagram illustrating the functions of each provider-side edge L2 switch.
Figure 38:
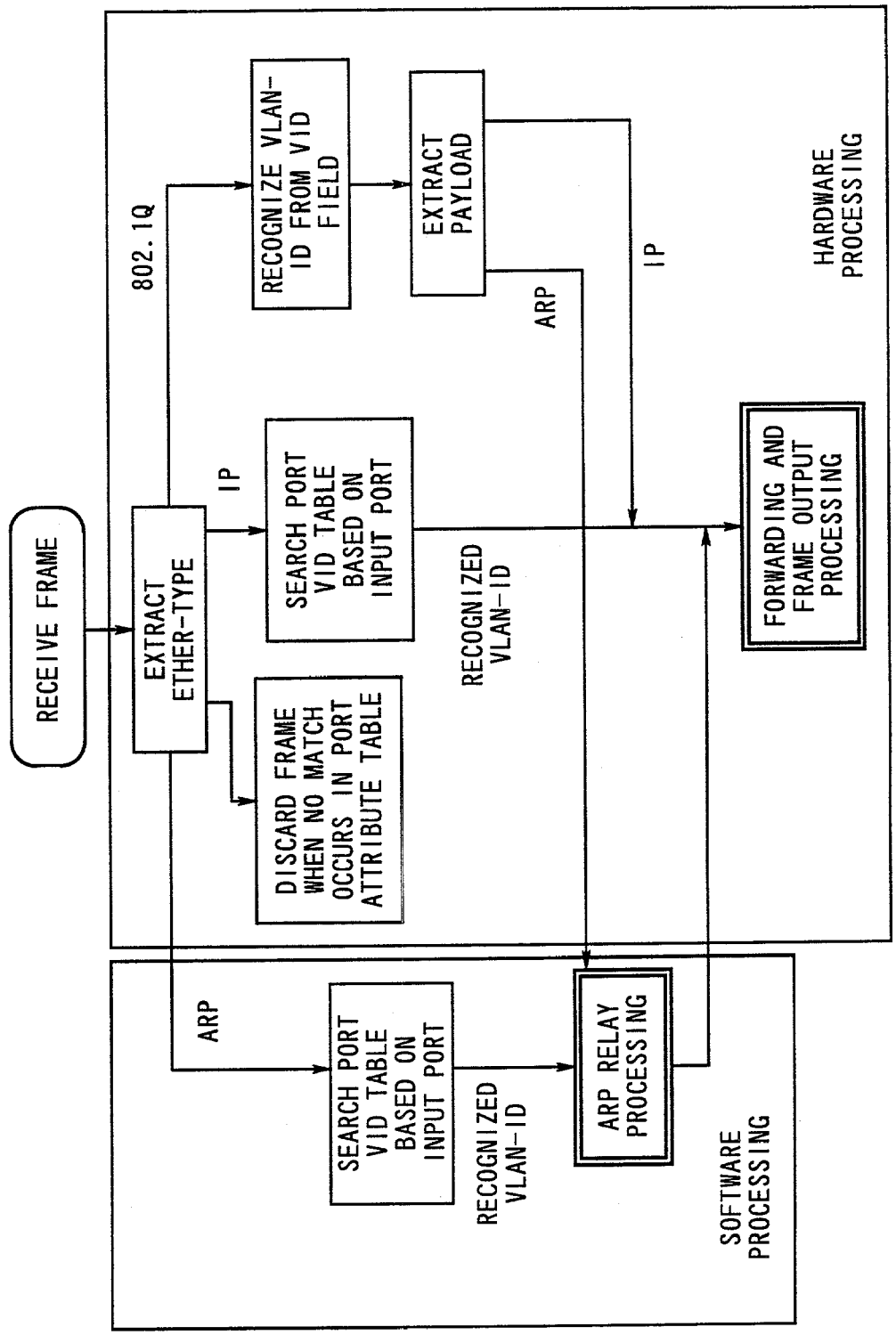
FIG. 38 is a flow diagram illustrating a sequence of operations performed by each provider-side edge L2 switch.

FIG. 36 is a diagram illustrating examples of connections between a plurality of ports of a provider-side edge L2 switch and a plurality of provider edge routers, FIG. 37 is a block diagram illustrating the functions of each provider-side edge L2 switch, and FIG. 38 is a flow diagram illustrating a sequence of operations performed by each provider-side edge L2 switch.

(9) Authentication Management by Communication Control Server

Operations for authentication management performed by the proxy Radius server 61 as the communication control server are explained below.

In the communication system according to the present invention, operations for access permission (i.e., decision on whether to permit transmission of a main-signal frame from a user terminal), operations for division of main-signal frames into paths to a plurality of service providers (attachment of a tag to each main-signal frame, and transmission of the tagged main-signal frame to the access network 6'), and signaling processing (PPPoE handling) are performed by each subscriber-side edge L2 switch connected to the user terminal.

However, operations of actual authentication is performed by comparison using a database possessed by a service provider.

The Radius protocol is a typical protocol used for authentication, and is specified in RFC 2865 to 2869. The Radius protocol uses UDP (User Datagram Protocol), and handles a user ID and a password as attributes (attribute values).

According to the Radius protocol, a Radius client (which is arranged in each subscriber-side edge L2 switch) sends a "Radius Access-Request" frame to a provider Radius server 52', which performs authentication by using a database. When the authentication succeeds, the provider Radius server 52' returns a "Radius Access-Accept" frame, which contains as attributes an IP address assigned to the user, and the like. When the authentication fails, the provider Radius server 52' returns a "Radius Access-Reject" frame.

In addition, when a "Radius Accounting-Request" frame containing a connection time, a communication data amount, and the like is sent to the provider Radius server 52', the service provider can manage statistic information on connection, and the like.

The Radius protocol is widely used in the ADSL connection and the like. Instead of the Radius protocol, another protocol realizing similar functions for authentication, such as TACACS (RFC 1492), LDAP (RFC 2251), Diameter, or the like may be used. For example, currently, efforts are moving ahead to standardize the Diameter as a next generation protocol which takes the place of the Radius protocol.

Further, although the CHAP protocol is used in the sequence explained before with reference to FIG. 6, another protocol (e.g., a protocol using one-time password, or a protocol realizing fingerprint authentication) may be used instead of the CHAP protocol.

Next, operations performed by the proxy Radius server 61 for transferring frames for authentication are explained below.

Figure 39:
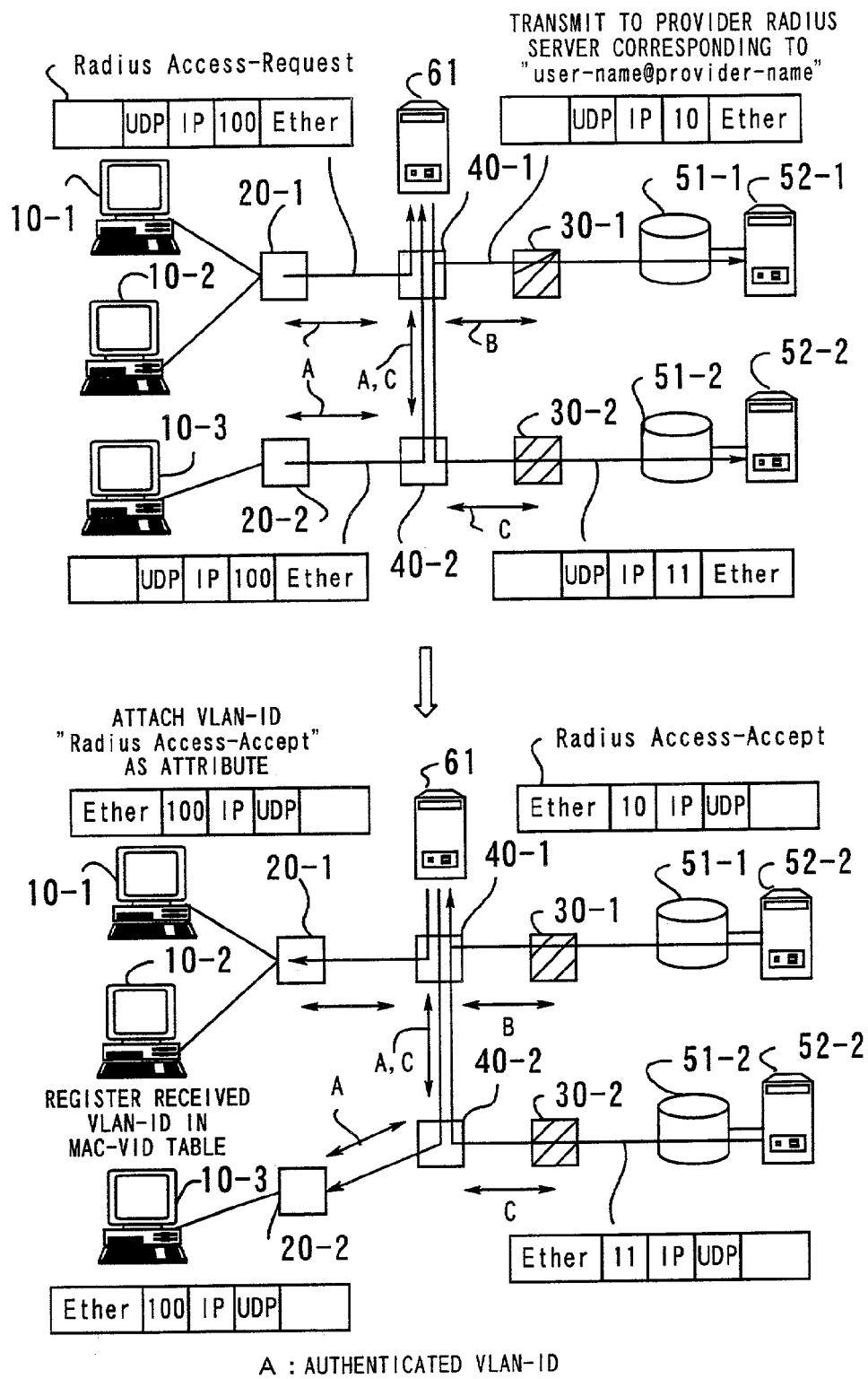
FIG. 39 is an explanatory diagram indicating examples of operations of transferring frames for authentication through the proxy Radius server 61.
Figure 41:
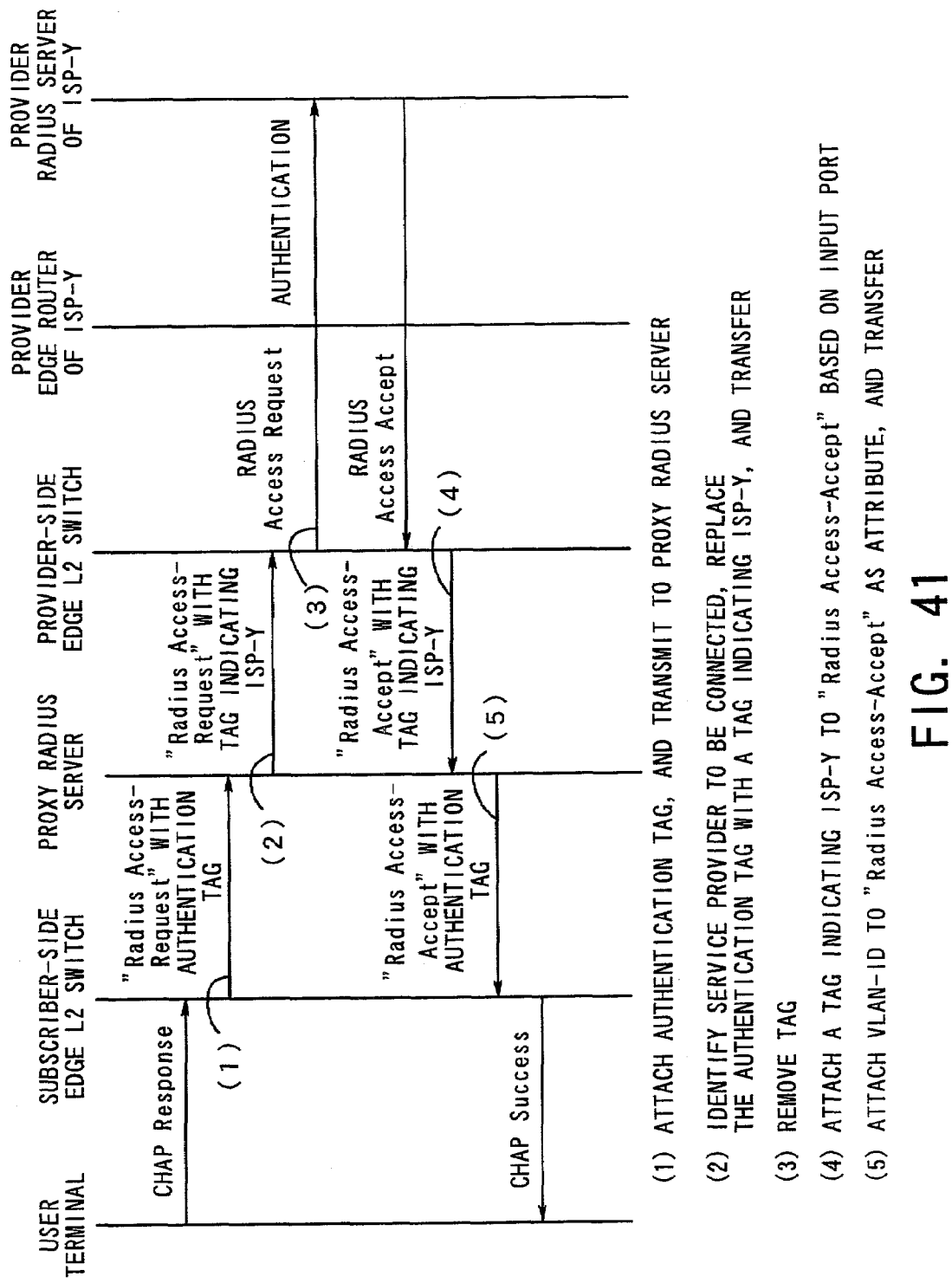
FIG. 41 is a diagram illustrating a sequence of operations from transmission of a user's request for authentication to successful authentication.

FIG. 39 is an explanatory diagram indicating examples of operations of transferring frames for authentication through the proxy Radius server 61. Examples of contents and flows of "Radius Access-Request" frames which are transmitted from user terminals and converted by the proxy Radius server 61 are indicated in the upper portion of FIG. 39, and examples of contents and flows of "Radius Access-Accept" frames which are transmitted from provider edge routers and converted by the proxy Radius server 61 are indicated in the lower portion of FIG. 39. In addition, FIG. 40 is a diagram illustrating an example of a provider management table held in the proxy Radius server 61, and FIG. 41 is a diagram illustrating a sequence of operations from transmission of a user's request for authentication to successful authentication.

When each subscriber-side edge L2 switch 20-1 or 20-2 receives a user ID "user-name@provider-name" and a password from a user terminal 10-1, 10-2, or 10-3, the subscriber-side edge L2 switch produces a "Radius Access-Request" frame containing the user ID and the password, attaches to the "Radius Access-Request" frame a tag (authentication tag) indicating that the frame contains authentication information, and sends the tagged "Radius Access-Request" frame to the proxy Radius server 61 by using an Ethernet frame.

The access network 6' is arranged to recognize frames having authentication tags as frames transmitted within an authentication VLAN, and correctly transfer the frames having authentication tags to the proxy Radius server 61 by using a known protocol such as GVRP. In this case, each core switch 40-1 or 40-2 recognizes the frames for authentication based on the authentication tags. Therefore, authentication information can be transferred to the proxy Radius server 61 without leakage of the authentication information to a third party.

The proxy Radius server 61 has a provider management table (for example, as illustrated in FIG. 40) which indicates correspondences between names of providers, VLAN-IDs, IP addresses of provider Radius servers, and the like. When the proxy Radius server 61 receives a frame for authentication, the proxy Radius server 61 identifies a service provider based on the user ID "user-name@provider-name", generates an Ethernet frame of a "Radius Access-Request" frame to which a tag indicating the service provider is attached, and sends the tagged Ethernet frame to the provider-side edge L2 switch connected to the provider Radius server 52'. When the provider-side edge L2 switch 30-1 or 30-2 receives the tagged Ethernet frame of the "Radius Access-Request" frame, the provider-side edge L2 switch removes the tag, and transfers the untagged Ethernet frame of the "Radius Access-Request" frame to the provider Radius server 52-1 or 52-2 which is connected to the above service provider indicated in the tag.

In response to the "Radius Access-Request" frame, the provider Radius server sends a "Radius Access-Accept" frame or a "Radius Access-Reject" frame to the proxy Radius server 61. When the proxy Radius server 61 receives the "Radius Access-Accept" frame from the provider Radius server, the proxy Radius server 61 adds to the "Radius Access-Accept" frame an attribute indicating a VLAN-ID corresponding to the service provider, and transfers the "Radius Access-Accept" frame to the subscriber-side edge L2 switch. When the authentication phase is completed, the subscriber-side edge L2 switch registers the VLAN-ID, which is added to the "Radius Access-Accept" frame as the attribute, in the MAC-VID table T2b.

In the above operations, the subscriber-side edge L2 switch is required to communicate with only the proxy Radius server 61. In addition, the VLAN-ID of the service provider, which is to be attached to each main-signal frame addressed to the service provider in the IP communication phase, is contained in the "Radius Access-Accept" frame. Therefore, it is unnecessary for the subscriber-side edge L2 switch to perform a registration operation corresponding to addition or removal of a service provider, since the information on addition or removal of a service provider is managed by the proxy Radius server 61 in a centralized manner. Consequently, the administration cost and the amount of the memory mounted on each subscriber-side edge L2 switch can be reduced.

Further, since each provider Radius server is required to communicate with only a single Radius client, the settings in the service providers in the communication system according to the present invention are not so different from the settings in the service providers in the conventional communication system, in which each provider Radius server communicates with the B-RAS as a single Radius client.

Furthermore, since an authentication tag is attached to each frame transmitted between each subscriber-side edge L2 switch and the proxy Radius server 61, and a tag indicating the connected service provider is attached to each frame transmitted between the proxy Radius server 61 and each provider Radius server, the security is ensured.

(10) Connection to More than One Service Provider

Connection to more than one service provider is explained below.

In the conventional communication system using PPPoE, a unique Session-ID is assigned to each session in the PPPoE Discovery Stage, and the operations for negotiation and transfer of encapsulated IP packets are performed by labeling the transferred frames with the assigned Session-ID. Therefore, in the conventional communication system, each user terminal can be concurrently connected to more than one service provider by identifying each session based on a source MAC address and the Session-ID.

Figure 43:
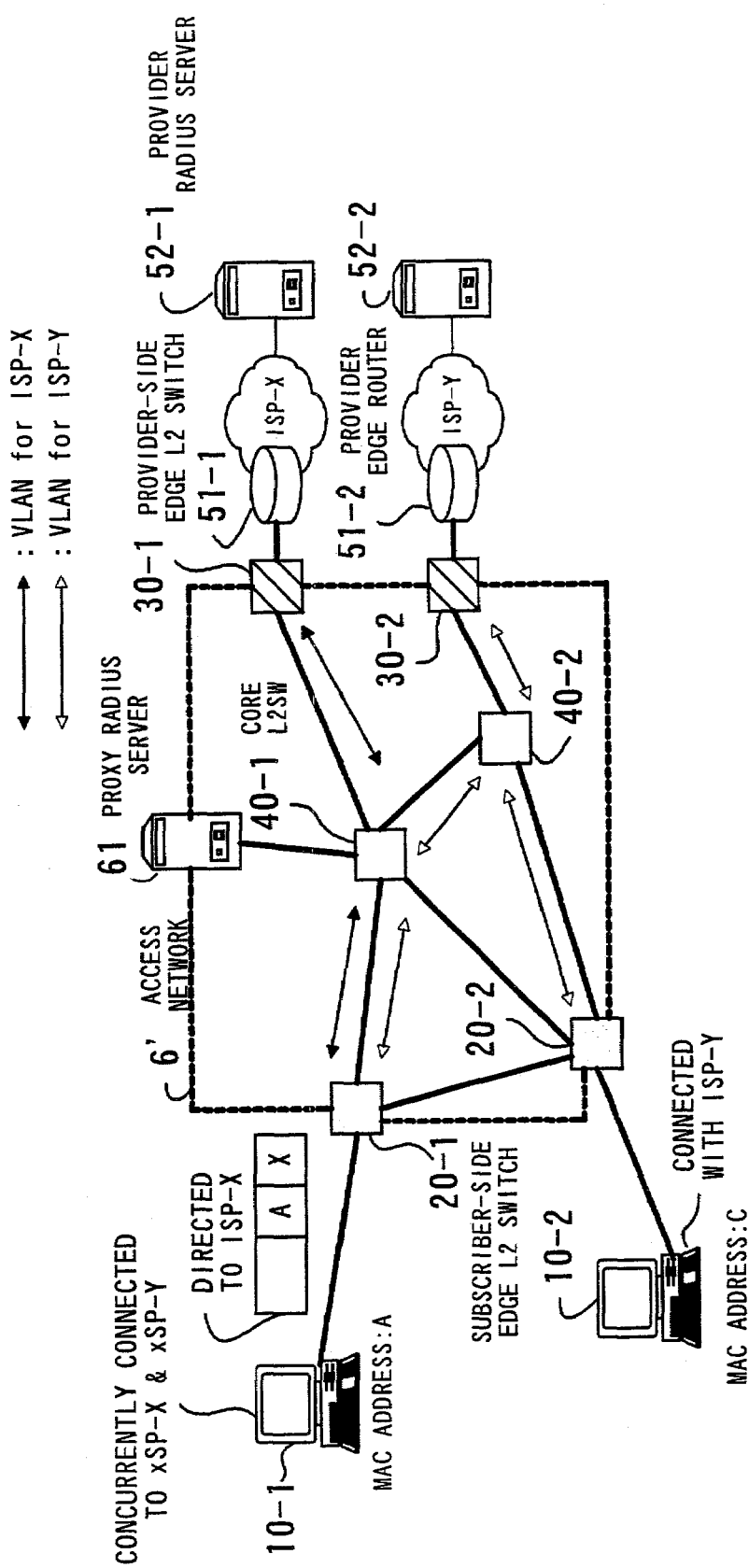
FIG. 43 is an explanatory diagram indicating examples of operations for transferring main-signal frames from a user terminal to two service providers.

According to the present invention, the signaling processing in the authentication phase is also performed in accordance with the PPPoE mechanism. Therefore, it is also possible to manage a plurality of sessions, for example, by using a session management table as illustrated in FIG. 42, which is a diagram illustrating examples of contents of a session management table in the case where a user terminal is concurrently connected to a plurality of service providers. In the example of FIG. 42, two Session-IDs each corresponding to a service provider are assigned to two sessions with a user terminal having a source MAC address "A" so that the two sessions are managed based on a combination of the source MAC address and the Session-ID. In addition, the session management functions of each user terminal can be arranged to manage a plurality of sessions and send main-signal frames to a plurality of service providers, as illustrated in FIG. 43, which is an explanatory diagram indicating examples of operations for transferring main-signal frames from a user terminal to two service providers.

However, since each subscriber-side edge L2 switch receives the main-signal frames in an IPoE form according to the present invention, the main-signal frames do not have the "Session-ID" field. If the MAC-VID table T2b is searched based on the source MAC address indicated in the IPoE frame, a plurality of matches occur, i.e., a plurality of VLAN-IDs are obtained, for example, as illustrated in FIG. 44A. Therefore, a VLAN-ID which is to be indicated by a tag attached to each main-signal frame to be sent cannot be uniquely identified, i.e., a service provider to which each main-signal frame is to be sent cannot be determined.

The first solution to the above problem is as follows.

That is, in each subscriber-side edge L2 switch in the communication system according to the present invention, when a plurality of VLAN-IDs are obtained by a search of the MAC-VID table T2b based on the source MAC address, a VLAN-ID which is to be indicated by a tag attached to each main-signal frame to be sent (i.e., a service provider to which each main-signal frame is to be sent) is uniquely determined based on the destination MAC address. In order to realize the unique determination of a VLAN-ID (service provider) based on the destination MAC address, a destination-MAC-address table is produced by utilizing the ARP relay function as explained below.

As explained before, it is necessary to transmit an ARP request for a destination MAC address before transmitting an IPoE frame. In response to the ARP request, for example, one of the other edge L2 switches in which a hit occurs in an ARP relay table returns an ARP reply with a tag indicating a VLAN-ID, on behalf of the target provider edge router. Since the ARP reply is unicast, only one edge L2 switch receives the ARP reply. Then, the edge L2 switch which receives the ARP reply registers a correspondence between the destination MAC address and a VLAN-ID in the destination-MAC-address table based on the source MAC address ("Src Hw Addr") of the ARP reply and the tag attached to the ARP reply.

Thus, before transmission of main-signal frames to a plurality of service providers, destination MAC addresses corresponding to the plurality of service providers are registered in the destination-MAC-address table, for example, as illustrated in FIG. 44B. Therefore, the VLAN-ID which is to be indicated by a tag attached to each main-signal frame to be sent can be uniquely determined.

In order to avoid an unnecessary search, each subscriber-side edge L2 switch is arranged to search the destination-MAC-address table only when a plurality of VLAN-IDs are obtained by a search of the MAC-VID table T2b based on the source MAC address, i.e., when a user terminal is concurrently connected to a plurality of service providers.

On the other hand, when each subscriber-side edge L2 switch receives a main-signal frame from the access network 6', a MAC address of a user terminal can be uniquely determined based on a VLAN-ID which is indicated by a tag attached to the main-signal frame, regardless of whether the user terminal is connected to a single service provider or multiple service providers.

Each connection between a user terminal and a service provider is terminated by using a PPPoE frame "LCP Terminate-Request", which has the format illustrated in FIG. 21. Therefore, only an entry of the MAC-VID table T2b corresponding to the source MAC address of the user terminal and a Session-ID corresponding to the connection is deleted.

Figure 45:
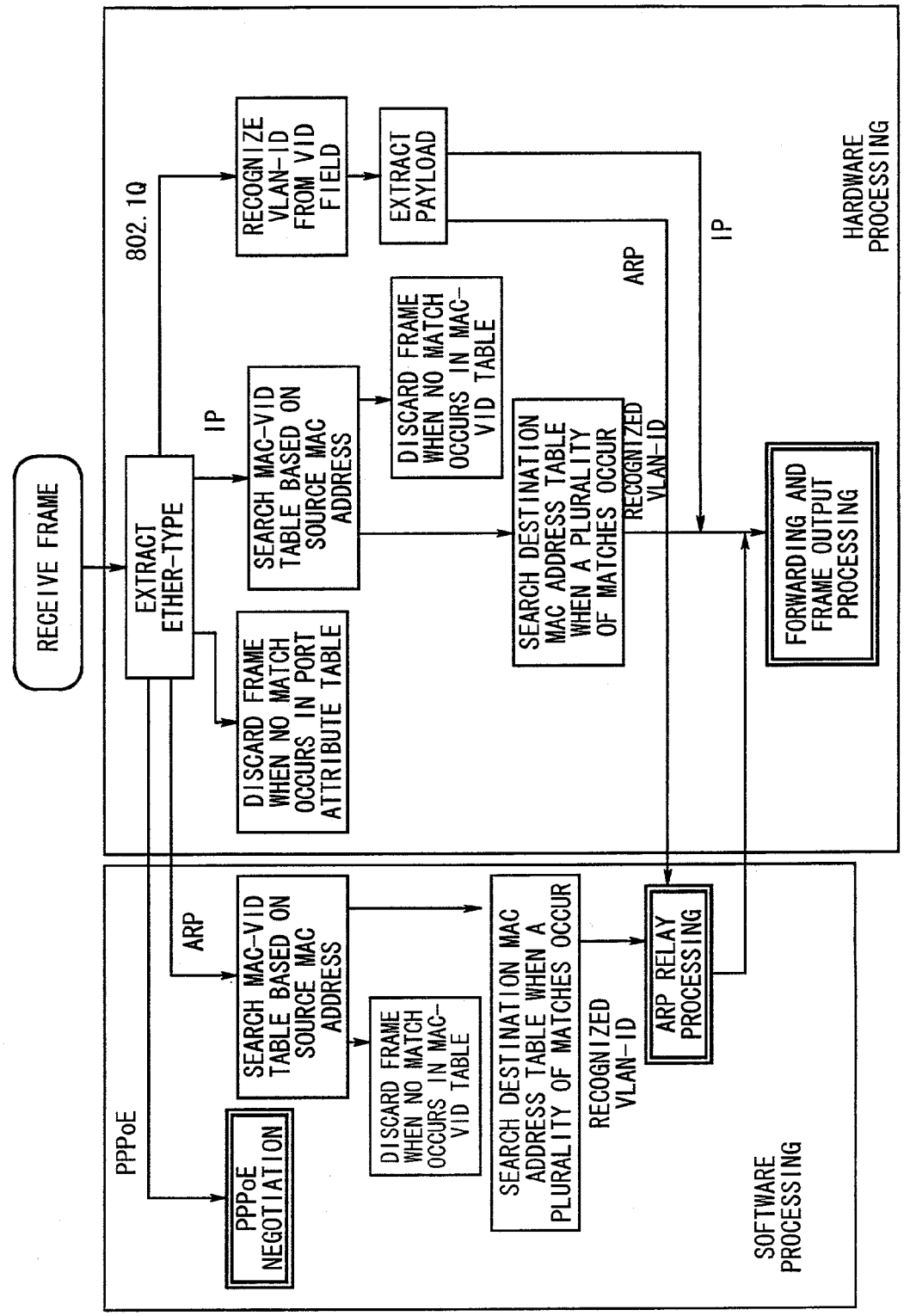
FIG. 45 is a flow diagram indicating the overall operation of each subscriber-side edge L2 switch including the ARP relay processing and the search of a destination-MAC-address table.
Figure 46:
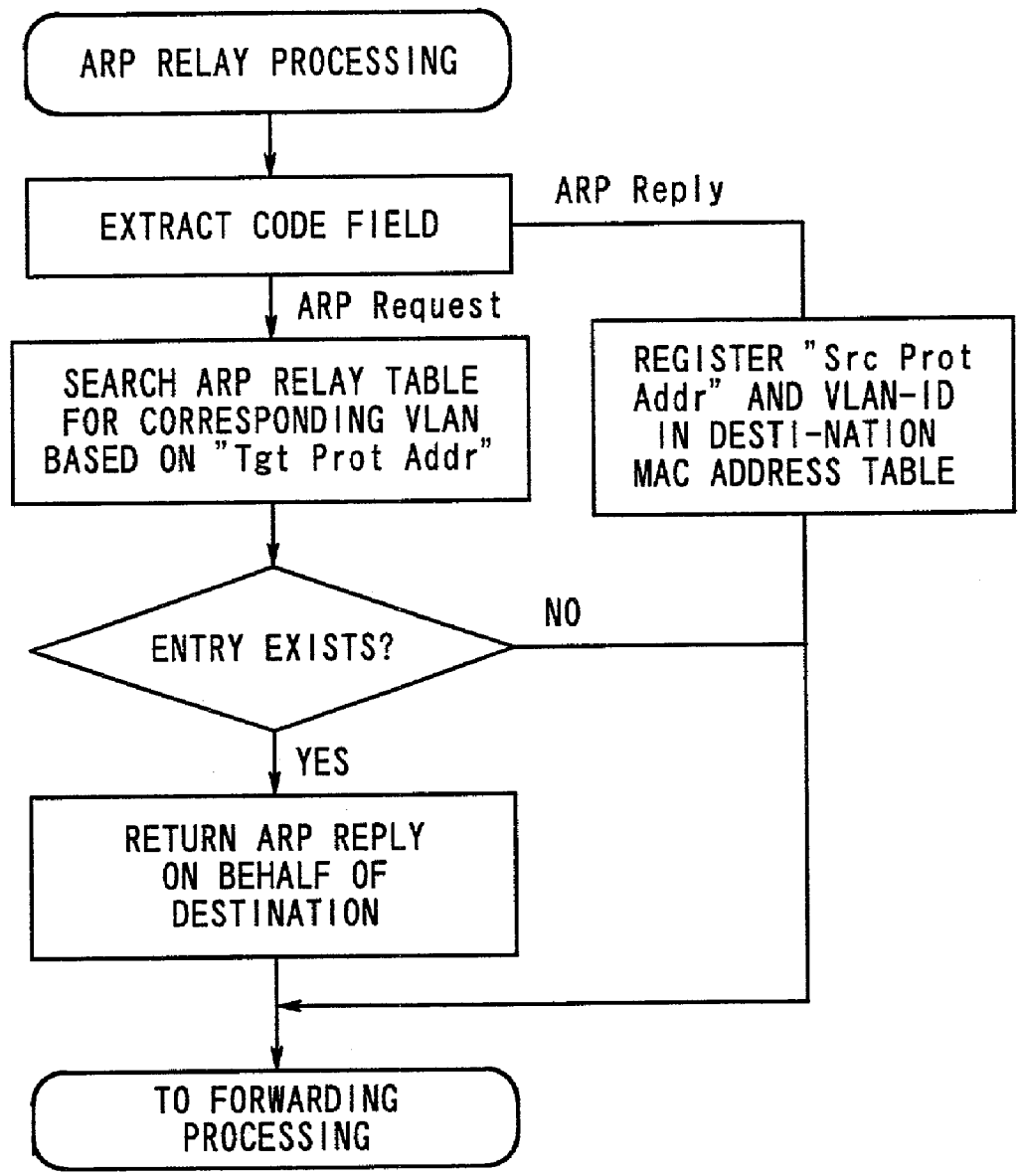
FIG. 46 is a flow diagram illustrating a sequence of operations for the ARP relay processing including registration in the destination-MAC-address table.

FIG. 45 is a flow diagram indicating the overall operation of each subscriber-side edge L2 switch including the ARP relay processing and the search of a destination-MAC-address table, and FIG. 46 is a flow diagram illustrating a sequence of operations for the ARP relay processing including registration in the destination-MAC-address table.

The second solution to the aforementioned problem occurring in the case where a user terminal is concurrently connected to a plurality of service providers is as follows.

That is, in each subscriber-side edge L2 switch in the communication system according to the present invention, when a plurality of VLAN-IDs are obtained by a search of the MAC-VID table T2b based on the source MAC address, a VLAN-ID which is to be indicated by a tag attached to each main-signal frame to be sent (i.e., a service provider to which each main-signal frame is to be sent) is uniquely determined based on the Layer 3 address (IP subnet) of the user terminal as well as the Layer 2 address of the user terminal.

The IP address is comprised of a network portion (IP subnet) and a host portion in either IPv4 or IPv6. The IP address is assigned from an address pool to a user terminal when the user terminal is connected to a service provider. Since the IP subnet is unique to each service provider, it is possible to determine which service provider is the destination of each main-signal frame, based on the IP subnet, when a plurality of service providers are connected to a user terminal. Therefore, in order to realize the unique determination of a VLAN-ID (service provider) based on the IP subnet, an IP subnet table is provided in each subscriber-side edge L2 switch, in which correspondences between IP subnets and VLAN-IDs are indicated, for example, as illustrated in FIG. 47. When a plurality of VLAN-IDs are obtained by a search of the MAC-VID table T2b based on the source MAC address (i.e., a plurality of matches occur), a VLAN-ID which is to be indicated by a tag attached to each main-signal frame to be sent (i.e., a service provider to which each main-signal frame is to be sent) can be uniquely determined based on the IP subnet.

Since the IP subnet is unique to each service provider and fixed, a fixed IP subnet table is provided in each edge L2 switch.

In addition, when a new service provider is added to the communication system, a new entry of the IP subnet table corresponding to the new service provider may be registered in the IP subnet table by the proxy Radius server 61 using a management protocol such as SNMP (Simple Network Management Protocol).

The above determination of the VLAN-ID (service provider) by using the IP subnet table based on the IP subnet is made only when a plurality of VLAN-IDs are obtained by a search of the MAC-VID table T2b based on the source MAC address, i.e., a plurality of matches occur. When no entry corresponding to the source MAC address is found in the MAC-VID table T2b, the user is determined to be unauthenticated, and the main-signal frame is discarded.

Figure 48:
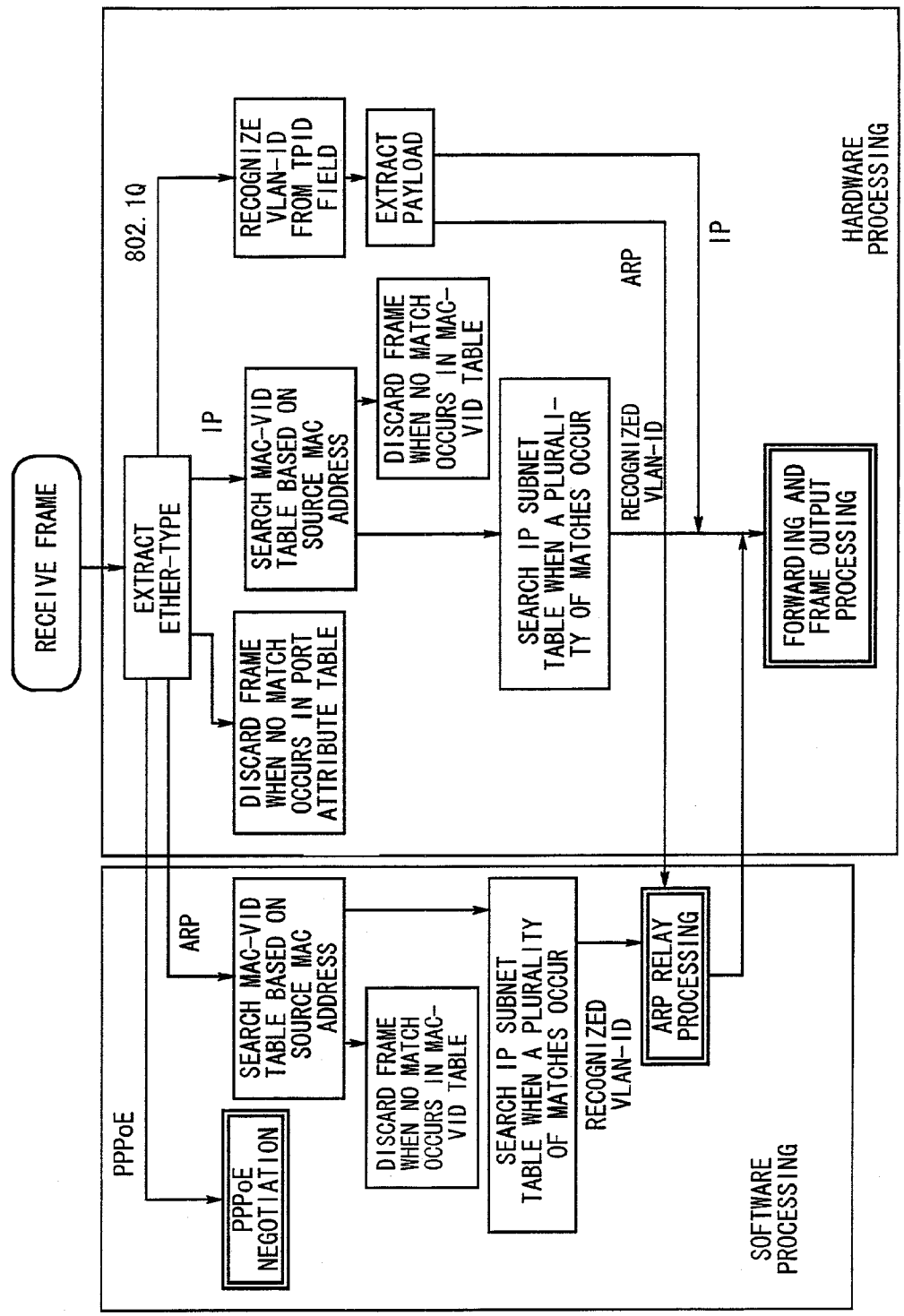
FIG. 48 is a flow diagram indicating the overall operation of each subscriber-side edge L2 switch including the ARP relay processing and the search of an IP subnet table.

FIG. 48 is a flow diagram indicating the overall operation of each subscriber-side edge L2 switch including the ARP relay processing and the search of an IP subnet table.

The third solution to the aforementioned problem occurring in the case where a user terminal is concurrently connected to a plurality of service providers is as follows.

Figure 49:
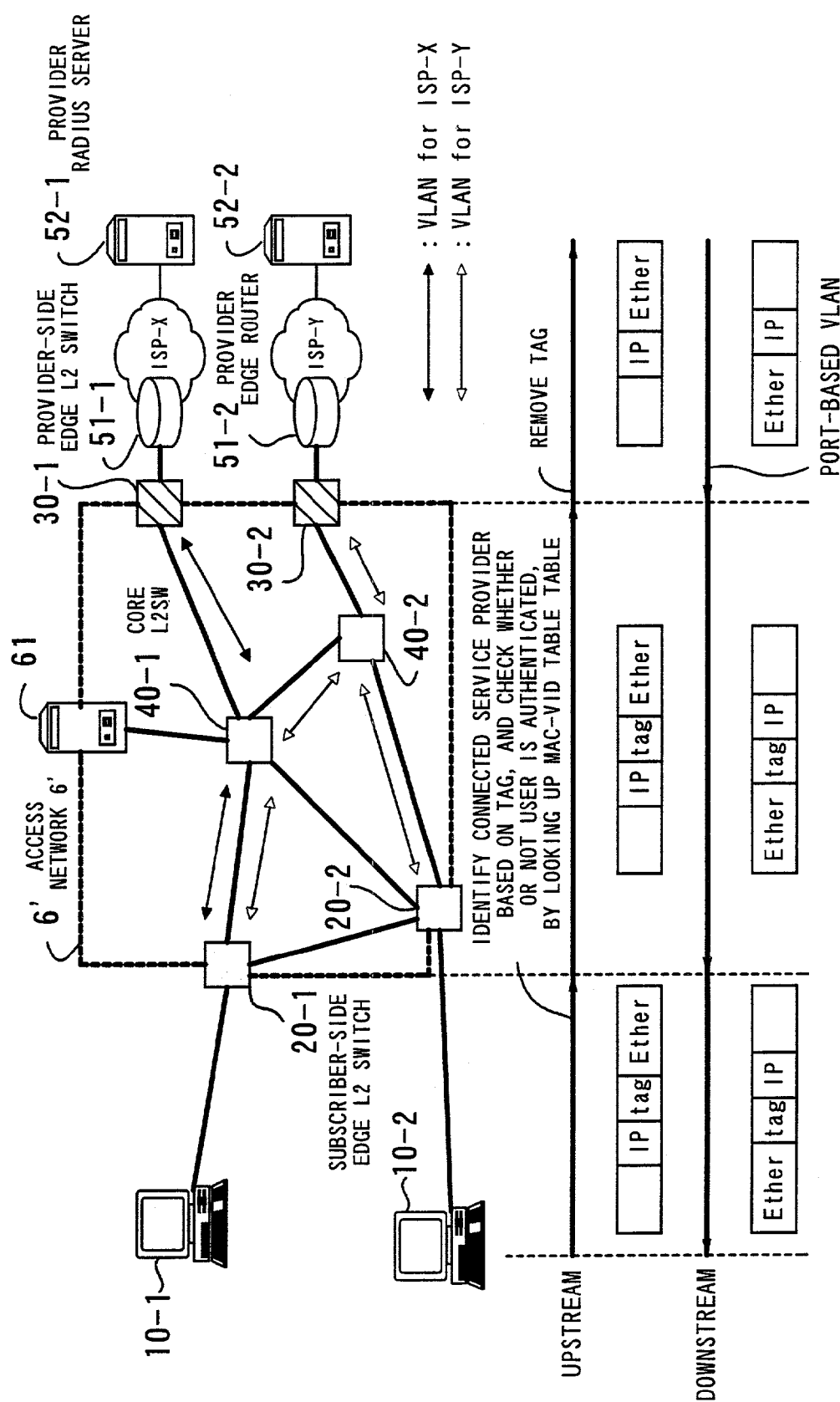
FIG. 49 is an explanatory diagram illustrating examples of operations of the communication system according to the present invention in the case each user attaches an appropriate one of the distributed tags to each main-signal frame.

That is, tags each of which uniquely identifies a service provider in the access network 6' (e.g., each of which indicates a VLAN-ID) is distributed to each user in the authentication phase as well as the assignment of the IP address, and each user attaches an appropriate one of the distributed tags to each main-signal frame so as to form an IEEE 802.1Q tagged frame, and transmits the IEEE 802.1Q tagged frame, as illustrated in FIG. 49, which is an explanatory diagram illustrating examples of operations of the communication system according to the present invention in the case where each user attaches an appropriate one of the distributed tags to each main-signal frame.

Thus, the subscriber-side edge L2 switch connected to the user terminal can recognize the service provider (VLAN-ID) even when a plurality of VLAN-IDs are obtained by a search of the MAC-VID table T2b based on the source MAC address of the user terminal. In order to confirm authentication of the user (i.e., in order to prevent transfer of an IEEE 802.1Q tagged frame from an unauthenticated user), the search of the MAC-VID table T2b based on the source MAC address of the user terminal is still necessary. The search of the MAC-VID table T2b may be made either before and after the recognition of the service provider (VLAN-ID) based on the tag in the IEEE 802.1Q tagged frame.

In this case, in the port attribute table T2d (as illustrated in FIG. 10) in each subscriber-side edge L2 switch, the field "RECEPTION FRAME" for each user-side port is set to contain "IEEE 802.1Q", and the field "TAGGED/UNTAGGED" for each user-side port is set to indicate "With Tag".

Even in the above case, the operations of the provider-side edge L2 switch are not changed. That is, when each provider-side edge L2 switch receives the IEEE 802.1Q tagged frame transferred as above, the provider-side edge L2 switch removes the tag from the IEEE 802.1Q tagged frame, and transfers the untagged frame to a provider edge router corresponding to the service provider, as illustrated in FIG. 49. In addition, when each provider-side edge L2 switch receives a frame transferred from a service provider, the provider-side edge L2 switch attaches a tag to the frame based on the port through which the frame is input, and transfers the tagged frame through the access network 6' toward a user terminal.

Figure 50:
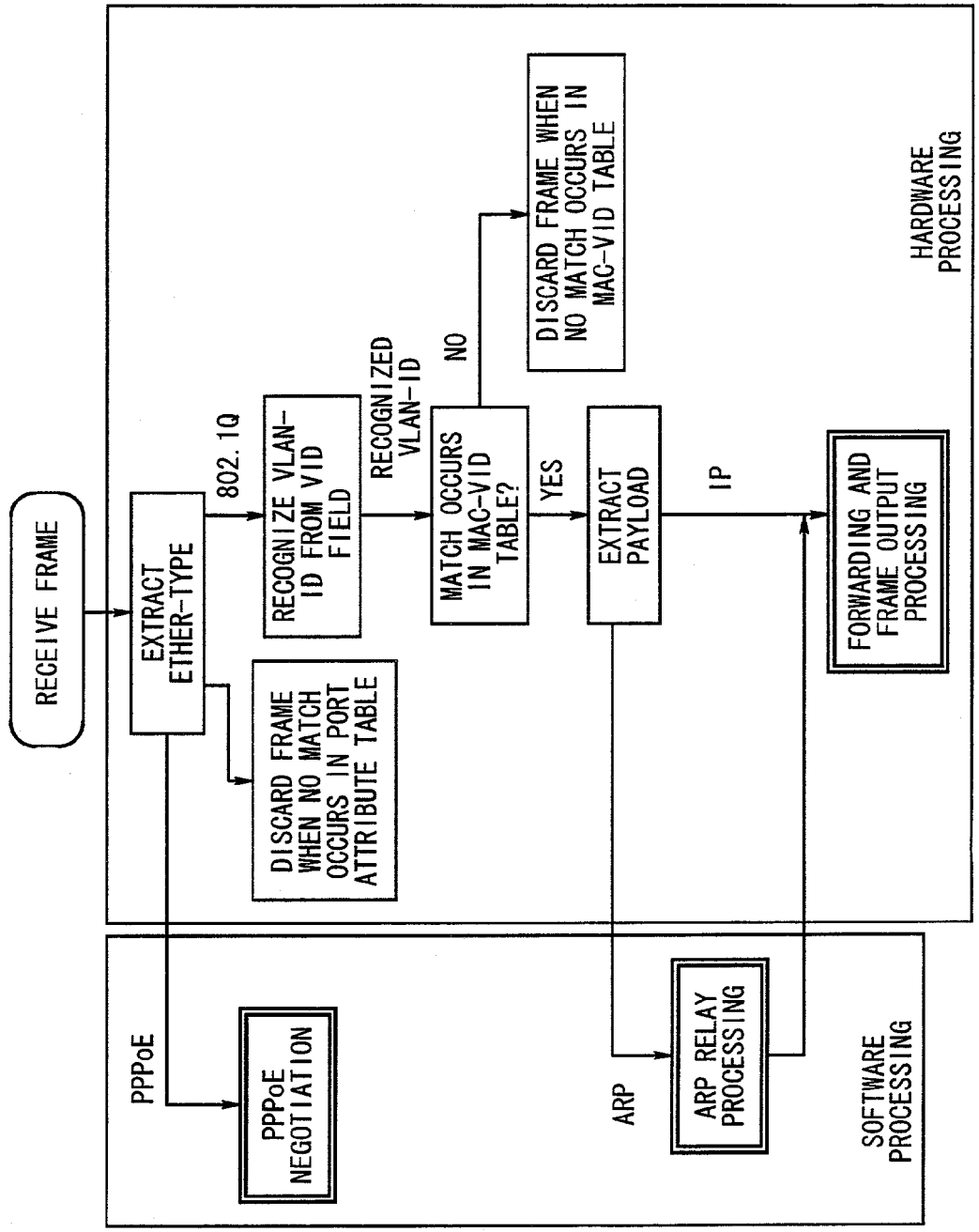
FIG. 50 is a flow diagram indicating the overall operation of each subscriber-side edge L2 switch including ARP relay processing in the case where each user terminal transmits an IEEE 802.1Q tagged frame.

FIG. 50 is a flow diagram indicating the overall operation of each subscriber-side edge L2 switch including ARP relay processing in the case where each user terminal transmits an IEEE 802.1Q tagged frame.

Even when an IEEE 802.3Q VLAN-Tag is attached to each main-signal frame transmitted by each user terminal, the main-signal frame is not encapsulated in accordance with PPP. Therefore, when Ethernet interface cards compatible with IEEE 802.3ac-1998 are used, IP packets having an MTU of 1,500 bytes can be transmitted.

(11) Session Management by Communication Control Server

Operations for session management performed by the communication control server are explained below. Hereinbelow, functions for session management realized by the communication control server may be referred to as a session management server. As explained before, the operations for access permission (i.e., decision on whether to permit transmission of a main-signal frame from a user terminal) and the operations for division of main-signal frames into paths to a plurality of service providers (attachment of a tag to each main-signal frame, and transmission of the tagged main-signal frame to the access network 6') are performed by hardware, and signaling processing (PPPoE handling) is performed by software. In addition, the session management server can perform the signaling processing in a centralized manner, and the main-signal frames and management frames are separately processed in different pieces of equipment.

As explained before, negotiated conditions differ with different users. Therefore, the processing load of the negotiation by using PPP management frames is heavy. According to the present invention, processing for the negotiation is performed in a distributed manner by the subscriber-side edge L2 switches connected to the user terminals. Therefore, the processing load of the negotiation can be reduced in the communication system according to the present invention compared with the conventional communication system in which the processing concentrates in the B-RAS. However, it is preferable that the processing load imposed on each subscriber-side edge L2 switch is further reduced.

In order to further reduce the processing load imposed on each subscriber-side edge L2 switch, each subscriber-side edge L2 switch may transfer management frames to the session management server arranged in the access network 6' without processing the management frames in the subscriber-side edge L2 switch, where the transfer operation in the subscriber-side edge L2 switch is performed by hardware in a similar manner to the transfer operation of the main-signal frames.

Figure 51A:
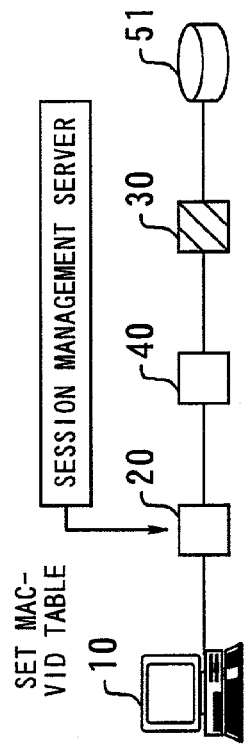
FIG. 51A is an explanatory diagram illustrating remote setting of the MAC-VID table by a session management server.

The session management server has a session management table as illustrated in FIG. 7, and performs negotiation with users. However, since the operations for access permission and the operations for division of main-signal frames into paths to a plurality of service providers are performed by each subscriber-side edge L2 switch, it is necessary for the session management server to configure the subscriber-side edge L2 switch to which the authenticated user terminal is connected, after completion of the authentication phase. For example, the session management server must remotely set the MAC-VID table T2b in the subscriber-side edge L2 switch, as illustrated in FIG. 51A. Based on the MAC-VID table T2b set by the session management server, the main-signal frames can be tagged as explained before, and transferred from each user terminal to a provider edge router, as illustrated in FIG. 51B, which is an explanatory diagram illustrating tagging and untagging of main-signal frames, and protocol stacks relating to the transfer of the main-signal frames, in each user terminal, each subscriber-side edge L2 switch, each core switch, each provider-side edge L2 switch, and the provider edge router.

Although the subscriber-side edge L2 switch can be set by using a conventional management protocol such as SNMP, management frames which are transferred from users through subscriber-side edge L2 switches do not contain information indicating the subscriber-side edge L2 switches. Therefore, the session management server cannot recognize a subscriber-side edge L2 switch to which a user terminal as a source of each management frame is connected.

In order to solve the above problem, when each subscriber-side edge L2 switch receives a management frame from a user terminal, the subscriber-side edge L2 switch attaches to the management frame a tag identifying the subscriber-side edge L2 switch before the subscriber-side edge L2 switch sends the management frame to the session management server, as illustrated in FIG. 52A, which is an explanatory diagram illustrating transfer of management frames between each user terminal and the session management server through a subscriber-side edge L2 switch. In addition, FIG. 52B is a diagram illustrating protocol stacks relating to the transfer of the management frames, in each user terminal, each subscriber-side edge L2 switch, the session management server, and the provider Radius server.

Figure 51B:
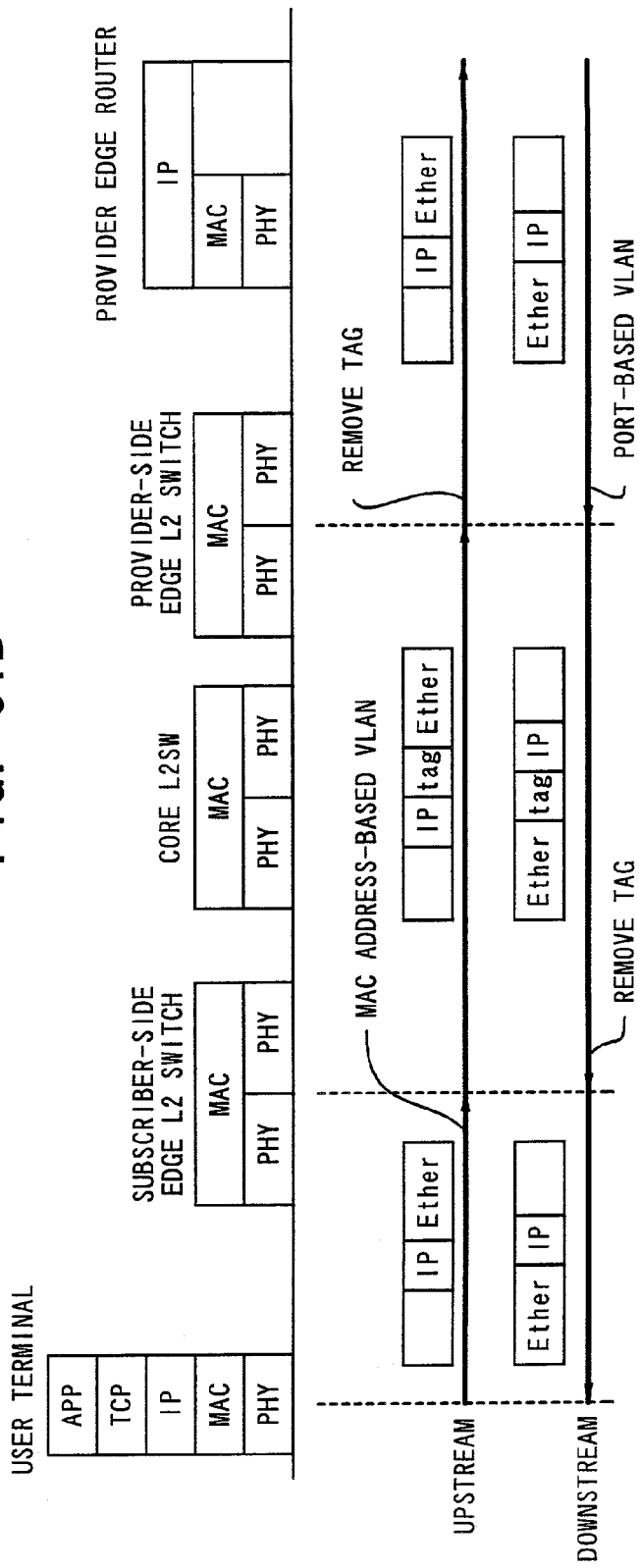
FIG. 51B is an explanatory diagram illustrating tagging and untagging of main-signal frames, and protocol stacks relating to the transfer of the main-signal frames, in each user terminal, each subscriber-side edge L2 switch, each core switch, each provider-side edge L2 switch, and a provider edge router.

That is, while each subscriber-side edge L2 switch attaches to each main-signal frame a tag indicating a service provider (i.e., the flow of the main-signal frames are not changed as illustrated in FIG. 51B), each subscriber-side edge L2 switch attaches to each management frame a tag indicating the subscriber-side edge L2 switch. In this case, each subscriber-side edge L2 switch has a table indicating an ID value based on which the session management server can identify the subscriber-side edge L2 switch when the "ETHER TYPE" field of a frame received by the subscriber-side edge L2 switch indicates that the received frame is a management frame, i.e., when the "ETHER TYPE" field of the received frame indicates "0x8863". The operations which the subscriber-side edge L2 switch are required to perform for tagging a management frame are reference to the table for the ID value and attachment of the tag indicating the ID value to the management frame.

The session management server can manage a session with a user terminal based on a source MAC address contained in a frame received by the session management server (i.e., a MAC address of the user terminal), and recognize a subscriber-side edge L2 switch to which the user terminal is connected, based on the tag attached to the received frame. In addition, the session management server directly communicates with the provider Radius server. At this time, the session management server behaves as a Radius client. That is, each service provider is required to communicate with only one Radius client.

Figure 53:
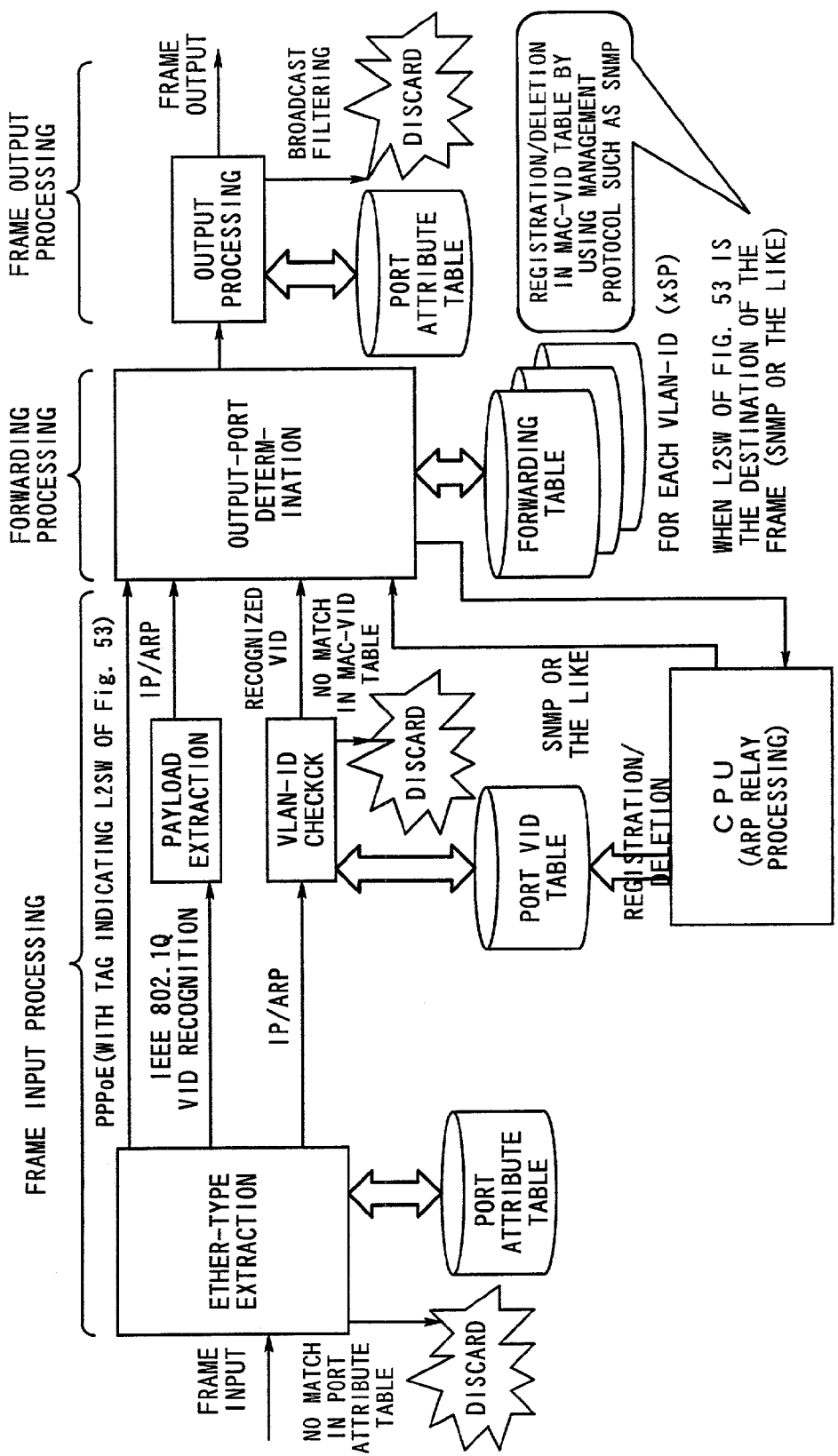
FIG. 53 is a block diagram illustrating the functions of each subscriber-side edge L2 switch in the case where the signaling processing is performed by the session management server in a centralized manner.
Figure 54:
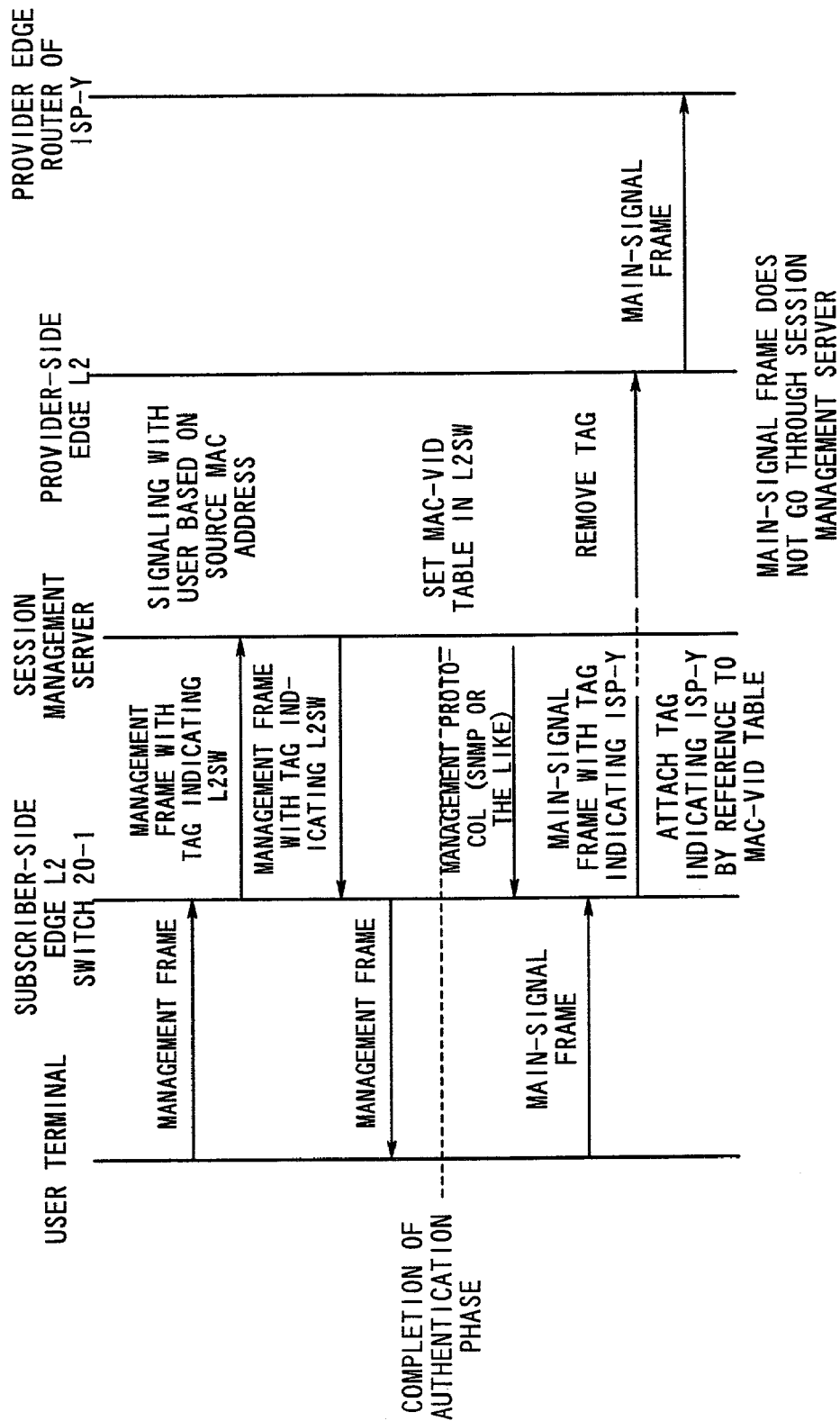
FIG. 54 is a diagram illustrating a sequence of operations of the communication system according to the present invention in the case where the signaling processing is performed by the session management server in a centralized manner.

FIG. 53 is a block diagram illustrating the functions of each subscriber-side edge L2 switch in the case where the signaling processing is performed by the session management server in a centralized manner, and FIG. 54 is a diagram illustrating a sequence of operations of the communication system according to the present invention in the case where the signaling processing is performed by the session management server in a centralized manner. In this case, it is unnecessary to change the functions of each user terminal, each provider-side edge L2 switch, and other equipment arranged on the provider side.

As explained above, when the signaling processing is performed by the session management server in a centralized manner, each subscriber-side edge L2 switch transfers both the main-signal frames and management frames by hardware. Therefore, processing load imposed on each subscriber-side edge L2 switch can be greatly reduced. Although the processing for the session management is centralized, the processing for the session management is performed by a dedicated apparatus (server). Therefore, it is easy to upgrade a CPU and a memory corresponding to increase in the amount of processing. Alternatively, it is possible to perform the processing for the session management in a distributed manner by using a load balancer and a plurality of servers.

(12) Other Function of Session Management Server

Another function of the session management server is explained below.

Figure 55:
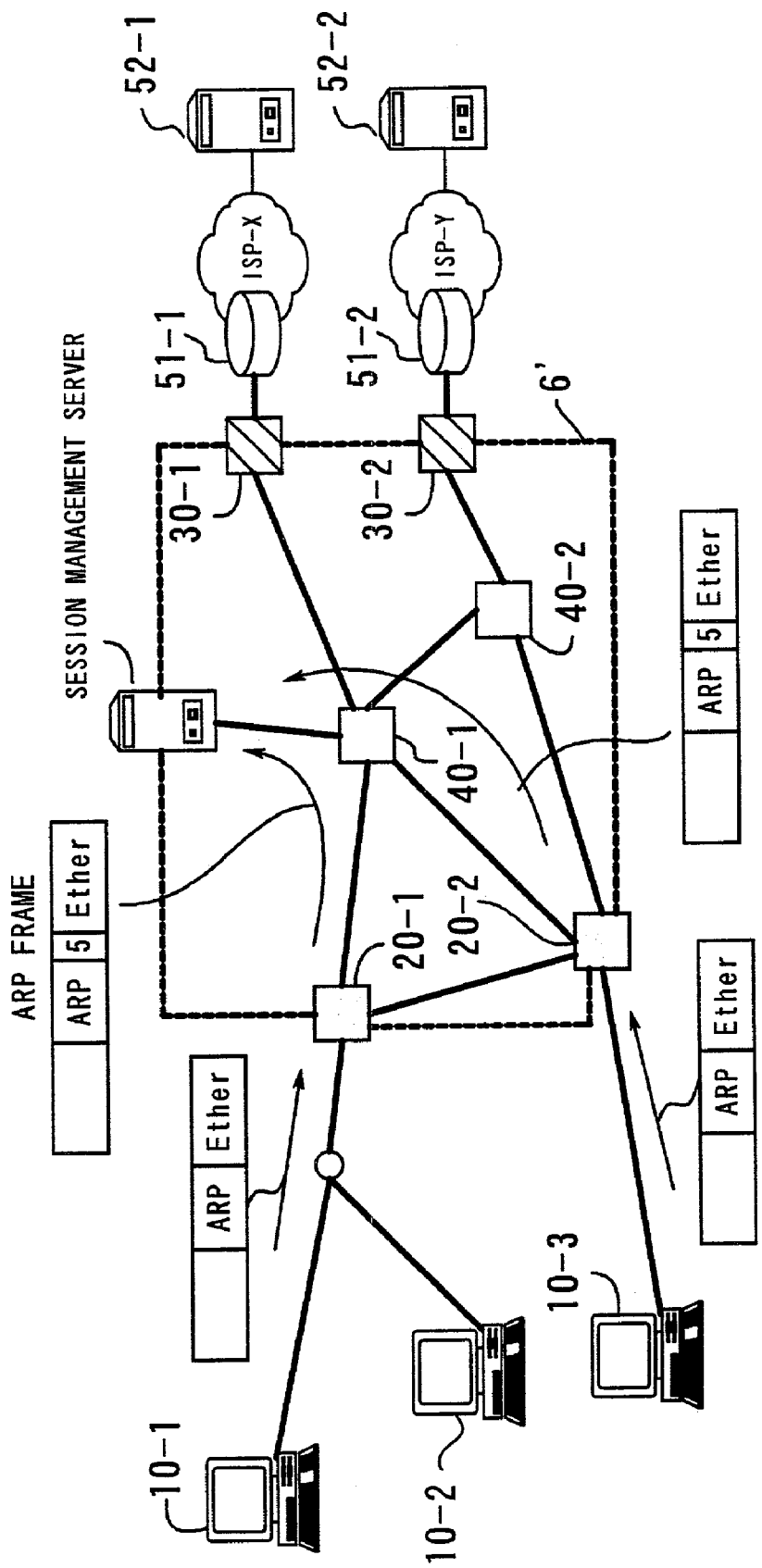
FIG. 55 is an explanatory diagram illustrating transfer of ARP frames between each user terminal and the session management server through a subscriber-side edge L2 switch.

The session management server produces an ARP relay table based on the session management table when the user authentication is completed. When each subscriber-side edge L2 switch receives an ARP request frame from a user terminal, the subscriber-side edge L2 switch recognizes that the received frame is an ARP request frame, based on the "ETHER TYPE" field (="0x0806") of the received frame, attaches a tag to the ARP request frame, and transfers the tagged ARP request frame to the session management server, as illustrated in FIG. 55, which is an explanatory diagram illustrating transfer of ARP frames between each user terminal and the session management server through a subscriber-side edge L2 switch. The tag is predetermined in the access network 6' so as to indicate that the frame is an ARP request frame. In addition, the access network 6' is configured so that the tagged ARP request frame is transferred to the session management server by using a known management protocol such as GVRP. That is, although the ARP request frame does not contain a definite destination MAC address, unnecessary broadcasting of the ARP request frame does not occur.

Figure 56:
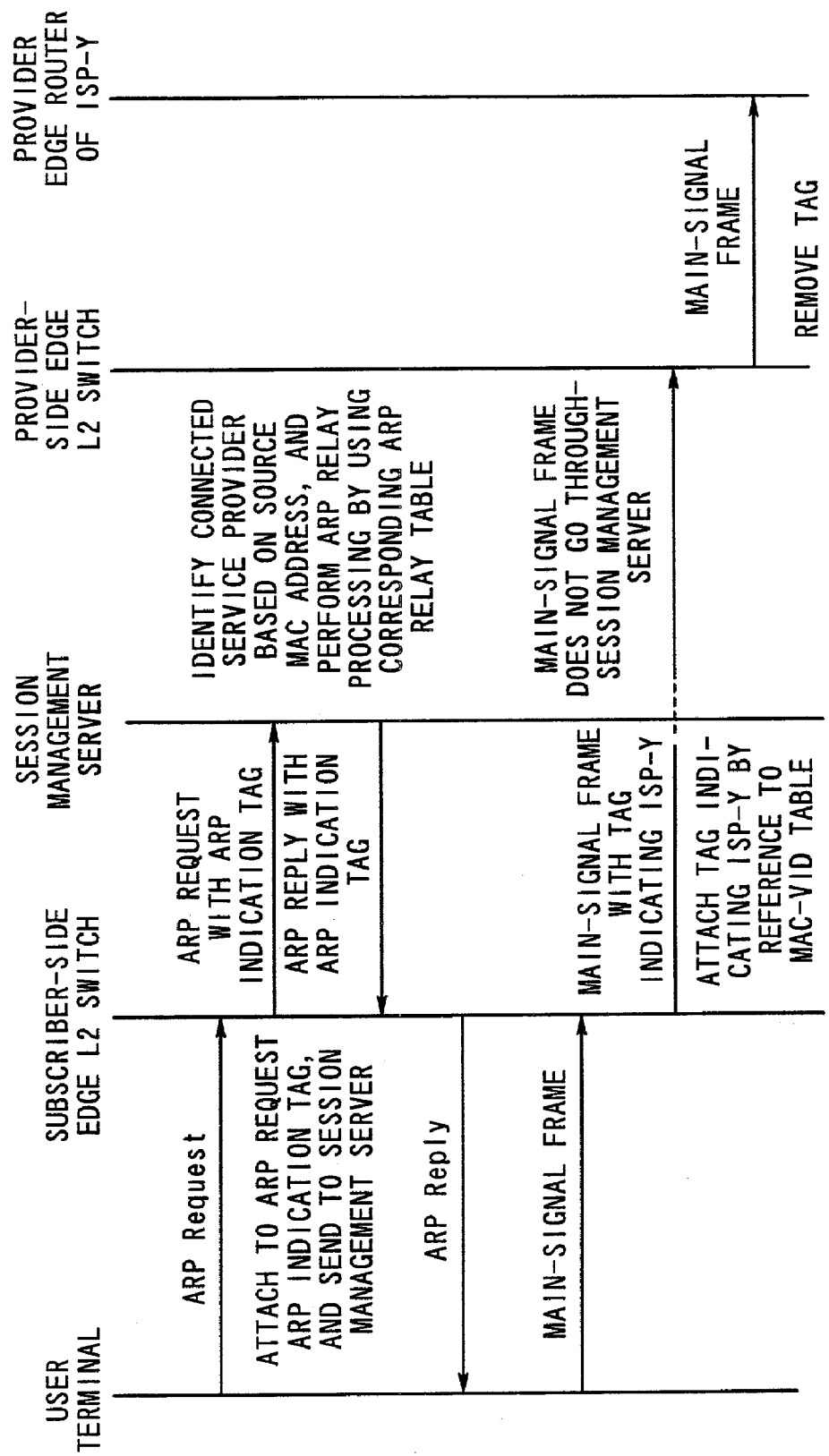
FIG. 56 is a diagram illustrating a sequence of ARP relay operations in the case where the session management server returns an ARP reply.
Figure 57:
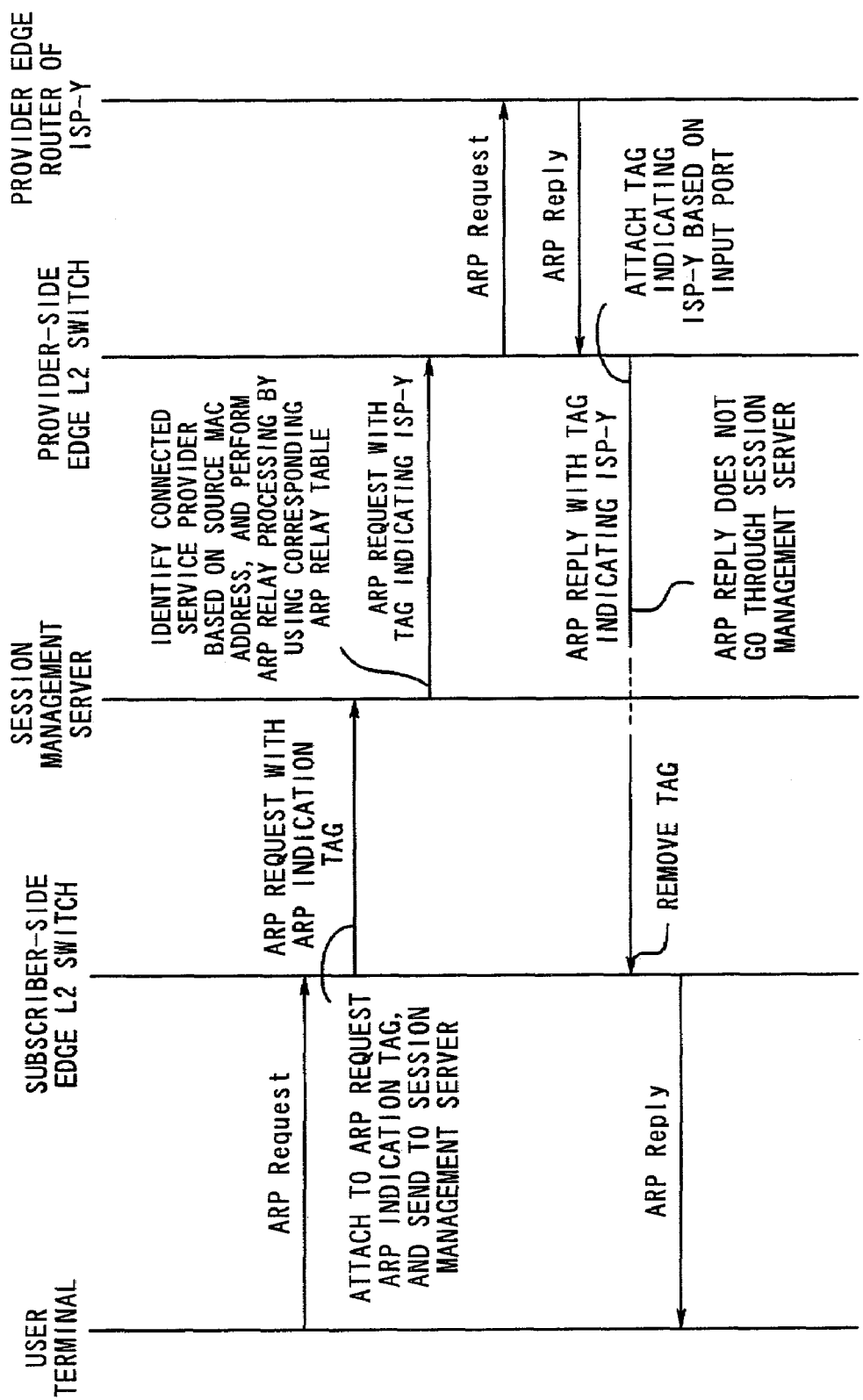
FIG. 57 is a diagram illustrating a sequence of ARP relay operations in the case where the session management server converts a broadcast ARP request frame to a unicast ARP request frame.

When the session management server receives the ARP request frame, and a hit occurs in the ARP relay table, the session management server returns an ARP reply frame to the user terminal on behalf of a target service provider of the ARP request, as illustrated in FIG. 56, which is a diagram illustrating a sequence of ARP relay operations in the case where the session management server returns an ARP reply. Alternatively, the session management server converts the broadcast ARP request frame to a unicast ARP request frame, attaches a tag corresponding to a target service provider, and transfers the tagged unicast ARP request frame to only the target service provider, as illustrated in FIG. 57, which is a diagram illustrating another sequence of ARP relay operations in the case where the session management server converts a broadcast ARP request frame to a unicast ARP request frame. Thus, IPoE frames can be transmitted while maintaining user concealment.

(13) Handling of Encapsulated Main-signal Frame

The communication system according to the present invention can be modified to enable handling of encapsulated main-signal frames, as well as the IPoE main-signal frames, as explained below.

As explained before with reference to FIG. 12, when each subscriber-side edge L2 switch receives a PPPoE frame in which the "ETHER TYPE" field indicates "0x8864", the PPPoE frame is passed to the CPU 202 for software processing. In order to enable handling of encapsulated main-signal frames, the CPU 202 determines whether or not the PPP-PROTOCOL value of the received PPPoE frame is "0x0021", i.e., the PPPoE frame is an IP data packet encapsulated in accordance with PPPoE, the CPU 202 refers to the MAC-VID table T2b, obtains a VLAN-ID corresponding to a target service provider, decapsulates the encapsulated IP data packet so as to form an IPoE frame, attaches a tag to the IPoE frame, and transfers the IPoE frame to the access network 6'. When the MAC-VID table T2b does not include a VLAN-ID corresponding to a target service provider, the received PPPoE frame is discarded.

In the above case, it is unnecessary to change the functions of each core switch, each provider-side edge L2 switch, and other equipment arranged on the provider side.

In addition, when each subscriber-side edge L2 switch receives a downstream frame from a service provider, the subscriber-side edge L2 switch encapsulates the downstream frame in accordance with PPPoE, and transfers the encapsulated downstream frame to a user terminal.

Further, a virtual router function, which is equivalent to the conventional B-RAS, is realized as follows.

When each subscriber-side edge L2 switch decapsulates an IP over PPP over Ethernet frame (encapsulated IP frame) received from a user terminal so as to form an IPoE frame, and transfers the IPoE frame to the access network 6', the subscriber-side edge L2 switch replaces the source MAC address in the IPoE frame with the MAC address of the subscriber-side edge L2 switch, and the destination MAC address in the IPoE frame with the MAC address of the target provider edge router. In addition, When each subscriber-side edge L2 switch receives a downstream frame including the MAC address of the subscriber-side edge L2 switch as the destination MAC address, encapsulates the downstream IPoE frame so as to form a PPPoE frame, and transfers the PPPoE frame to a user terminal as a destination, the CPU determines the destination user terminal, and replaces the destination MAC address in the PPPoE frame with the MAC address of the user terminal, and the source MAC address in the PPPoE frame with the MAC address of the subscriber-side edge L2 switch.

Thus, the communication system modified as above can accommodate the conventional user terminals which transmit to and receive from a subscriber-side edge L2 switch IP data in accordance with PPPoE.

Although the above operations for accommodating the conventional user terminals are basically performed by software, the operations for accommodating the user terminals having the functions according to the present invention can be performed at high speed by hardware as explained before even when the functions for accommodating the conventional user terminals is added to each subscriber-side edge L2 switch. Since the above functions for accommodating the conventional user terminals can be realized by modification of the software of each subscriber-side edge L2 switch, it is easy to modify each subscriber-side edge L2 switch according to the present invention so as to accommodate the conventional user terminals.

Figure 58:
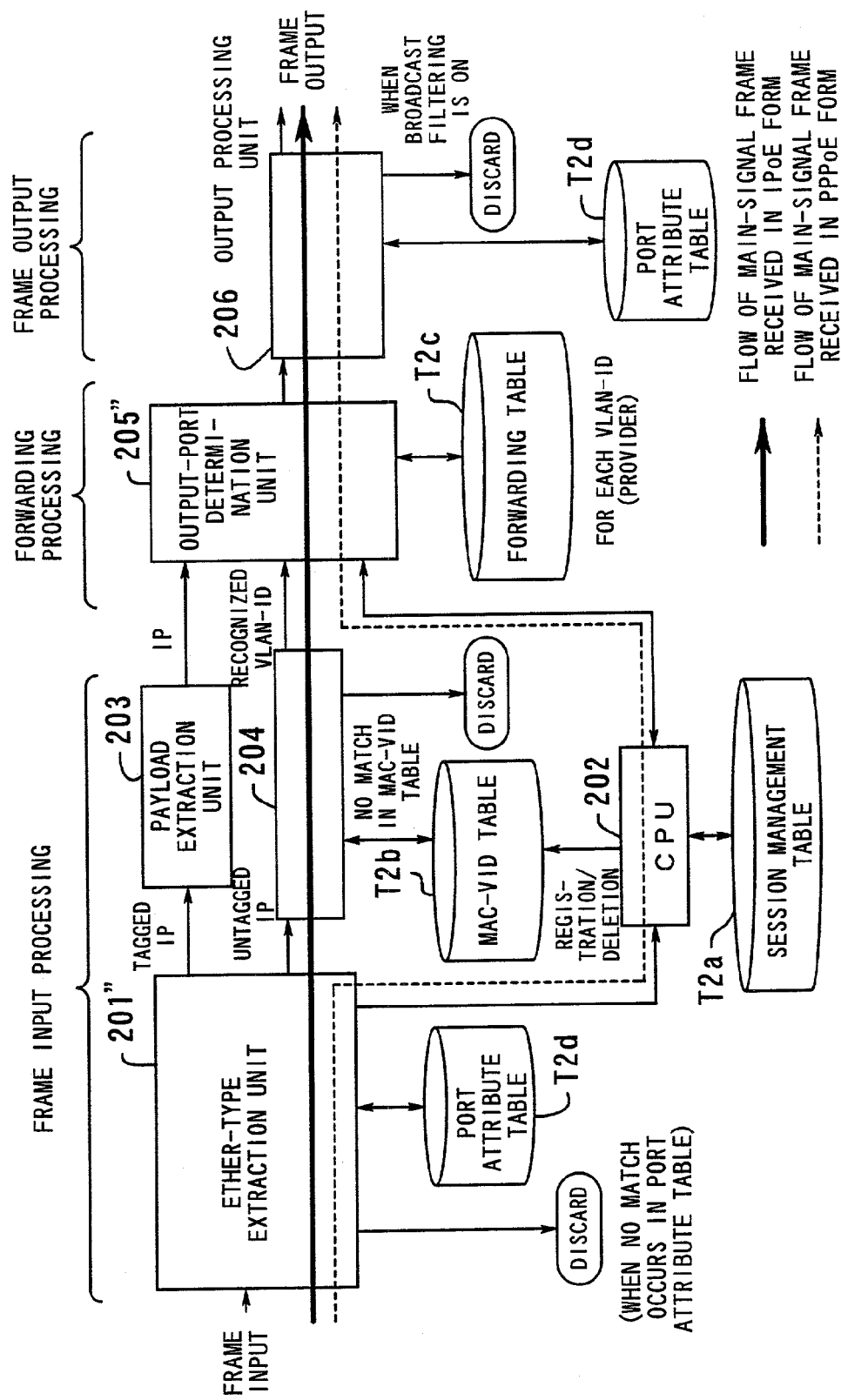
FIG. 58 is a block diagram illustrating the functions of each subscriber-side edge L2 switch in the case where functions of accommodating the conventional user terminals are added.
Figure 59:
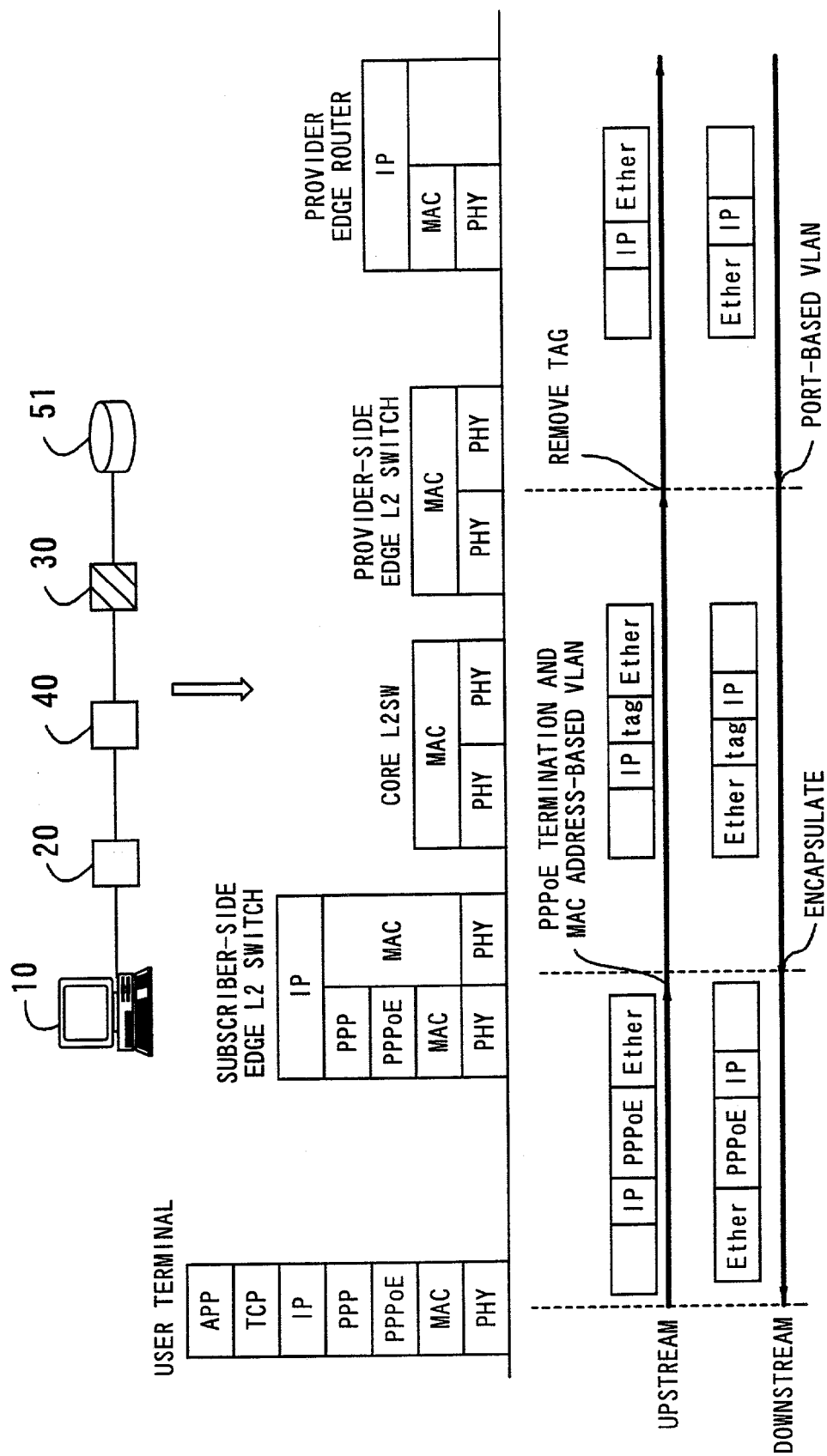
FIG. 59 is an explanatory diagram illustrating decapsulation, tagging, and untagging of an upstream main-signal frame; tagging, untagging, and encapsulation of a downstream main-signal frame; and protocol stacks relating to the transfer of the main-signal frames, in each user terminal, each subscriber-side edge L2 switch, each core switch, each provider-side edge L2 switch, and a provider edge router.

FIG. 58 is a block diagram illustrating the functions of each subscriber-side edge L2 switch in the case where the functions of accommodating the conventional user terminals are added, and FIG. 59 is an explanatory diagram illustrating decapsulation, tagging, and untagging of an upstream main-signal frame; tagging, untagging, and encapsulation of a downstream main-signal frame; and protocol stacks relating to the transfer of the main-signal frames, in each user terminal, each subscriber-side edge L2 switch, each core switch, each provider-side edge L2 switch, and a provider edge router.

(14) Communication Program

The functions of each user terminal according to present invention described above can be realized by a computer as a client computer. The functions of each user terminal can be written as a communication program, which can be stored in a computer-readable storage medium. That is, the functions of each user terminal according to the present invention can be realized by a computer which executes the program. The computer-readable storage medium may be a magnetic storage device, a magnetic recording medium, an optical disk, an optical magnetic recording medium, a semiconductor memory, or the like.

In order to put the program into the market, the program may be stored in a portable storage medium such as a CD-ROM or a flexible disk (FD). Alternatively, the programs can be stored in a storage device belonging to a server computer, and transferred to another computer through a network.

In order to execute the program by a computer, the program, which is recorded in a portable storage medium or transferred from a server computer, is stored in a storage (e.g., a hard disk device) belonging to the computer. Then, the computer reads the program from the storage, and executes processing in accordance with the program.

(15) Variation of Communication System

Figure 60:
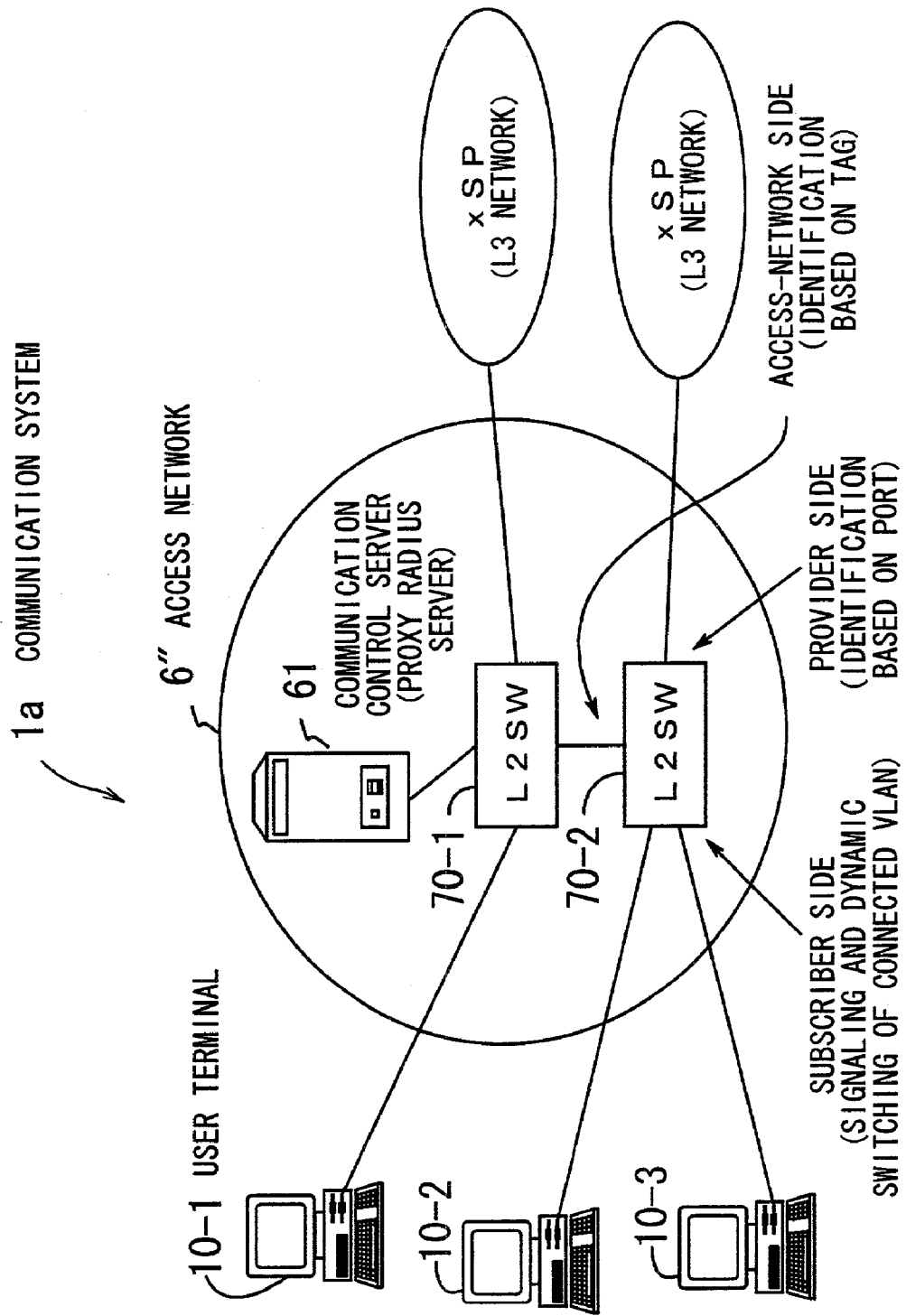
FIG. 60 is a diagram illustrating a communication system in which integrated L2 switches 70 each having all of the functions of the subscriber-side edge L2 switch, the core switch, and the provider-side edge L2 switch.

FIG. 60 is a diagram illustrating a variation of the communication system according to the present invention. In the communication system 1a, the access network 6" comprises the proxy Radius server 61 and integrated L2 switches 70-1 and 70-2 each having all of the functions of the subscriber-side edge L2 switch, the core switch, and the provider-side edge L2 switch.

In order to realize each of the integrated L2 switches 70-1 and 70-2, it is necessary for each integrated L2 switch to recognize a role (or attribute) of each port. Then, the integrated L2 switch must behave as a subscriber-side edge L2 switch when the integrated L2 switch is located at a subscriber-side edge of the access network 6", or behave as a core switch (i.e., transfer a frame based on a tag attached to the frame) when the integrated L2 switch is located inside the access network 6" (i.e., when all ports of the integrated L2 switch is connected to another element in the access network 6" such as another integrated L2 switch or the proxy Radius server 61), or behave as a provider-side edge L2 switch when the integrated L2 switch is located at a provider-side edge of the access network 6".

In order to realize the above operations, the aforementioned port attribute table T2d is modified by adding information items (columns) "PORT ATTRIBUTE" and "VID".

One of the added information item "PORT ATTRIBUTE" indicates whether each port is connected to a user terminal, a service provider, or another network element in the access network 6" such as another integrated L2 switch or the proxy Radius server 61. FIG. 61 is a diagram illustrating an example of a port attribute table which is held in each integrated L2 switch 70-1 or 70-2 when the integrated L2 switch is located at a subscriber-side edge of the access network 6", and FIG. 62 is a diagram illustrating an example of a port attribute table which is held in each integrated L2 switch 70-1 or 70-2 when the integrated L2 switch is located at a provider-side edge of the access network 6", and a port VID table produced based on the VID values set by the user.

The contents of the information item "PORT ATTRIBUTE" can be set by a user in accordance with an actual configuration, for example, by inputting commands "#configure port 1 user" and "#configure port 5 user" through a command line interface.

Each integrated L2 switch is configured to automatically set default values of the other information items "RECEPTION FRAME", "BROADCAST FILTERING", and "TAGGED/UNTAGGED" for each port in the modified port attribute table based on the contents of the information item "PORT ATTRIBUTE". For example, as the default values for each port connected to a user terminal, the information item "RECEPTION FRAME" is "PPPoE, IP, ARP", "BROADCAST FILTERING" is "ON", and "TAGGED/UNTAGGED" is "Untag". Thus, it becomes unnecessary to set the information items "RECEPTION FRAME", "BROADCAST FILTERING", and "TAGGED/UNTAGGED" one by one.

The other added information item "VID" is provided for allowing static setting of the value of the VLAN-ID. That is, the value of the information item "VID" can be set at the same time as the setting of the contents of the information item "PORT ATTRIBUTE". For example, when a command "#configure port 7 xsp vid 12" is input, the information item "PORT ATTRIBUTE" for the port 7 is set to "xsp", and the information item "VID" for the port 7 is set to "12".

In addition, the aforementioned port VID table, which is referred to by the third transfer control unit 32 in each integrated L2 switch located at a provider-side edge of the access network 6", is registered based on the above setting of the information item "VID" in the port attribute table, as illustrated in FIG. 62. When each integrated L2 switch located at a provider-side edge of the access network 6" receives a main-signal frame from a service provider, the integrated L2 switch recognizes a VID (VLAN-ID) by referring to the port VID table, and transfers the main-signal frame by referring to the forwarding table provided corresponding to the VID value. The forwarding table is automatically produced by address learning. Since the VIDs corresponding to the ports connected to the user terminals or other network elements in the access network 6" vary with changes in connections between the user terminals and the service providers, the values of the information item "VID" for the ports connected to the user terminals or other network elements in the access network 6" are not set in the port attribute table.

Figure 63:
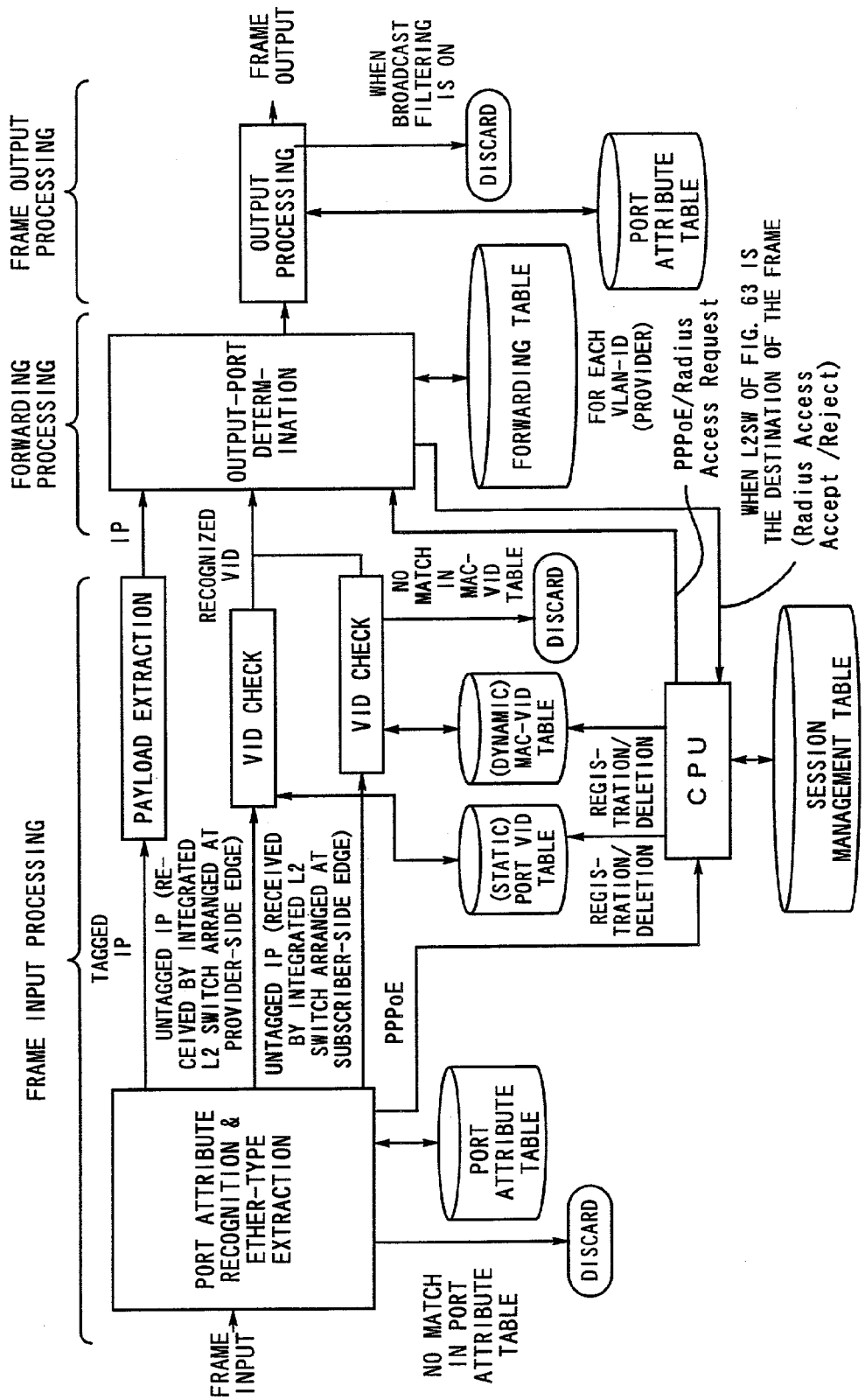
FIG. 63 is a block diagram illustrating the functions of each integrated L2 switch.
Figure 64:
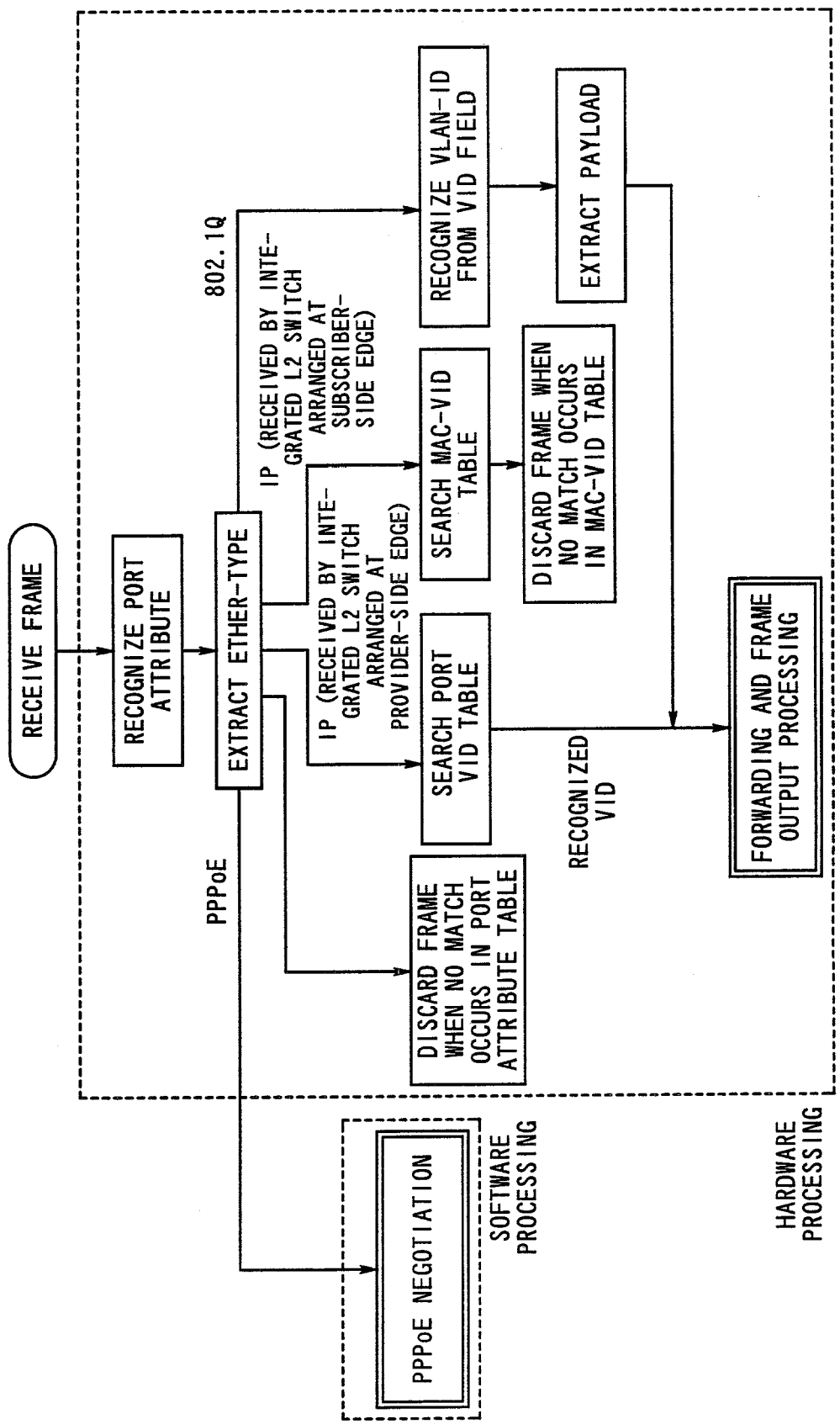
FIG. 64 is a flow diagram illustrating a sequence of operations performed by each integrated L2 switch.
Figure 65:
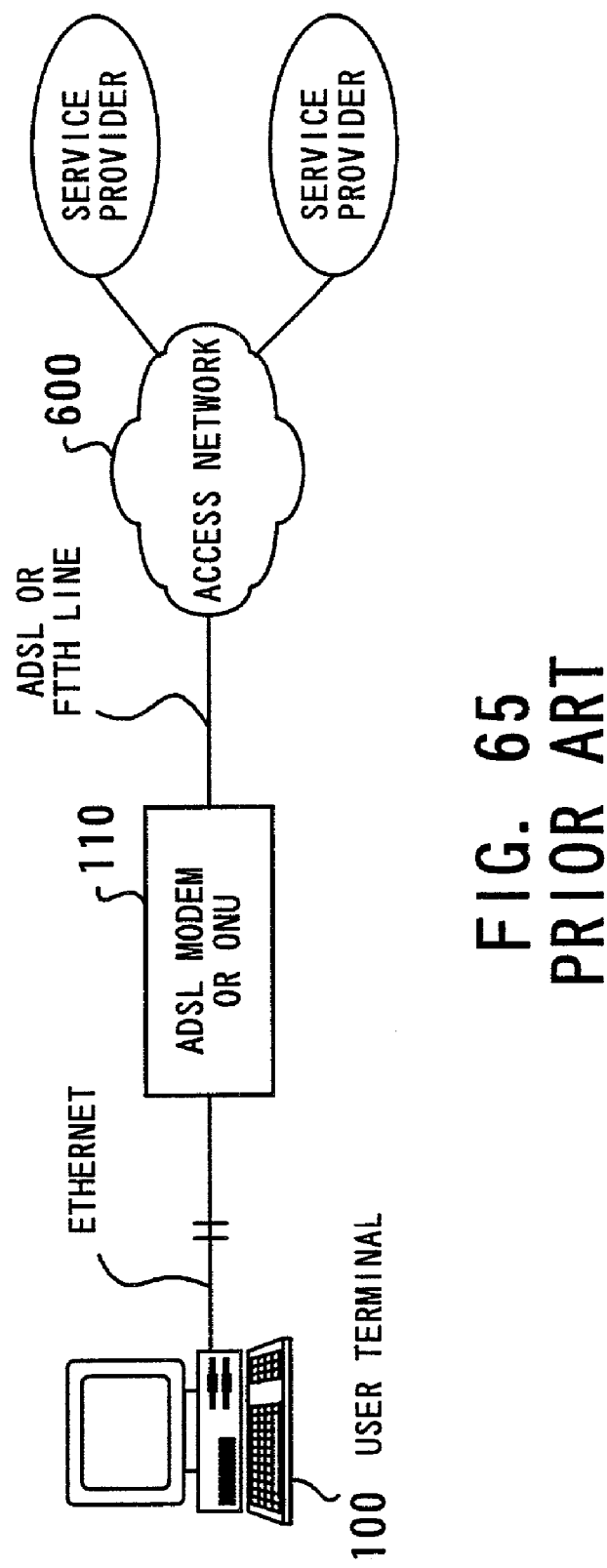
FIG. 65 is a diagram illustrating a configuration for connecting a user terminal to service providers.
Figure 66:
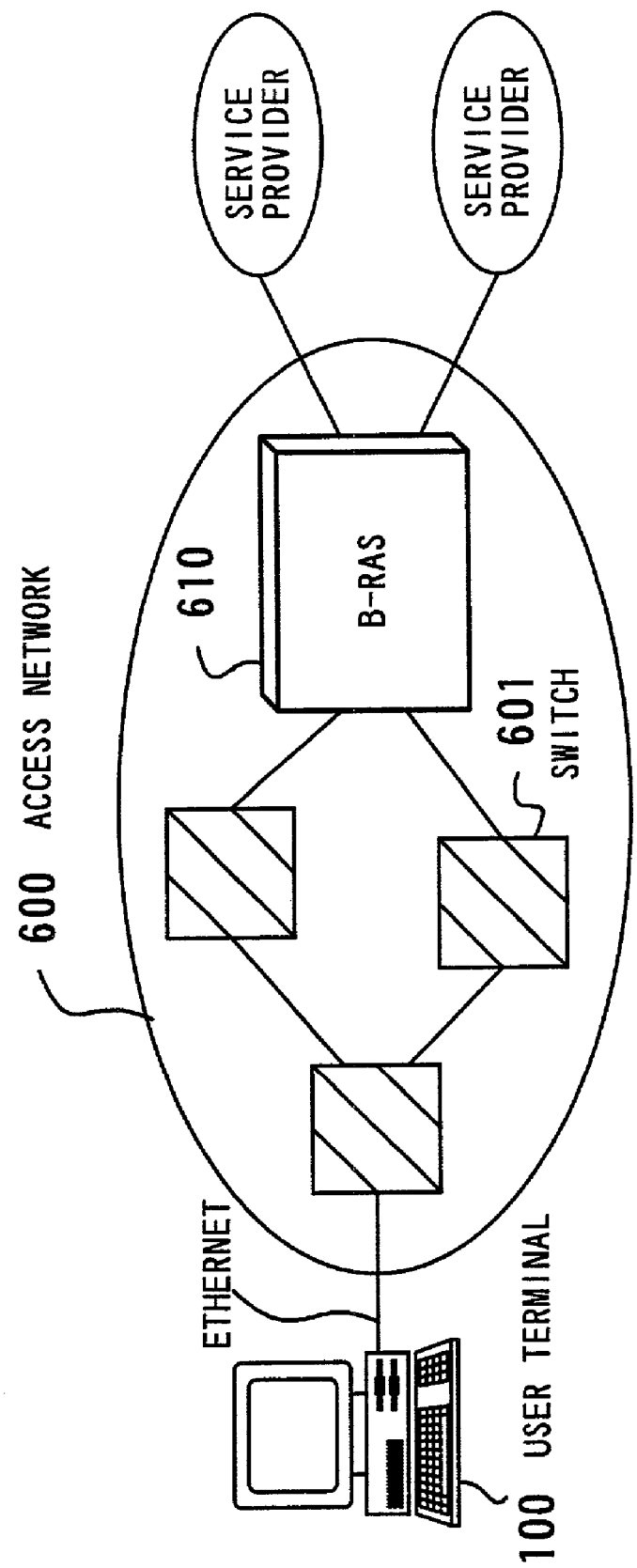
FIG. 66 is a diagram illustrating a conventional network system which uses PPPoE.

When each integrated L2 switch located at a provider-side edge of the access network 6" receives a frame from a service provider, the integrated L2 switch checks whether or not a type of frame indicated by the "ETHER TYPE" field of the receive frame is acceptable, by referring to the port attribute table, and determines a VLAN-ID corresponding to the main-signal frame by referring to the port attribute table. The forwarding processing and the output processing in the integrated L2 switch are identical to the aforementioned forwarding processing and output processing of the provider-side edge L2 switch. When each integrated L2 switch located at a subscriber-side edge of or inside the access network 6" receives a frame, the operations of the integrated L2 switch are identical to the aforementioned operations of the subscriber-side edge L2 switch or the core switch. FIG. 63 is a block diagram illustrating the functions of each integrated L2 switch, and FIG. 64 is a flow diagram illustrating a sequence of operations performed by each integrated L2 switch.

(10) Other Matters (i) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(ii) All of the contents of the Japanese patent application, No.2001-246400 are incorporated into this specification by reference.

What is claimed is:

1. A communication system comprising:
   (a) an access network on which a virtual private network is established;
   (b) a service provider coupled to said access network; and
   (c) user terminals comprising:
   a user-side session management unit that performs processing for designation of the service provider, user authentication, and IP address assignment, by using a signaling protocol to exchange management frames with the access network in an authentication phase, and
   a main-signal transmission-and-reception unit that exchanges main-signal frames with said service provider by using IPoE protocols over the virtual private network established on said access network in a communication phase, wherein the main-signal frames being distinguishable from the management frames on the basis of Ether Type field values as part of Layer 2 header information; and
   (d) a subscriber-side edge switch placed between said access network and said user terminal, comprising;
   a transfer control unit that transfers a first main signal frame from the user terminal to the access network and a second main-signal frame from the access network to the user terminal, and
   a said network-side session management unit performs processing for signaling control, wherein
   said transfer control unit attaches to the first main-signal frame a tag indicating the first virtual private network when transferring the first main-signal frame from the user terminal to the access network, and
   said transfer control unit removes a tag indicating the virtual private network from the second main-signal frame when transferring the second main-signal frame from the access network to the user terminal,
   said network-side session management unit comprises a first table indicating correspondences between the Layer 2 address of said user terminal and a session involving said user terminal, and performs processing for signaling control by software using the first table,
   said transfer control unit comprises a second table indicating correspondence between the Layer 2 address of the user terminal and the tag indicating the virtual private network connected to said service provider,
   said transfer control unit further comprises a third table indicating forwarding information corresponding to said service provider,
   said transfer control unit further comprises a fourth table indicating attributes of each port of said subscriber-side edge switch,
   said transfer control unit controls the transfer of said main-signal frames by hardware processing using the second, third, and fourth tables, and
   said transfer control unit performs processing for determination of whether or not an input frame is to be handled by the subscriber-side edge switch, and whether an output frame is to be tagged or untagged, and whether or not broadcast filtering is activated, and filtering of unicast flooding, based on said at least one attribute indicated in said fourth table.

2. The communication system according to claim 1, wherein said main-signal transmission-and-reception unit transmits a frame for confirming connectivity at regular time intervals in said communication phase.

3. The communication system according to claim 1, wherein said user-side session management unit monitors transmission and reception of the main-signal frames, and terminates a connection with said service provider when said user terminal to which said user-side session management unit belongs does not transmit or receive a main-signal frame for a predetermined time which can be set by a user.

4. The communication system according to claim 1, wherein said transfer control unit decapsulates the first main-signal frame before the said transfer control unit transfers the first main-signal frame, when the first main-signal frame received by the subscriber-side edge switch is encapsulated in accordance with a PPP protocol.

5. The communication system according to claim 1, wherein when the user terminal is concurrently connected to a plurality of service providers, and said subscriber-side edge switch receives a frame, said transfer control unit uniquely identifies one of the plurality of service providers as a destination of the frame based on Layer 2 addresses of the user terminal and the one of the plurality of service providers.

6. The communication system according to claim 1, wherein when the user terminal is concurrently connected to a plurality of service providers, and said subscriber-side edge switch receives a frame, said transfer control unit uniquely identifies one of the plurality of service providers as a destination of the frame based on a Layer 2 address of the user terminal and a Layer 3 address of the one of the plurality of service providers.

7. The communication system according to claim 1, wherein said access network comprises a subscriber-side edge switch including a network-side session management unit and a transfer control unit,
    said network-side session management unit performs processing for signaling control,
    when the user terminal is concurrently connected to a plurality of service providers, said network-side session management unit delivers to the user terminal a plurality of tags corresponding to the plurality of service providers during the processing for signaling control,
    in order to transmit a main-signal frame from said user terminal to one of the plurality of service providers, said main-signal transmission-and-reception unit in the user terminal attaches to the main-signal frame one of the plurality of tags corresponding to the one of the plurality of service providers, and transmits said main-signal frame to said subscriber-side edge switch, and
    when said subscriber-side edge switch receives the main-signal frame from the user terminal, the subscriber-side edge switch identifies the one of the plurality of service providers as a destination of the main-signal frame, based on the one of the plurality of tags.

8. The communication system according to claim 1, wherein said access network comprises a provider-side edge switch having a first transfer control unit, a second transfer control unit, and a plurality of ports respectively connected to a plurality of service providers,
    when said provider-side edge switch receives a first main-signal frame from a first user terminal through said access network, and a first tag indicating a first service provider is attached to the first main-signal frame, said first transfer control unit recognizes the first service provider based on the first tag, removes the first tag from the first main-signal frame, and transfers the first main-signal frame through a first port to the first service provider, and
    when said provider-side edge switch receives a second main-signal frame from a second service provider through a second port, said second transfer control unit recognizes the second service provider based on the second port, attaches to the second main-signal frame a second tag indicating the second service provider, and transfers the second main-signal frame toward a second user terminal connected to the second service provider.

9. The communication system according to claim 1, further comprising a communication control server which controls operations for authentication in a centralized manner, where the operations for authentication includes collection of authentication information from each of a plurality of user terminals, transfer of the authentication information to said service provider to which one of said plurality of user terminals is connected, and transfer of an authentication frame to said each of the plurality of user terminals, and the authentication frame indicates a result of an operation for authentication performed by said service provider.

10. The communication system according to claim 1, further comprising a communication control server including a network-side session management unit which performs processing for signaling control,
    said access network comprises a subscriber-side edge switch including a transfer control unit which is separately arranged from the network-side session management unit,
    when said subscriber-side edge switch receives a first main-signal frame from a first user terminal, said transfer control unit attaches to the first main-signal frame a first tag indicating a first virtual private network, and transfers the first main-signal frame through the access network, and
    when said subscriber-side edge switch receives a second main-signal frame transferred through the access network, and a second tag indicating a second virtual private network is attached to the second main-signal frame, said transfer control unit removes the second tag from the second main-signal frame, and transfers the second main-signal frame to a second user terminal.

11. The communication system according to claim 10, wherein said subscriber-side edge switch attaches to each management frame transferred from a third user terminal a tag indicating that the third user terminal is connected to the subscriber-side edge switch, and transfers the management frame to said communication control server by hardware processing, and
    when authentication succeeds, said communication control server remotely configures a table in said subscriber-side edge switch, and said table indicates information for identification of each of a plurality of service providers.

12. The communication system according to claim 10, wherein said communication control server produces a table indicating at least one correspondence between at least one Layer 2 address and at least one Layer 3 address, and
    said subscriber-side edge switch performs an address resolution by hardware processing for transferring to the communication control server a request for a Layer 2 address corresponding to a Layer 3 address of a destination indicated in the request.

13. The communication system of claim 1 further comprising a communication control server including
    an authentication control unit which controls operations for authentication in a centralized manner so that the communication control server behaves as an authentication server, where the operations for authentication includes collection of authentication information from the user terminal, transfer of the authentication information to at least one service provider to which the user terminal is connected, and transfer of an authentication frame to the user terminal, and the authentication frame indicates a result of an operation for authentication performed by said at least one service provider; and
    a session management unit which performs processing for signaling control so that the communication control server behaves as a session management server.

14. A subscriber-side edge switch for connecting a service provider and a user terminals through an access network on which a virtual private network is established, comprising:
    a transfer control unit; and
    a network-side session management unit which performs processing for signaling control; and wherein said subscriber-side edge switch includes a mapping of MAC addresses of use terminals and service providers on virtual private networks, and when said subscriber- side edge switch receives a first main-signal frame from a first user terminal, said transfer control unit attaches to the first main-signal frame a first tag indicating a first virtual private network, and outputs the first main-signal frame over the first virtual private network, the first main-signal frame containing a MAC address of the first user terminal as a source MAC address, and when said subscriber-side edge switch receives a second main-signal frame from a service provider, and a second tag indicating a second virtual private network is attached to the second main-signal frame, said transfer control unit removes the second tag from the second main-signal frame, and outputs the second main-signal frame toward a second user terminal, the second main-signal frame containing a MAC address of the service provider as source MAC address;

said network-side session management unit comprises a first table indicating at least one correspondence between at least one Layer 2 address of at least one user terminal and at least one session with the at least one user terminal, and performs processing for signaling control by software using the first table, and said transfer control unit comprises,
- a second table indicating at least one correspondence between said at least one Layer 2 address and at least one tag each indicating a virtual private network connected to a service provider,
- a third table indicating forwarding information corresponding to at least one service provider, and
- a fourth table indicating at least one attribute of each of at least one port of said subscriber-side edge switch, said transfer control unit controls output of said first and second main-signal frames by hardware processing using the second, third, and fourth tables, and performs processing for determination of whether or not an input frame is to be handled by the subscriber-side edge switch, and whether an output frame is to be tagged or untagged, and whether or not broadcast filtering is activated, and filtering of unicast flooding, based on said at least one attribute indicated in said fourth table.

15. The subscriber-side edge switch according to claim 14, further comprising an address resolution unit which produces a table indicating at least one correspondence between at least one Layer 2 address and at least one Layer 3 address, and returns a response to a first request for a Layer 2 address corresponding to a Layer 3 address of a destination indicated in the first request, by referring to said table, on behalf of the destination, where the response contains said Layer 2 address corresponding to the Layer 3 address of the destination.

16. The subscriber-side edge switch according to claim 15, wherein said address resolution unit unicasts a second request indicating a Layer 2 address of a source of said first request, to said destination indicated in the first request.

17. The subscriber-side edge switch according to claim 14, wherein said transfer control unit uniquely identifies one of a plurality of service providers as a destination of a frame based on Layer 2 addresses of a user terminal and the one of the plurality of service providers when the user terminal is concurrently connected to the plurality of service providers, and said subscriber-side edge switch receives the frame.

18. The subscriber-side edge switch according to claim 14, wherein said transfer control unit uniquely identifies one of a plurality of service providers as a destination of a frame based on a Layer 2 address of a user terminal and a Layer 3 address of the one of the plurality of service providers when the user terminal is concurrently connected to the plurality of service providers, and said subscriber-side edge switch receives the frame.

19. The subscriber-side edge switch according to claim 14, wherein said network-side session management unit outputs toward a user terminal a plurality of tags corresponding to a plurality of service providers during the processing for signaling control when the user terminal is concurrently connected to the plurality of service providers.

20. The subscriber-side edge switch according to claim 14, wherein, said transfer control unit decapsulates a main-signal frame before the transfer control unit transfers the main-signal frame, when the main-signal frame is encapsulated in accordance with a PPP protocol, and received by the subscriber-side edge switch.

* * * * *